US008255588B2

(12) United States Patent
Kondo

(10) Patent No.: US 8,255,588 B2
(45) Date of Patent: Aug. 28, 2012

(54) SIGNAL PROCESSING APPARATUS, SIGNAL PROCESSING METHOD, SIGNAL PROCESSING SYSTEM, PROGRAM AND MEDIUM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 228 days.

(21) Appl. No.: 11/634,689

(22) Filed: Dec. 6, 2006

(65) Prior Publication Data

US 2007/0162623 A1 Jul. 12, 2007

Related U.S. Application Data

(63) Continuation of application No. 10/314,556, filed on Dec. 9, 2002, now Pat. No. 7,373,431.

(30) Foreign Application Priority Data

Dec. 10, 2001 (JP) .................. 2001-376183

(51) Int. Cl.
*G06F 13/10* (2006.01)
(52) U.S. Cl. .................. 710/17; 710/2; 710/38; 710/62
(58) Field of Classification Search ........................ None
See application file for complete search history.

(56) References Cited

U.S. PATENT DOCUMENTS

| | | | |
|---|---|---|---|
| 5,194,856 A | 3/1993 | Zijlstra ........................... 340/5.9 |
| 5,616,879 A | 4/1997 | Yamauchi et al. | |
| 6,633,759 B1 | 10/2003 | Kobayashi ..................... 455/419 |
| 6,931,463 B2* | 8/2005 | Striemer .......................... 710/62 |
| 6,973,022 B1* | 12/2005 | Machida et al. ............... 370/216 |
| 7,283,504 B1* | 10/2007 | Elliott ............................ 370/338 |
| 2001/0052858 A1* | 12/2001 | Vincent et al. ........... 340/825.69 |
| 2002/0008779 A1 | 1/2002 | Ju et al. | |
| 2003/0149794 A1 | 8/2003 | Morris et al. ................. 709/249 |

FOREIGN PATENT DOCUMENTS

| | | |
|---|---|---|
| JP | 63 200378 | 8/1988 |
| JP | 2 246400 | 10/1990 |
| JP | 5 166284 | 7/1993 |
| JP | 7-261756 | 10/1995 |
| JP | 7 264519 | 10/1995 |
| JP | 7 298202 | 11/1995 |

(Continued)

OTHER PUBLICATIONS

Davies A C: "An overview of Bluetooth wireless technology <TM> and some competing LAN standards" Conference Proceedings Article, Jun. 26, 2002, pp. 206-211, XP010600420.

(Continued)

*Primary Examiner* — Ilwoo Park
(74) *Attorney, Agent, or Firm* — Frommer Lawrence & Haug LLP; William S. Frommer; Thomas F. Presson

(57) ABSTRACT

A signal processing apparatus and method for processing an input signal. A first signal processing unit processes the input signal, and an expansion unit adds a second signal processing unit. A detecting unit detects whether the one or more additional second signal processing units has been added on to the expansion unit. A communication unit performs data transfers between the first signal processing unit and second additional signal processing unit via wireless communication, and a control unit coordinates the first signal processing unit and the one or more additional signal processing units.

12 Claims, 38 Drawing Sheets

FOREIGN PATENT DOCUMENTS

| | | |
|---|---|---|
| JP | 8 96057 | 4/1996 |
| JP | 10 285658 | 10/1998 |
| JP | 11 4486 | 1/1999 |
| JP | 2000 307594 | 11/2000 |
| JP | 2000 307749 | 11/2000 |
| JP | 2001 290471 | 10/2001 |
| JP | 2002 314903 | 10/2002 |
| JP | 2002 374461 | 12/2002 |
| KR | 2001 106185 | 11/2001 |
| WO | WO 01 33859 | 5/2001 |
| WO | WO 01 76238 | 10/2001 |
| WO | WO 01 97495 | 12/2001 |

OTHER PUBLICATIONS

James Kardach: "Bluetooth Architecture Overview" Internet Citation, 1998, XP002141146.

* cited by examiner

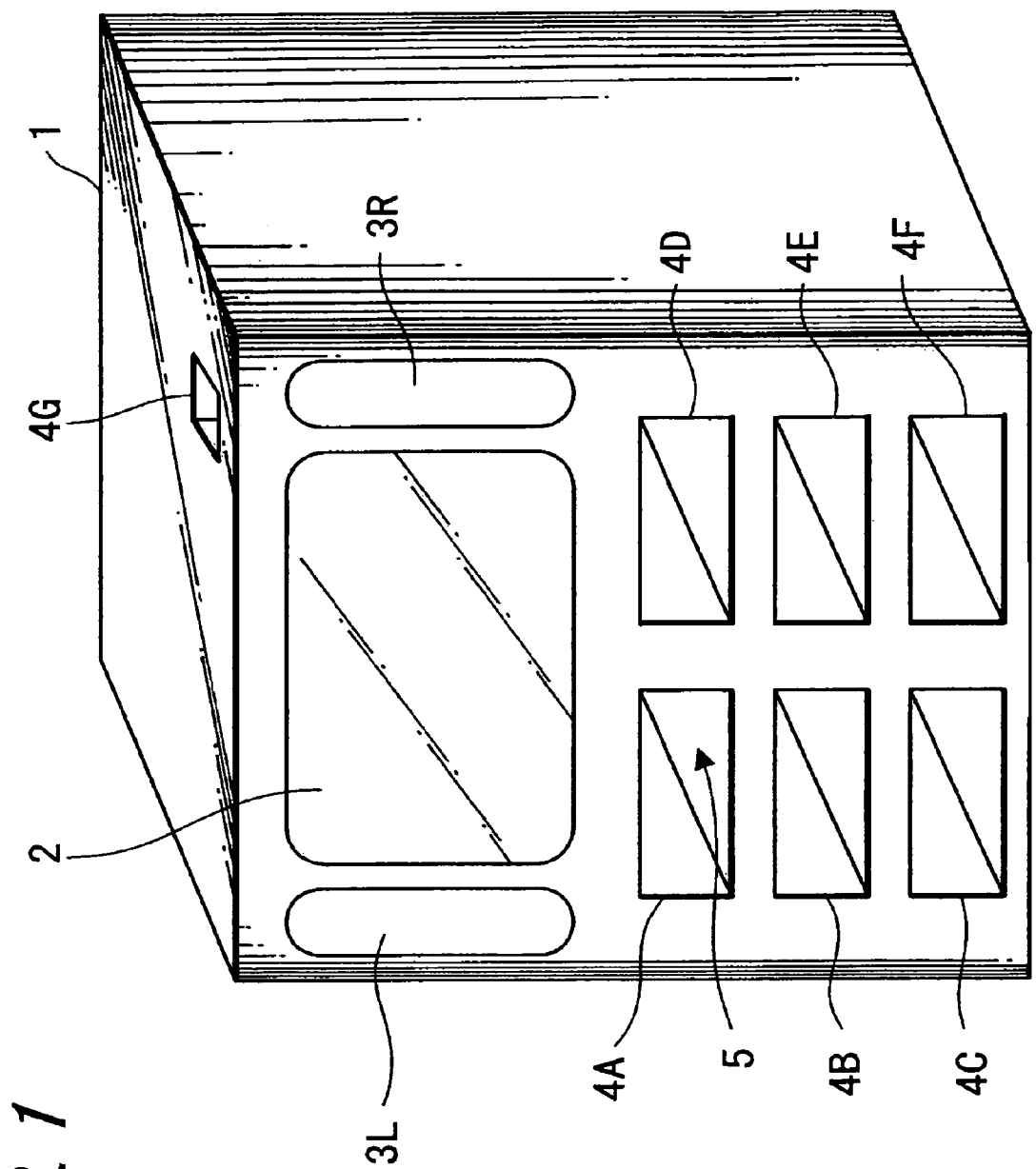

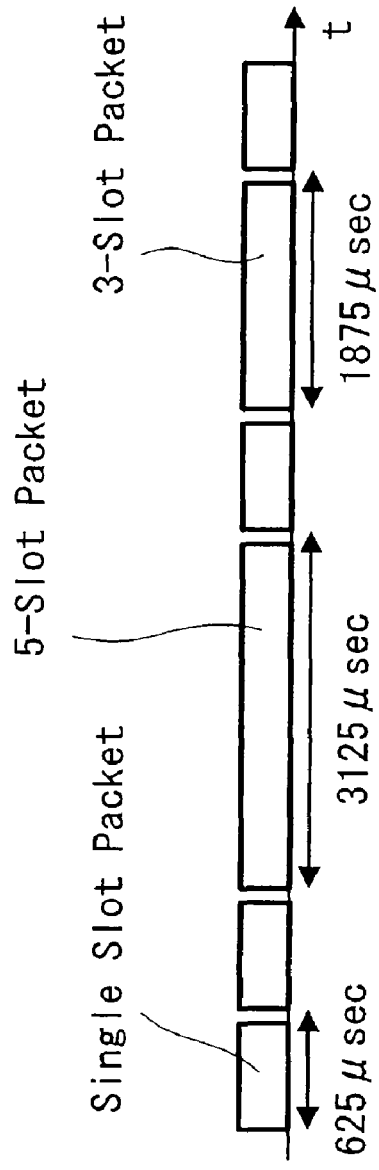
FIG. 24
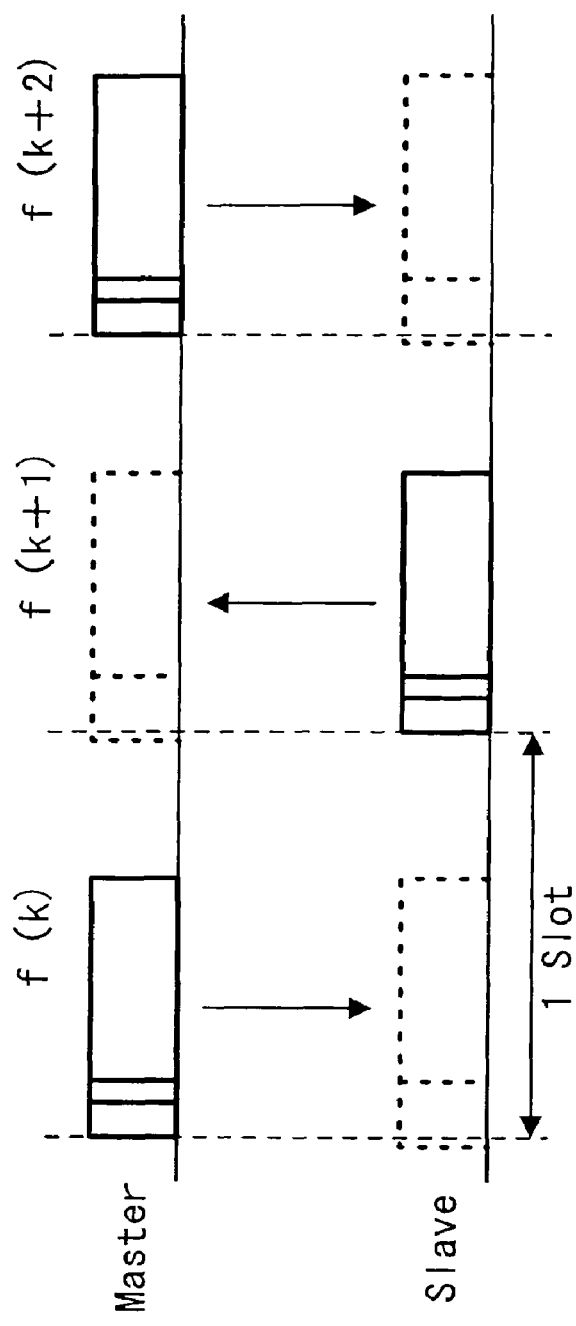
FIG. 25A
FIG. 25B

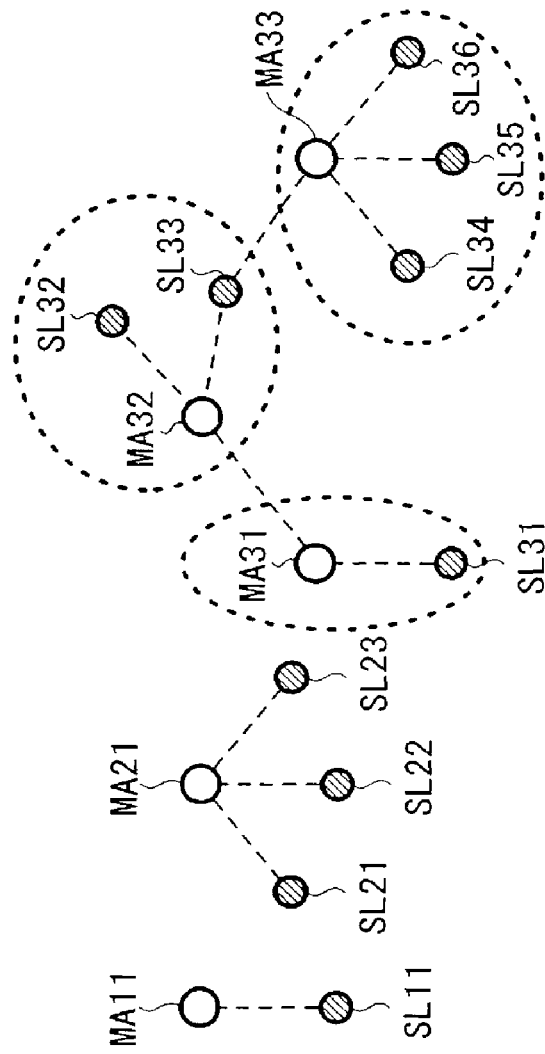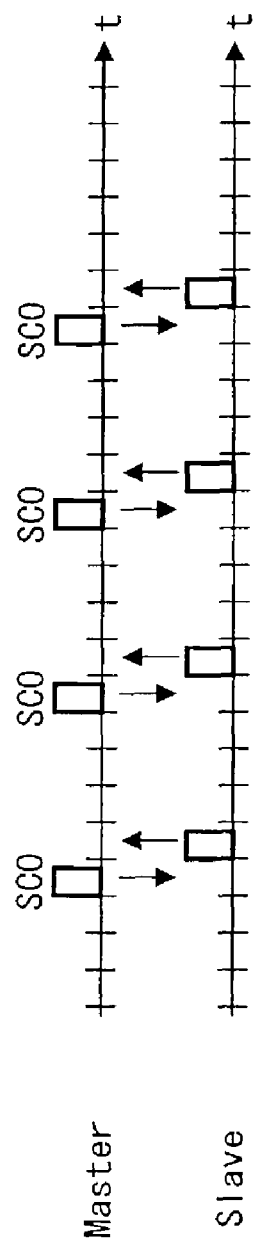

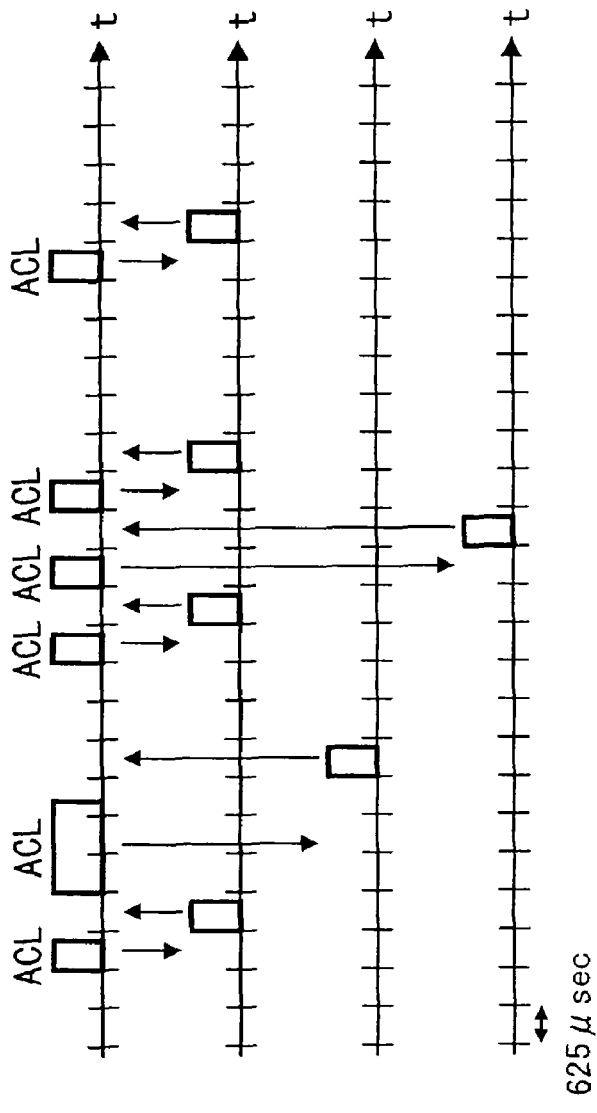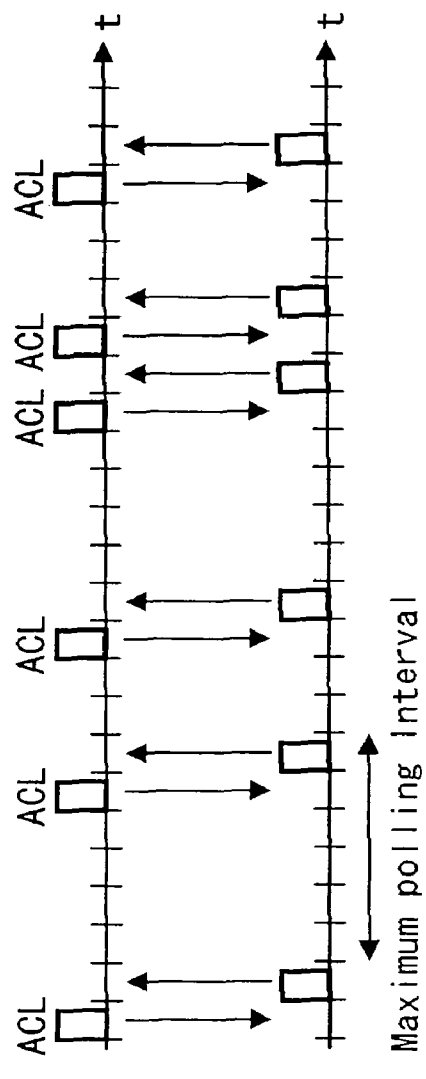

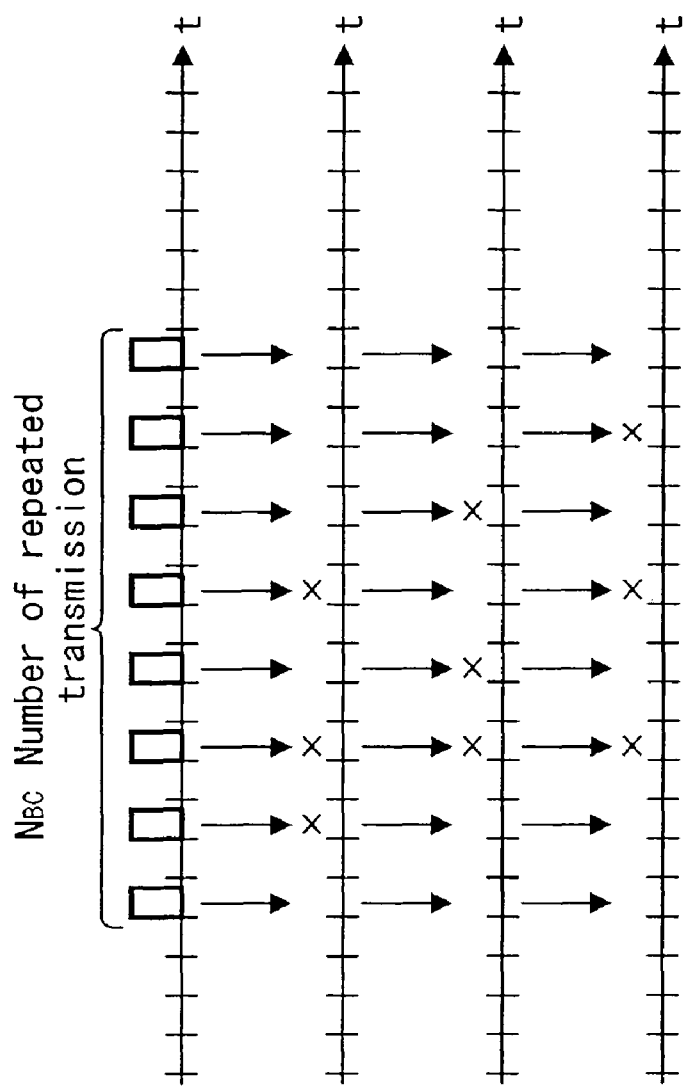

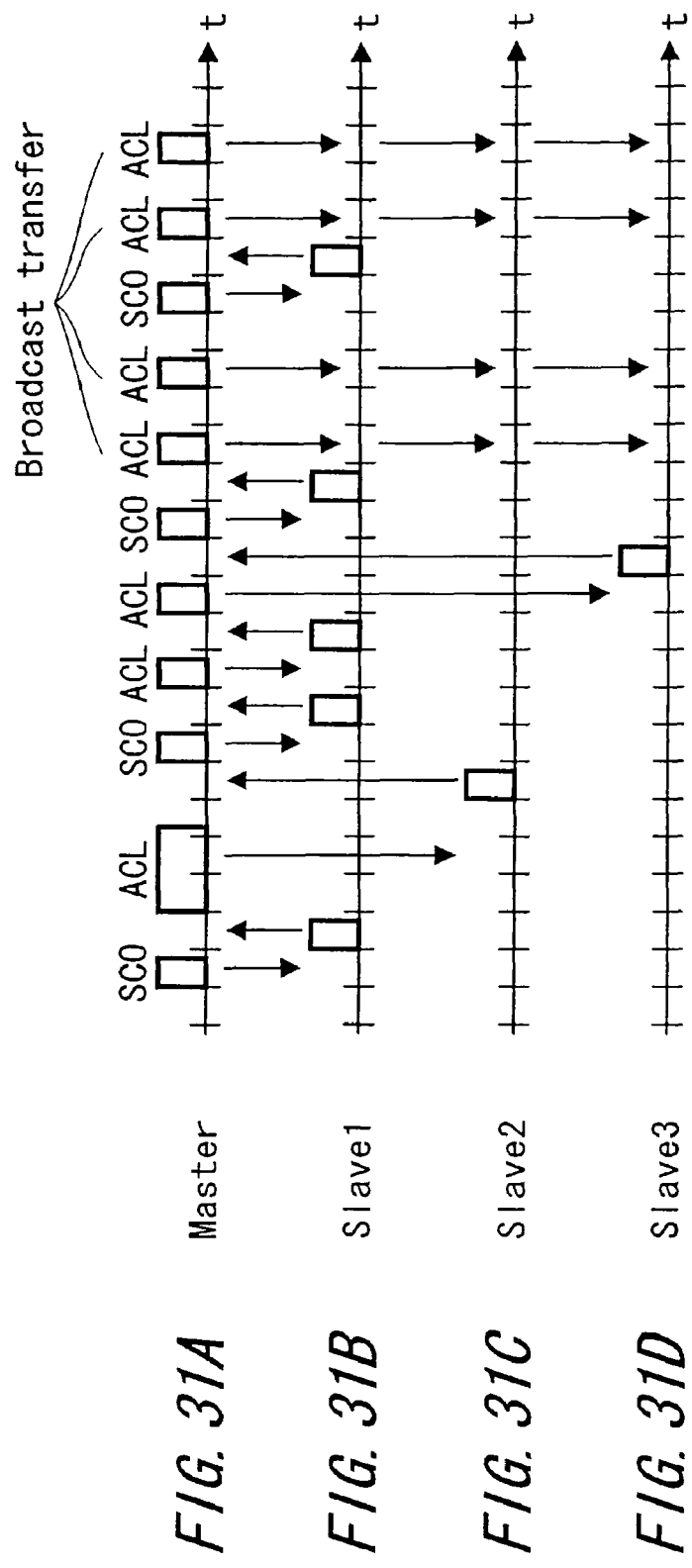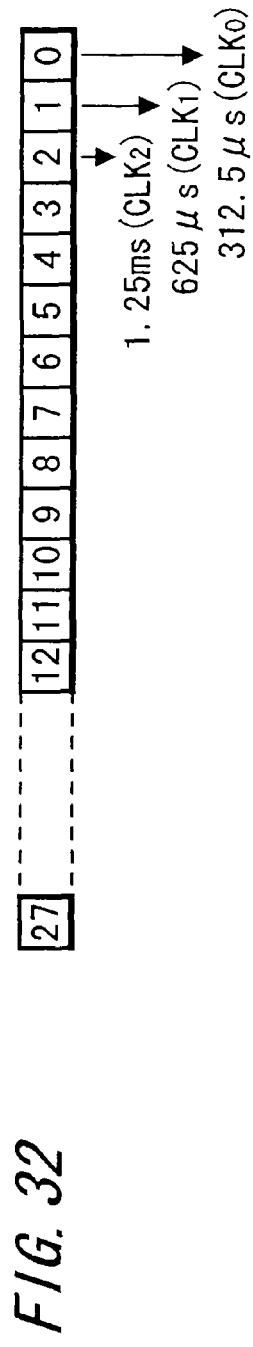

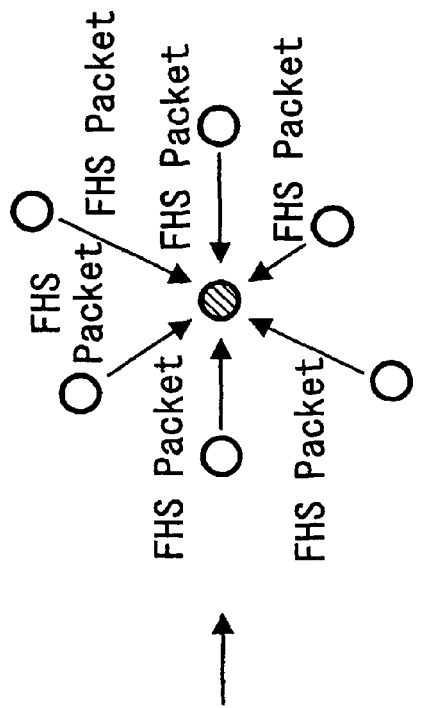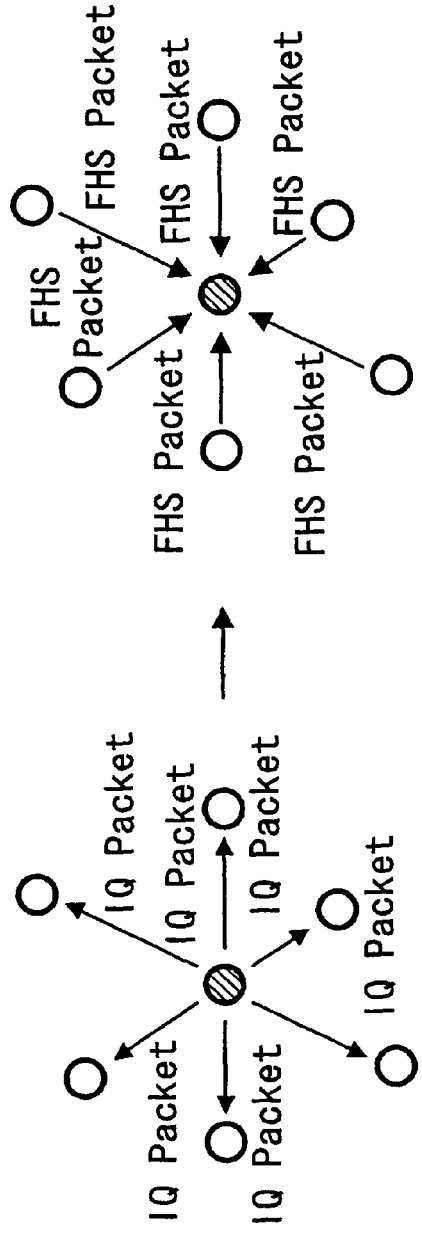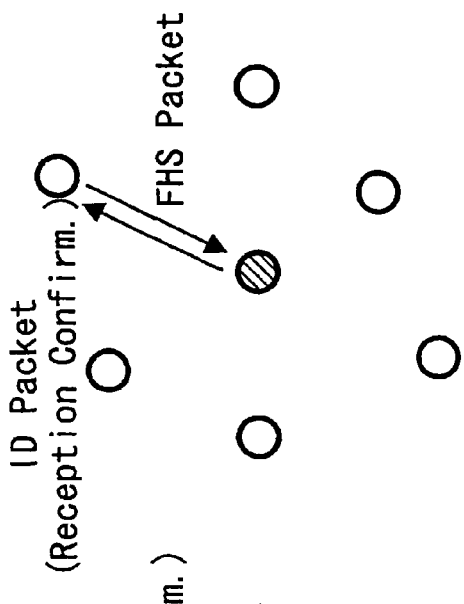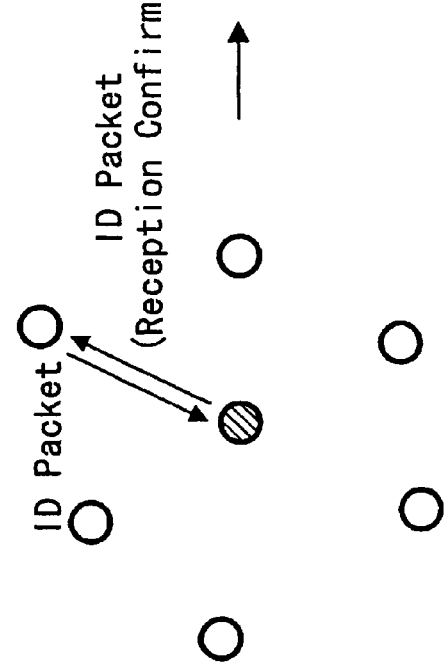

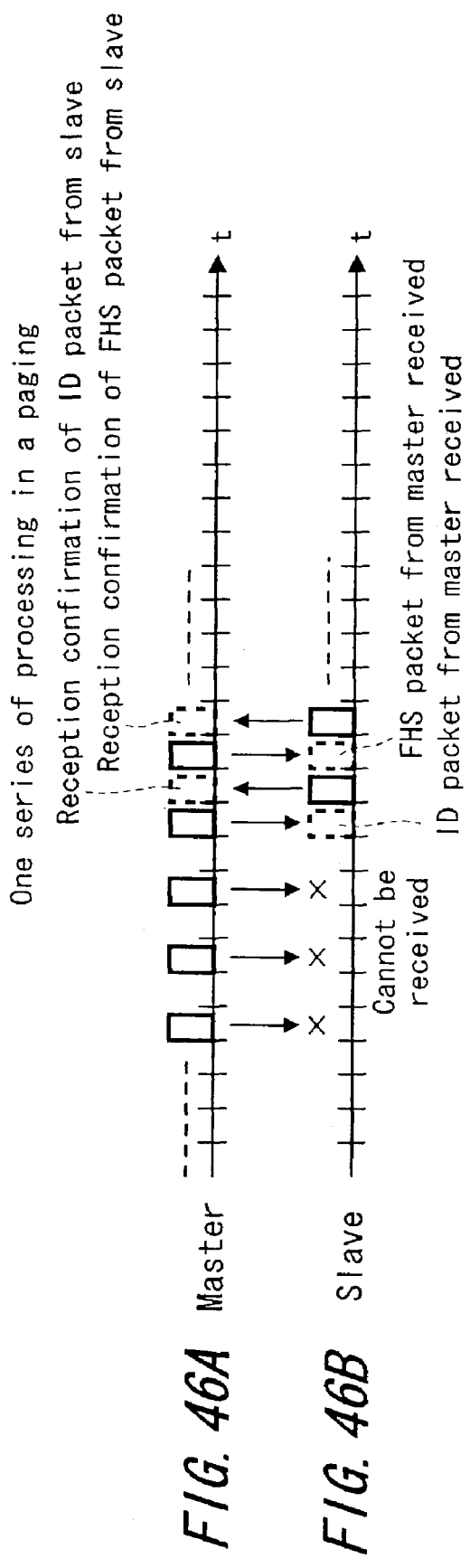

| Appliance ID | Control Information |
|---|---|
| A | NodeA→NodeB→NodeD→NodeB→ |
| B | NodeA→NodeC→NodeB |
| C | NodeA→NodeD→NodeB |
| | |

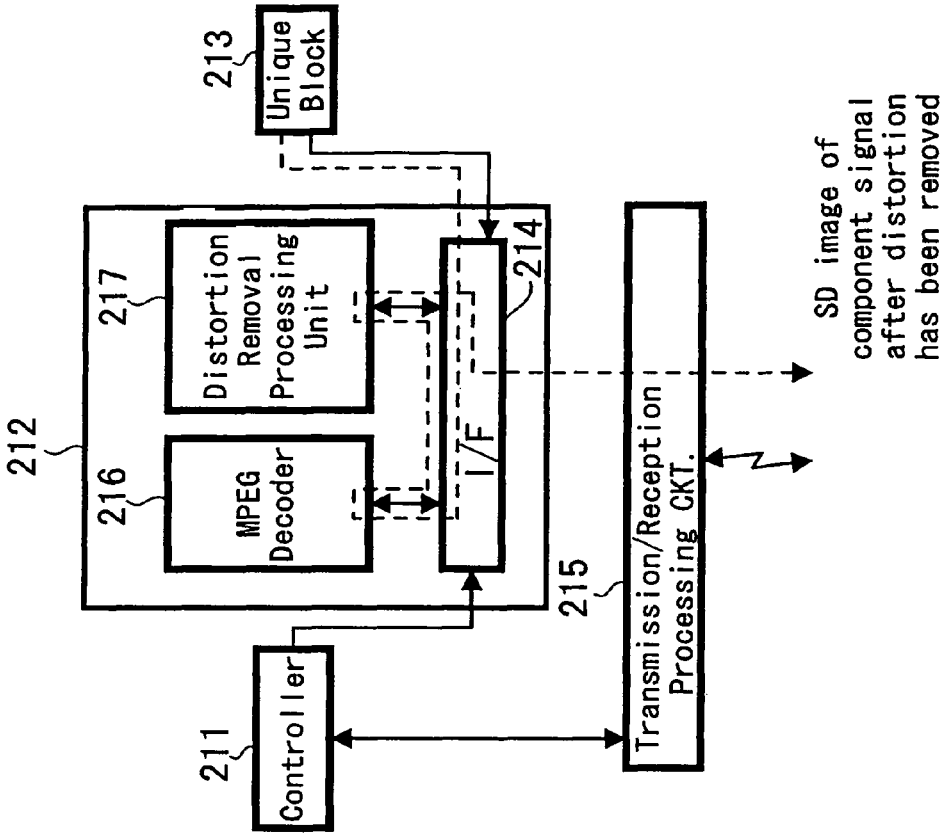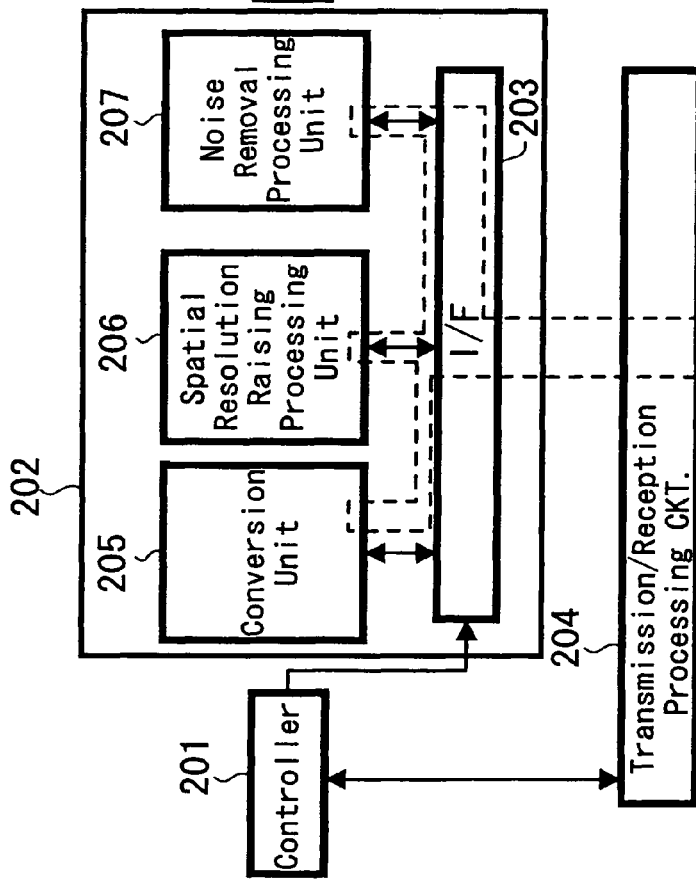

SIGNAL PROCESSING APPARATUS, SIGNAL PROCESSING METHOD, SIGNAL PROCESSING SYSTEM, PROGRAM AND MEDIUM

This application is a Continuation of U.S. application Ser. No. 10/314,556 filed Dec. 9, 2002, now U.S. Pat. No. 7,373,431 now pending, which is hereby incorporated by reference in its entirety herein.

BACKGROUND OF THE INVENTION

1. Field of the Invention

The present invention relates to a signal processing apparatus, a signal processing method, a signal processing system, program and medium. In particular, the present invention relates to a signal processing apparatus, a signal processing method, a signal processing system, program and medium which, when a plurality of apparatuses are connected, changes the functions of the apparatuses to make it possible for the processing performed on an input signal to be shared out among the plurality of apparatuses, thereby making it possible to obtain a higher quality processing result than when a single apparatus is used.

2. Description of the Related Art

As examples, devices such as a digital VTR (Video Tape Recorder) and a DVD (Digital Video Disc or Digital Versatile Disc) player are used by connecting them to a television receiver or the like so that users can watch and listen to reproduced images and audio. This is to say, the images and audio reproduced by a digital VTR or the like are supplied to a television receiver with the images being displayed on the screen and the audio being outputted from a speaker or speakers.

When images and audio that are reproduced by a digital VTR are outputted by a television receiver, some of the signal processing circuits provided in the television receiver do not perform any particular processing.

This is to say, when as one example, component signals are outputted from a digital VTR, the signal processing circuits in the television receiver that convert a composite signal into component signals do not need to perform any processing, and so become idle.

On the other hand, when a television receiver is connected to a digital VTR as described above, it is believed that it would be possible to provide users with higher-quality images and audio if the signal processing circuit of the television receiver and the signal processing circuit of the digital VTR could be made to operate in concert to share the processing performed on signals such as images and audio.

However, as a rule, all of the circuits in the internal circuitry of an appliance such as a television receiver are electrically connected via circuit boards or the like. Accordingly, there is the problem that it is not easy to change the internal circuits.

When a plurality of appliances are connected, such as when a television receiver and a digital VTR are connected, some kind of signal cable is provided and image signals, audio signals, etc., are transferred via this signal cable, though there is the problem of the time and effort required to connect the devices with a signal cable.

It should be noted that while the preceding explanation refers to the example of an image appliance, such as a television receiver, the same problem also exists for various other types of electronic devices.

The present invention was conceived in view of the above situation, and it is an object of the present invention to simplify changes in the functions of apparatuses and the adding of other appliances by making it unnecessary to change the internal wiring or to connect devices with signal cables.

SUMMARY OF THE INVENTION

A signal processing apparatus according to a first aspect of the present invention processes an input signal and includes: a first signal processing unit that has a certain function and processes the input signal; a judging unit that judges whether an expansion second signal processing unit is present; a communication unit that performs data transfers between the first signal processing unit and the expansion second signal processing unit via wireless communication; and a control unit that has the communication unit perform wireless communication to change a processing function for the input signal when the judging unit has judged that the expansion second signal processing unit is present.

With the above signal processing apparatus, by additionally providing the second signal processing unit, data transfers are performed between the signal processing unit inside the apparatus and the expansion second signal processing unit, so that the processing can be changed from processing that is performed by the first signal processing unit only, for example to processing that is performed by the first signal processing unit and the second signal processing unit.

A signal processing apparatus according to a second aspect of the present invention has a predetermined function and processes an input signal, and is a signal processing apparatus that has a plurality of signal processing units and a communication unit that performs data transfers between the plurality of signal processing units via wireless communication.

With the above signal processing apparatus, the signal processing that uses the plurality of signal processing units inside the apparatus is executed with the data transfers between the signal processing units being executed via wireless communication.

The signal processing method according to a first aspect of the present invention includes a signal processing step that has a certain function and processes an input signal, a judging step that judges whether another block has been connected; a transfer step that performs data transfers via wireless communication with a connected block when the judging step has judged that another block has been connected; and a control step that has the transfer step execute data transfers when the judging step has judged that another block has been connected so that the signal processing of the signal processing step is changed to signal processing that uses the connected block.

According to the above signal processing method, when another block is connected, data transfers are performed via wireless communication to the connected block so that the signal processing is changed to processing that uses the connected block.

The signal processing method according to a second aspect of the present invention includes a data transfer step that performs data transfers between a plurality of signal processing blocks via wireless communication and a signal processing step that processes an input signal using the plurality of blocks while data transfers are performed by the data transfer step.

With the above signal processing method, the signal processing of an input signal that uses the plurality of internal signal processing blocks is executed by performing data transfers between the plurality of blocks via wireless communication.

The signal processing system according to the present invention includes a first signal processing apparatus that processes an input signal and a second signal processing apparatus that is an expansion apparatus for the first signal processing apparatus, the first signal processing apparatus including a first signal processing unit that has a certain function and processes the input signal; a judging unit that judges whether the second signal processing unit is present; a first communication unit that performs data transfers between the first signal processing unit and the second signal processing apparatus via wireless communication; and a first control unit that has the first communication unit perform wireless communication to change the processing for the input signal to processing that uses the second signal processing apparatus when the judging unit has judged that the second signal processing apparatus is present, and the second signal processing apparatus including a second signal processing unit that processes the input signal, a second communication unit that performs data transfers between the second signal processing unit and the first signal processing apparatus via wireless communication, and a second control unit that controls the data transfers via the second communication unit and the processing of the signals obtained by these data transfers.

With the above signal processing system, by additionally providing the second signal processing apparatus, data transfers are performed by wireless communication between the signal processing unit in the additional signal processing apparatus and the signal processing unit in the first signal processing apparatus, so that the processing can be changed from processing that only uses the signal processing unit inside the first signal processing apparatus, for example, to processing that uses the signal processing units provided in both of the first and the second signal processing apparatuses.

A program according to the first aspect of the present invention includes a signal processing step that has a certain function and processes an input signal, a judging step that judges whether another block has been connected; a transfer step that performs data transfers via wireless communication with a connected block when the judging step has judged that another block has been connected; and a control step that has the transfer step execute data transfers when the judging step has judged that another block has been connected so that the signal processing of the signal processing step is changed to signal processing that uses the connected block.

According to the above program, when another block is connected, data transfers are performed via wireless communication to the connected block so that the signal processing is changed to processing that uses the connected block.

A program according to the second aspect of the present invention includes a data transfer step that performs wireless communication between a plurality of signal processing blocks and a signal processing step that processes an input signal using the plurality of blocks while data transfers are performed by the data transfer step.

According to the above program, signal processing of an input signal using the plurality of internal signal processing blocks is performed by executing data transfers between the plurality of blocks via wireless communication.

A medium according to the first aspect of the present invention stores a program that has signal processing which processes an input signal executed, and includes a signal processing step that has a certain function and processes an input signal, a judging step that judges whether another block has been connected; a transfer step that performs data transfers via wireless communication with a connected block when the judging step has judged that another block has been connected; and a control step that has the transfer step execute data transfers when the judging step has judged that another block has been connected so that the signal processing of the signal processing step is changed to signal processing that uses the connected block.

By executing the program that is stored on the above medium, when another block is connected, data transfers are performed via wireless communication to the connected block so that the signal processing is changed to processing that uses the connected block.

A medium according to the second aspect of the present invention stores a program that has signal processing that processes an input signal executed, and includes a data transfer step that performs data transfers between a plurality of signal processing blocks via wireless communication, and a signal processing step that processes the input signal using the plurality of blocks while data transfers are performed by the data processing step.

By executing the program that is stored on the above medium, signal processing of an input signal that uses the plurality of internal signal processing blocks is executed by data transfers between the plurality of blocks via wireless communication.

BRIEF DESCRIPTION OF THE DRAWINGS

FIG. 1 is a perspective view showing an embodiment of a bay-construction television receiver according to the present invention.

FIG. 24 is an explanatory figure showing an example where single slot packets and multi-slot packets are mixed along the time axis.

FIGS. 25A and 25B are explanatory figures showing examples of the transfer state between a master and a slave.

FIGS. 26A, 26B, and 26C show examples of the constructions of networks.

FIGS. 27A and 27B are timing charts showing an example of communication on an SCO link.

FIGS. 28A to 28D are timing charts showing an example of communication according to asynchronous transfer.

FIGS. 29A and 29B are timing charts showing an example of communication according to isochronous transfer.

FIGS. 30A to 30D are timing charts showing an example of communication according to broadcast transfer.

FIGS. 31A to 31D are timing charts showing an example of communication when SCO links and ALC links are both used.

FIG. 32 is an explanatory figure showing an example of the composition of clock data.

FIGS. 43A and 43B are explanatory figures showing an example of communication for an inquiry.

FIGS. 45A and 45B are explanatory figures showing an example of communication for a paging.

FIGS. 46A and 46B are timing charts showing an example of processing for a paging.

FIGS. 57A and 57B are explanatory figures showing the processing that is performed independently by the internal signal processing unit and an expansion appliance.

DESCRIPTION OF THE PREFERRED EMBODIMENT

The following describes an embodiment of the present invention. FIG. 1 is a perspective view showing an example construction of an embodiment of a bay-construction television receiver according to the present invention.

A CRT (Cathode Ray Tube) 2 is disposed as an image display means in the center of an upper front-surface part of a television (TV) rack 1 that also serves as the case of the apparatus. Speakers 3L, 3R for the left (L) and right (R) channels are disposed on the left and right sides of the CRT 2.

Six bays 4A, 4B, 4C, 4D, 4E, 4F are provided in the lower part of the front surface of the TV rack 1. Hereinafter, these bays are generically referred to as the "bays 4" whenever there is no need to distinguish between them. The lower part of the TV rack 1 in which the bays 4 are provided may be constructed so that it can be separated from the upper part of the TV rack 1 in which the CRT 2 and the speakers 3L, 3R are provided.

The bays 4 are formed as concaves that can house electronic devices, such as a digital VTR and a DVD player, that operate independently. Bay internal panel parts 5 (described later) are also provided in front surfaces on the insides the bays 4.

A bay 4G that is formed as a concave is also provided in the top surface of the TV rack 1 on the right-hand side. While the bays 4A to 4F are formed as large concaves that can house relatively large electronic appliances such as a digital VTR, the bay 4G is formed as a small concave that can house a relatively small electronic appliance such as a mobile phone or a PDA (personal data assistant).

As one example, the presence of devices in these bays 4A to 4G may be detected from the states of mechanical switches that are provided inside the bays and are switched when a device is inserted. Alternatively, as described later in this specification, power may be supplied from the television receiver main body side, with the presence of a device in a bay being detected from the supply of power to the bay. This is to say, when power has been consumed due to the use of a power supply terminal provided in a bay, it can be judged that an appliance or the like is present in that bay. Alternatively, a controller (described later) inside the television receiver may perform a process for establishing a wireless network between the devices in the TV rack 1 and then determine that the appliances found in the wireless network establishment process are appliances present in the bays.

Figure 2:
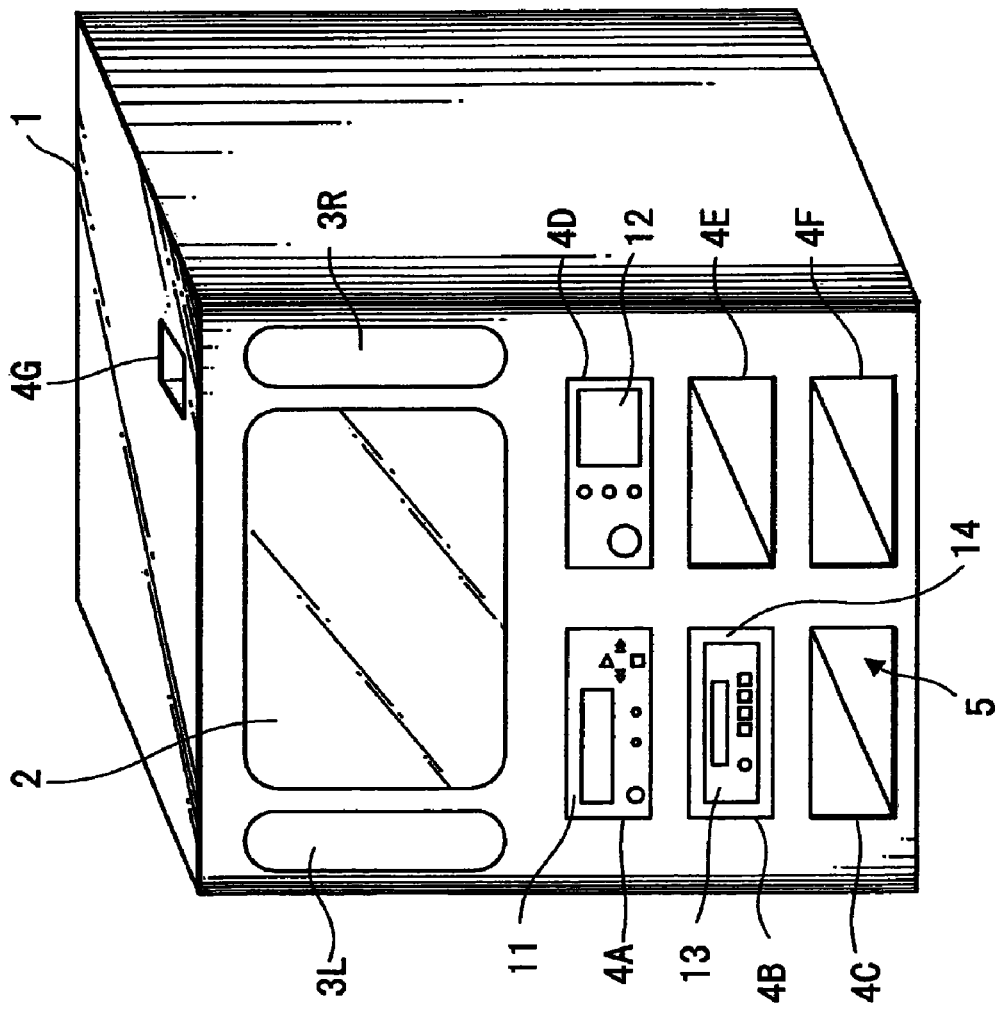
FIG. 2 is a perspective view showing an example of a bay-construction television receiver when electronic appliances have been placed in the bays.

FIG. 2 shows the bay-construction television receiver of FIG. 1 in a state where electronic appliances have been placed in the bays 4. In the example shown in FIG. 2, the electronic appliances 11 and 12 have been directly placed in the bays 4A and 4D, while an electronic appliance 13 that is housed in a bay adapter box 14 has been placed in the bay 4B.

This is to say, the electronic appliances 11 and 12 are electronic appliances that are compatible with the bay-construction television receiver (for example, electronic appliances that are made by the same manufacturer as the bay-construction television receiver), so that these devices can be directly placed within the bays 4 without having to use a bay adapter box 14.

On the other hand, the electronic appliance 13 is an electronic appliance that is not compatible with the bay-construction television receiver (for example, an electronic appliance that is made by a different manufacturer to the bay-construction television receiver), with this device being placed within one of the bays 4 using a bay adapter box 14.

It should be noted that the openings in the bays 4 (and the bay 4G) can be provided with the same kind of cover as is provided over the tape insertion slit of a VTR, for example. In this case, dust and the like can be prevented from getting inside bays 4 in which no electronic appliances have been placed.

Figure 3:
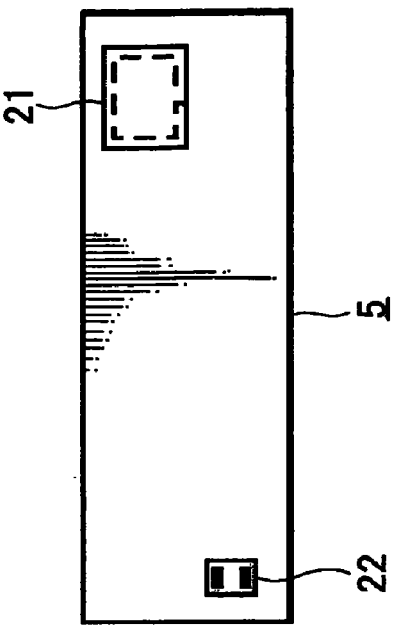
FIG. 3 is a plan view showing an example construction for the bay internal panels.

FIG. 3 is a plan view showing an example construction for the bay internal panel parts 5 that are provided on the internal front surfaces of the bays 4.

An antenna 21 for communication with an electronic appliance or the like that has been placed in the bay 4 and a power terminal 22 that supplies power to the appliance that has been placed in the bay 4 are disposed on the bay internal panel part 5. The antenna 21 is connected to a wireless communication circuit inside the TV rack 1. The power supplied from the power terminal 22 is a commercial AC supply or a low voltage DC supply produced by transforming and rectifying such an AC supply. When wireless communication can be performed with the appliance placed in the bay 4, the antenna 21 does not need to be on the bay internal panel part 5 and can be disposed elsewhere. There is also no need to use a construction where a separate antenna 21 is provided in every bay 4.

It should be noted that other terminals may be provided on the bay internal panel part 5 in addition to the power terminal 22. As examples, input and output terminals for image signals, input and output terminals for audio signals, an IEEE (Institute of Electrical and Electronics Engineers) 1394 Standard port and a USB (Universal Serial Bus) port may be provided.

Also, as necessary an antenna and power terminal may be disposed in a panel part inside the bay 4G at the top of the TV rack 1.

Figure 4:
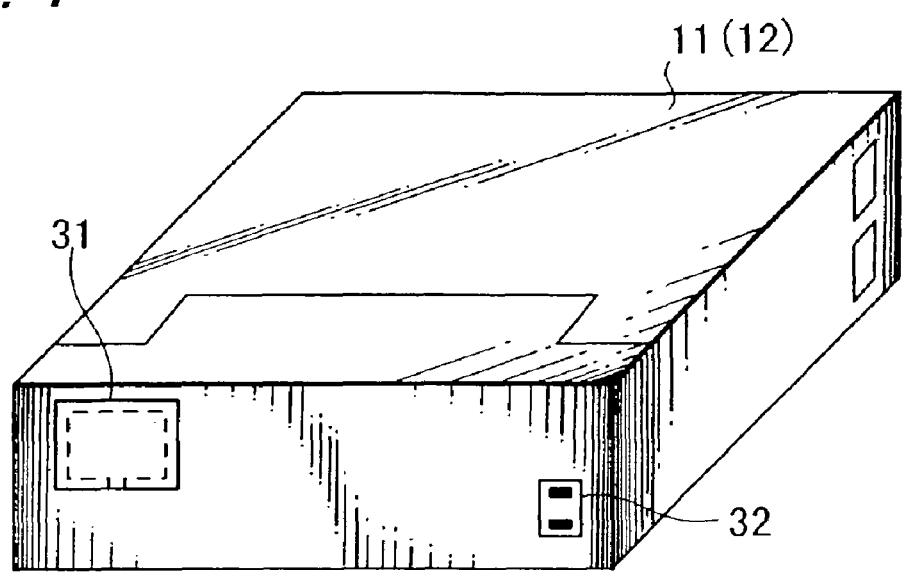
FIG. 4 is a perspective view looking from a rear surface-side of an electronic appliance that is connected.

FIG. 4 is a perspective view looking from behind that shows one example construction of an electronic appliance 11 (12) that is compatible with a bay-construction television receiver.

An antenna 31 and a power terminal 32 are provided on the rear surface panel of the electronic appliance 11. The antenna 31 is connected to a wireless communication circuit inside the electronic appliance 11.

The bays 4 of the bay-construction television receiver are large enough to house the electronic appliance 11, with the power terminals 22 of the bay internal panel parts 5 being disposed at positions so that when the electronic appliances 11, 12 are placed in the bays 4, the power terminals 22 are electrically connected to the power terminals 32 of the electronic appliances 11, 12.

The electronic appliances 11,12 are compatible with a bay-construction television receiver, and since the power terminals 22 of the bay internal panel part 5 are disposed at positions so that when the electronic appliances 11, 12 are placed in the bays 4, the power terminals 22 are electrically connected to the power terminals 32 of the electronic appliances 11,12, the electronic appliances 11,12 can be supplied with power from the bay-construction television receiver by merely placing the electronic appliances 11,12 in the bays 4.

The antennas 21 disposed in the bay internal panel parts 5 and the like are disposed at relatively close positions to the antennas 31 of the electronic appliances, with wireless communication being performed between the antennas 21, 31. By performing such wireless communication, stream data such as image signals, audio signals and various kinds of control signals, etc., are transferred. A detailed description of such wireless communication is given later in this specification.

On the other hand, the electronic appliance 13 is not compatible with the bay-construction television receiver, so that if the electronic appliance 13 is placed directly in a bay 4, the power terminal of the electronic appliance 13 may be disposed in a different position to the power terminal 22 of the bay internal panel part 5 so that there is no guarantee of an electrical connection being made. In most cases, the electronic appliance 13 will not be connected. There is also a high probability of the electronic appliance 13 not being equipped with a function for wireless communication.

By using a bay adapter box 14 with an electronic appliance 13 that is not compatible with the bay-construction television receiver, it becomes possible to connect such an electronic appliance 13 to the bay-construction television receiver.

Figure 5:
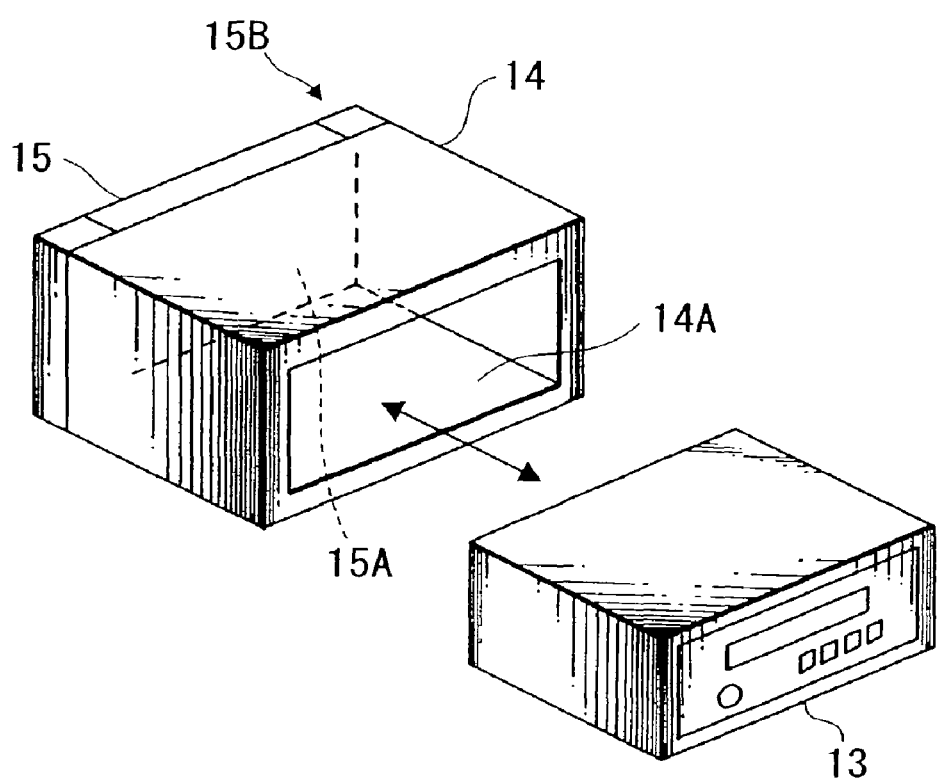
FIG. 5 is a perspective view showing an example construction of a bay adapter box.

FIG. 5 is a perspective view showing one example construction of the bay adapter box 14. A concave slot 14A is provided so that the electronic appliance 13 can be inserted from the front side of the bay adapter box 14. The electronic appliance 13 is electrically connected to the bay-construction television receiver by inserting the electronic appliance 13 in a bay adapter box 14 and placing the bay adapter box 14 in one of the bays 4 of the bay-construction television receiver.

This is to say, a rear surface panel part 15 is provided on a rear surface part of the bay adapter box 14, with the rear surface panel part 15 including an adapter internal connecting panel 15A whose front surface is on the slot 14A side and an adapter rear surface panel 15B whose front side is the rear surface of the bay adapter box 14. This is to say, if the slot 14A of the bay adapter box 14 is the front, the adapter internal connecting panel 15A is provided on the front surface and the adapter rear surface panel 15B is provided on the rear surface.

Figure 6:
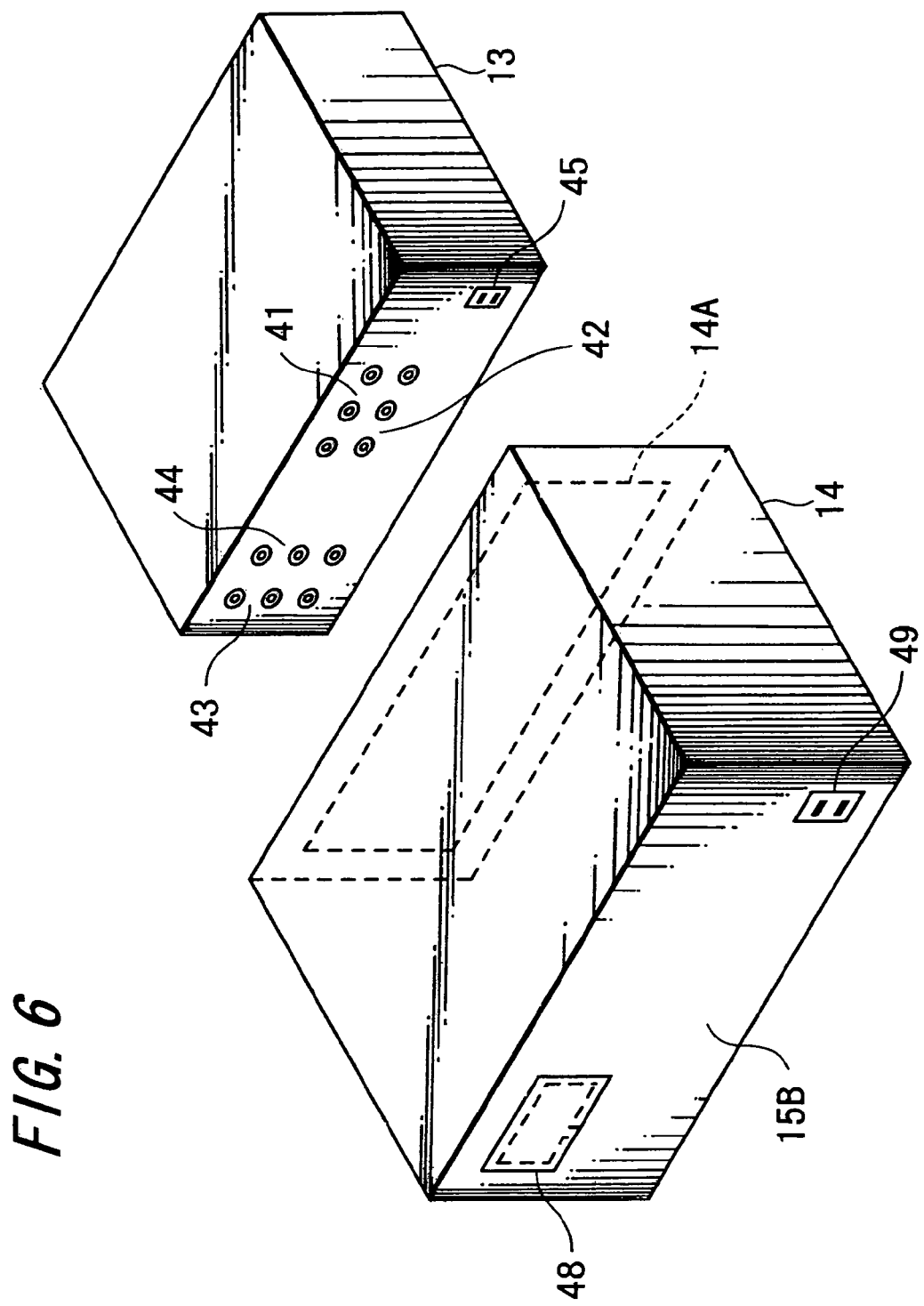
FIG. 6 is a perspective view showing an example construction of a bay adapter box and an electronic appliance.

FIG. 6 is a plan view showing one example construction of the adapter internal connecting panel 15A and the adapter rear surface panel 15B.

The adapter internal connecting panel 15A of the bay adapter box 14 is provided with compatible connection terminals at positions that enable the terminals to be connected with the signal terminals and power supply terminal of the rear panel of an electronic appliance, like the electronic appliance 13, that is not compatible with the bay-construction television receiver (hereinafter, such appliances are referred to as "non-compatible electronic appliances") and so has been inserted into the bay adapter box 14. This is to say, in the example in FIG. 6, an image input terminal 41, an image output terminal 42, an audio input terminal 43, an audio output terminal 44, and a power supply terminal 47 are disposed on the rear surface of the electronic appliance 13. The adapter internal connecting panel 15A is constructed so that when the electronic appliance 13 is placed in the bay adapter box 14, the terminals (not shown in the drawing) of the adapter internal connecting panel 15A connect with these terminals of the electronic appliance 13.

An antenna 48 and a power supply terminal 49 are disposed on the adapter rear surface panel 15B of the bay adapter box 14. A wireless communication circuit, which performs processing that has signals that have been outputted from the signal terminals of the non-compatible electronic appliance 13 wirelessly transmitted from the antenna 48 and processing that receives wireless signals via the antenna 48 and has these signals inputted into the signal terminals of the non-compatible electronic appliance 13, is provided inside the bay adapter box 14.

In this way, by placing the bay adapter box 14 of the above construction in which a non-compatible electronic appliance 13 has been placed into a bay 4, the power supply terminal of the bay internal panel part 5 of the bay 4 connects to the power supply terminal 49 of the bay adapter box 14, so that power is supplied from the bay-construction television receiver to the non-compatible electronic appliance 13 via the bay adapter box 14. The wireless communication circuit in the bay adapter box 14 also operates off this power supply.

Stream data of image signals and audio signals and control signals are transferred by wireless communication between the bay-construction television receiver and the bay adapter box 14 and are transferred between the bay adapter box 14 and the non-compatible electronic appliance 13 directly via the connected terminals.

Figure 7:
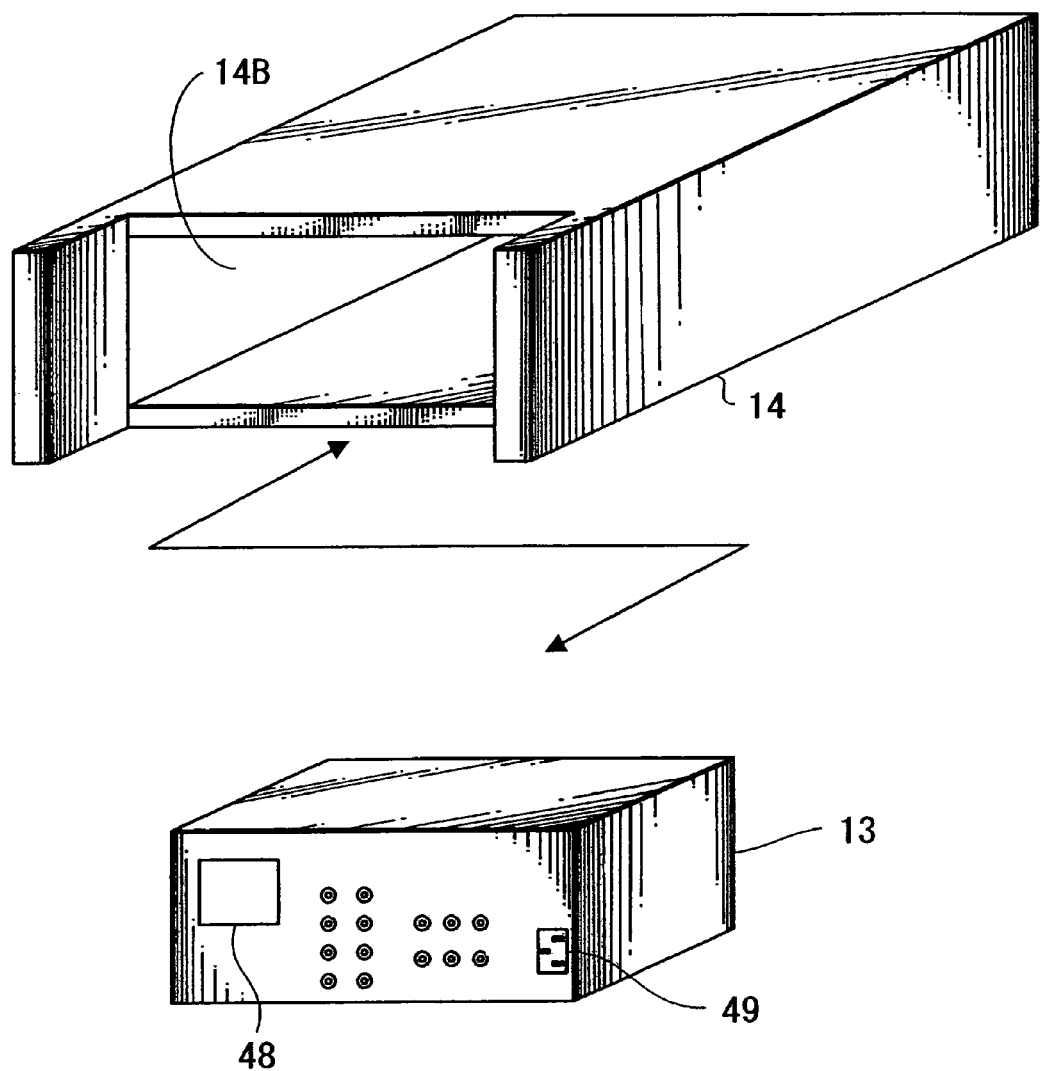
FIG. 7 is a perspective view showing an example of a bay adapter box that can be detachably attached to the rear surface panel part.

FIG. 7 shows a different example construction of a bay adapter box 14 to FIG. 6. In the example shown in FIG. 7, an antenna 48 and a power supply terminal 49 are disposed on the rear surface of the non-compatible electronic appliance 13. Input terminals and output terminals for image signals and audio signals, etc., are also disposed on this rear surface. In this example, the size of the electronic appliance 13 does not match the size of the bays 4, but when the electronic appliance 13 has been placed in the slot 14B of the bay adapter box 14, the non-compatible electronic appliance 13 can be attached to the bay 4 by placing the bay adapter box 14 in the bay 4. In the present example, the slot 14B in the bay adapter box 14 of the present example is formed so as to pass through the bay adapter box 14 from the front to the rear, so that the panel part on the rear surface of the non-compatible electronic appliance 13 is exposed.

With the construction shown in FIG. 7, so long as the position of the power supply terminal 49 matches the position of the power supply terminal of the bay 4, the electronic appliance 13 can be properly connected. The transferring of image signals, audio signals, etc., is performed via wireless communication.

Figure 8:
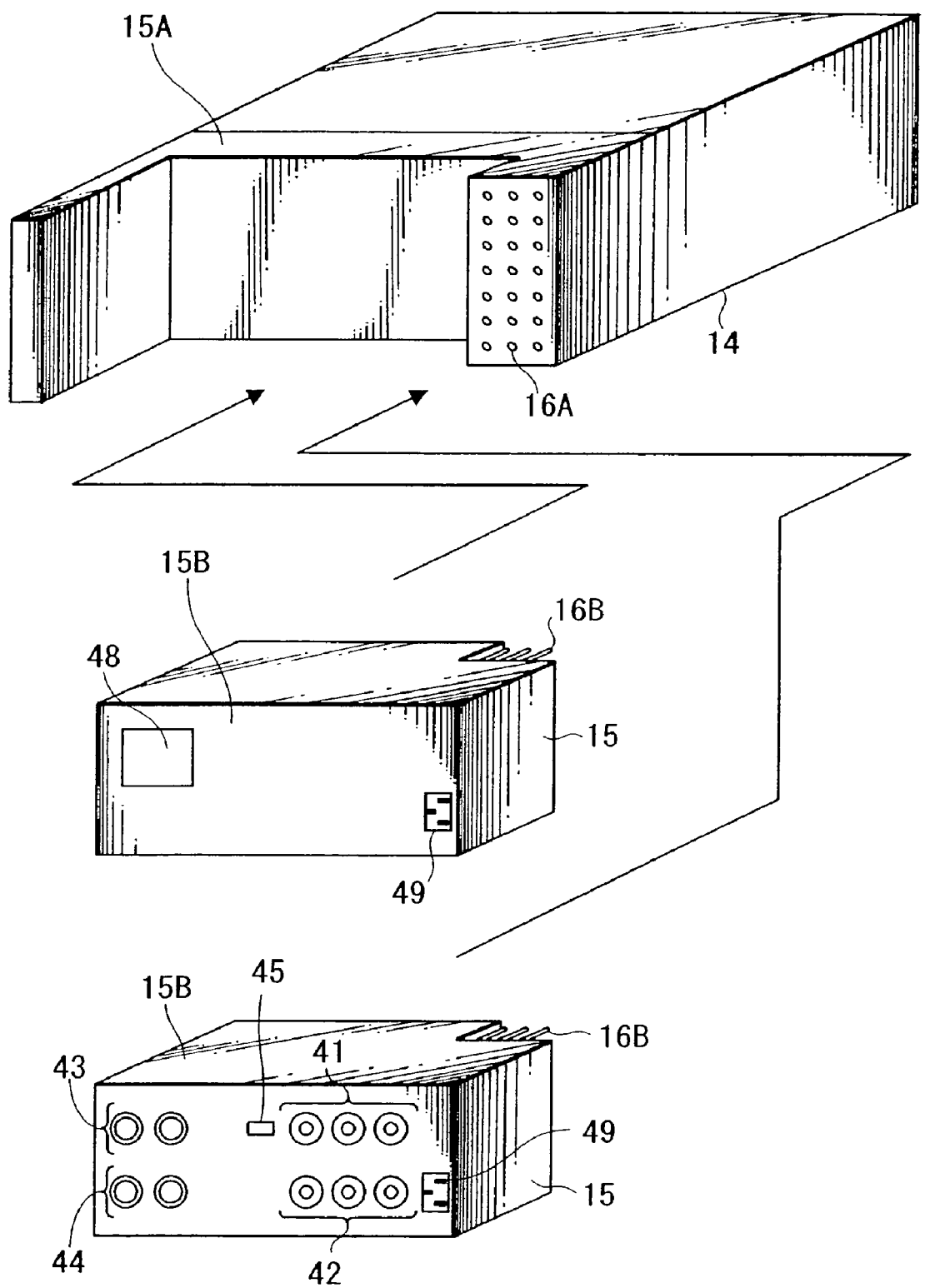
FIG. 8 shows an example of a bay adapter box whose adapter rear surface panel can be detachably attached and exchanged.

FIG. 8 shows yet another example construction for the bay adapter box 14. In this example, the rear surface panel part 15 of the bay adapter box 14 is constructed so that the adapter internal connecting panel 15A and the adapter rear surface panel 15B can be separated from one another. Two types of adapter rear surface panel 15B, which is to say, an adapter rear surface panel 15B in which an antenna 48 and a wireless communication circuit that perform wireless communication are included and an adapter rear surface panel 15B' on which various terminals (the image input terminal 41, the image output terminal 42, the audio input terminal 43, the audio output terminal 44, an IEEE 1394 port 45, etc.) are disposed, are provided. The rear surface panel to be used is selected depending on the type of bay 4 into which the non-compatible electronic appliance 13 is to be placed. Both rear surface panels 15B and 15B' are provided with a power supply terminal 49.

In the example in FIG. 8, the adapter rear surface panels 15B, 15B' that can be separated are each provided with a male pin group 16B composed of a plurality of male pins, with the bay adapter box 14 being provided with a female pin group 16A composed of a plurality of female pins. When the adapter rear surface panel 15B or 15B' is attached to the bay adapter box 14, each of the male pins that composes the male pin group 16B of the adapter rear surface panel 15B or 15B' fits into a corresponding female pin that composes the female pin group 16A of the bay adapter box 14, so that the adapter rear surface panel 15B or 15B' is electrically connected to the adapter internal connecting panel 15A of the bay adapter box 14.

In a television receiver of the construction described above where image signals and audio signals are transferred via wireless communication to and from the electronic appliances that are placed in the bays 4 as shown in FIG. 1, the adapter rear surface panel 15B that performs wireless communication is connected to the adapter internal connecting panel 15A of the bay adapter box 14 and is attached to a bay. Also, though not shown in the drawings, in a television receiver of the construction described above where image signals and audio signals are transferred to and from the electronic appliances that are attached to the bays 4 via terminals in the bays, the adapter rear surface panel 15B' on which the terminals 41 to 45 are disposed is connected to the adapter internal connecting panel 15A of the bay adapter box 14 and is attached to a bay with terminals.

Figure 9:
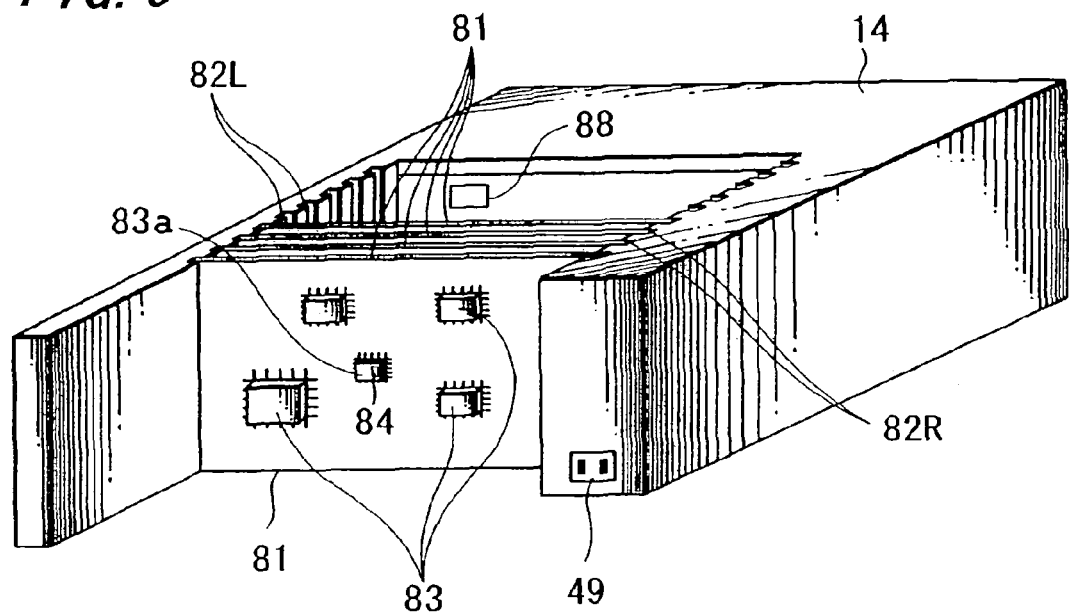
FIG. 9 is a perspective view showing an example of a bay adapter box that to which expansion circuit board can be attached.

The following describes an example construction of a television receiver that includes bays 4 where the number of circuit boards is increased by using a bay adapter box 14. As shown in FIG. 9, a space where circuit boards can be disposed is provided on the rear surface of the television receiver as the bay adapter box 14, with insertion slits 82L, 82R into which one or a plurality of circuit boards can be inserted are provided in walls positioned on the left and right sides of this space. A power supply terminal 49 is provided on the rear end of the bay adapter box 14. Though not shown in the drawing, a slot 14A is provided in the front surface of the bay adapter box 14 as in FIG. 6, so that electronic appliances 13 and the like can be attached. Alternatively, a construction that does not include a slot 14A may be used as an adapter to which only printed circuit boards can be attached. When a slot 14A is provided, the bay adapter box 14 is provided with an antenna 88 that is connected to a wireless communication circuit for wirelessly transferring signals that are inputted and outputted from the electronic appliance attached to the slot 14A.

In FIG. 9, an example in which four circuit boards 81 have been inserted into the insertion slits 82L, 82R is shown. On each of these circuit boards 81, a plurality of chip components (integrated circuits) 83 are disposed as signal processing means that execute certain signal processing on inputted signals, with these chip components 83 being connected by conductive patterns formed on the circuit boards 81. One chip component 83a out of the plurality of chip components 83 is a transmission/reception processing circuit that executes wireless communication processing for transferring data, with an antenna 84 being attached to this chip component 83*a*.

Figure 10:
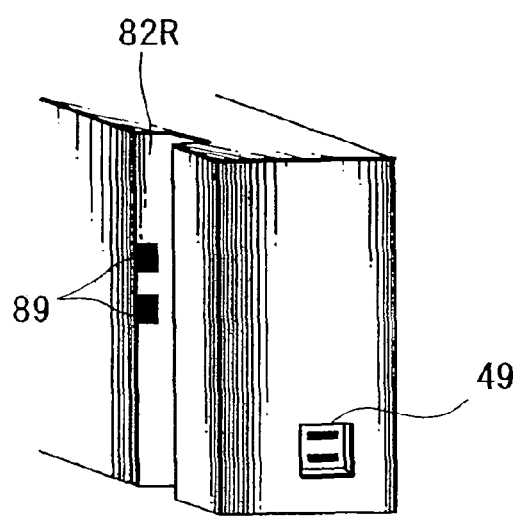
FIG. 10 is a perspective view showing the main parts of the bay adapter box of the example shown in FIG. 9.

A power supply obtained by the power supply terminal 49 is supplied to each of the circuit boards 81 from the bay adapter box 14. This is to say, as shown in FIG. 10 for example, the insertion slit 82R has a conductive part 89 that is electrically connected to the power supply terminal 49 so that when a circuit board 81 is inserted into the insertion slit 82R, the conductive pattern for supplying power that is provided on the circuit board 81 is connected to this conductive part 89, resulting in power being supplied to the circuit board 81.

In the example in FIG. 9, one circuit board 81 is provided with a transmission/reception processing circuit and data transfers are performed by wireless communication with the periphery of the circuit board, though one circuit board 81 may be provided with a plurality of wireless communication circuits with data transfers between the plurality of chip components on the circuit board 81 being performed via wireless communication.

Figure 11:
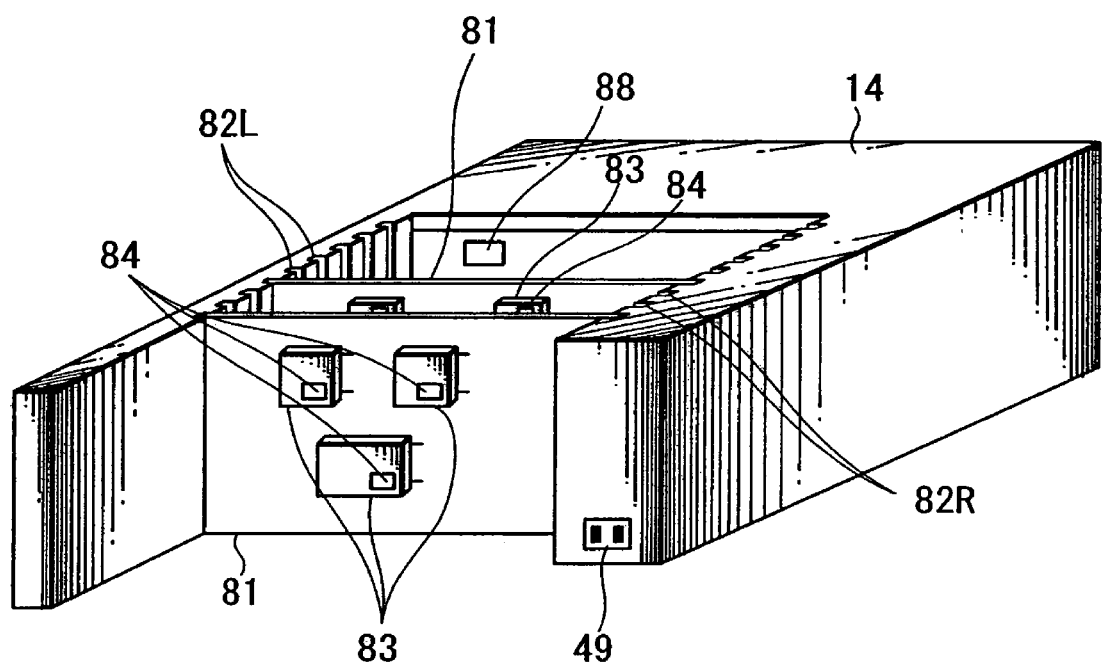
FIG. 11 is a perspective view showing another example of where an expansion circuit board is attached to a bay adapter box.

This is to say, as shown in FIG. 11 for example, the respective chip components 83 disposed on a single circuit board 81 may be set as a circuit block that includes a function as a wireless communication circuit in addition to a function for certain signal processing with each of the chip components 83 being provided with an antenna 84 so that not just the transfers of data to and from the periphery of the circuit board 81 but also some or all of the data transfers within the circuit board 81 may be performed wirelessly.

It should be noted that while a construction where circuit boards are additionally provided using a bay adapter box 14 has been described, it is also possible for the circuit boards provided inside the television receiver, for example, to be provided with wireless communication circuits and for the transfers of data that involve these circuit boards to be performed via wireless communication. In addition, the circuit boards provided inside the electronic appliances 11, 12 placed in the bays 4 may also be provided with wireless communication circuits and the transfers of data that involve these circuit boards may be performed via wireless communication.

When an appliance or circuit board that is equipped with a wireless communication circuit is assigned an absolute appliance ID for the appliance, etc., and the wireless network (described later) is established, the appliance ID is used to identify the appliance or circuit board. Aside from an absolute appliance ID, each appliance or circuit board also stores a function ID showing what kind of signal processing is performed by this appliance or circuit board, so that by sending these function IDs to other appliances on the network, a controller or the like in the television receiver can judge which functions can be executed by the appliances or circuit boards present in the bays 4.

The following describes the construction of this kind of bay-construction television receiver, to which appliances and circuit boards can be additionally attached using the bays, from the viewpoint of signal processing. In the case of the example television receiver shown in FIG. 12, the transferring of data between the internal circuit boards (and/or within the circuit boards) is also performed via wireless communication. In the example in FIG. 12, a construction is given where wireless communication is used to the highest extent and data transfers via signal lines have been minimized, though the data transfers between some of the blocks that are performed wirelessly may instead be performed as data transfers on signal lines. It should be noted that the circuits and antennas that perform the wireless communication processing are incorporated into each circuit block, and so have not been illustrated in FIG. 12.

Figure 12:
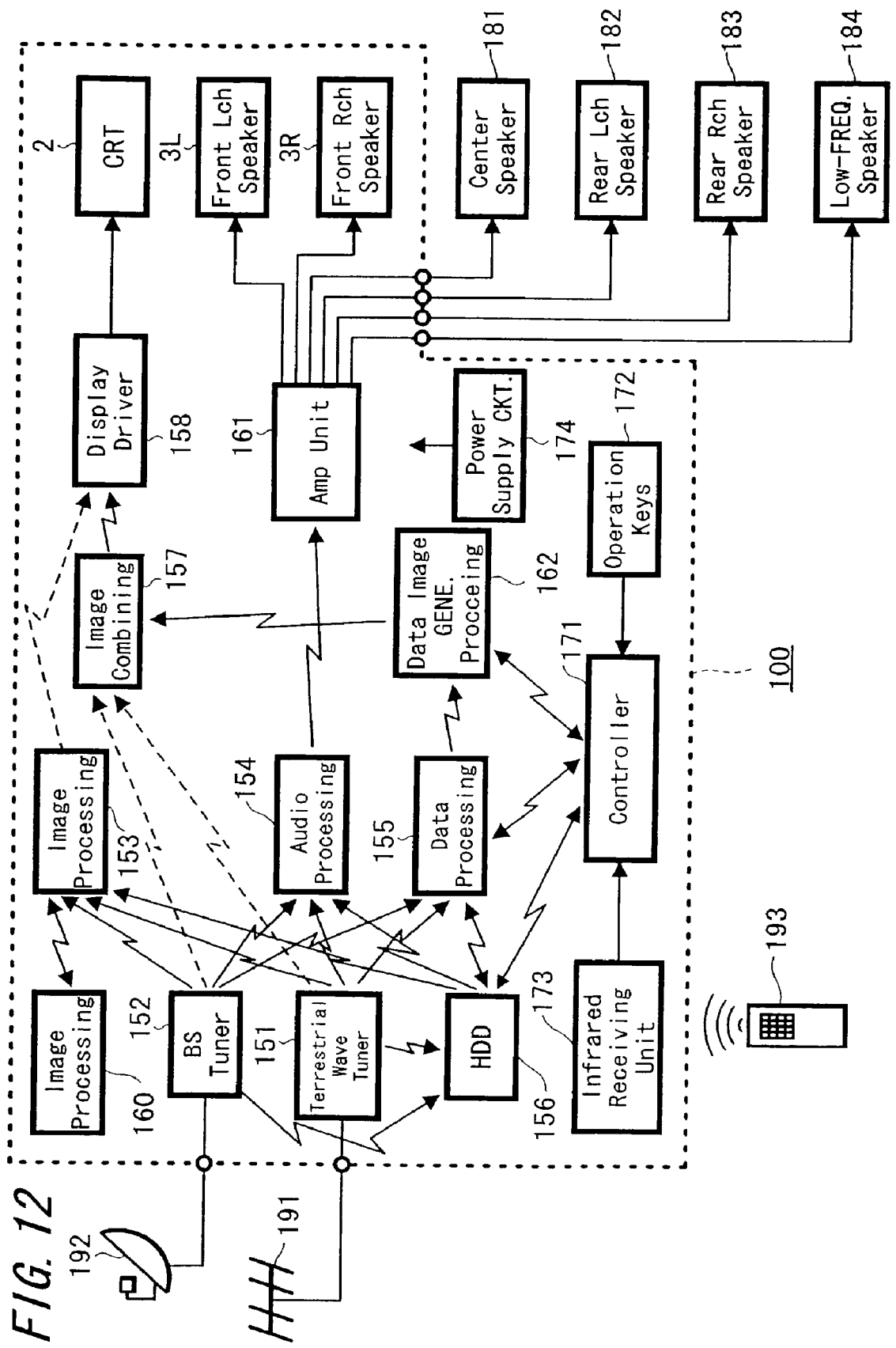
FIG. 12 is a block diagram showing an example construction of a television receiver according to an embodiment of the present invention.

Also, the construction in FIG. 12 is an example of where appliances or circuit boards have been additionally provided, with there being no indication in the drawing of which of the signal processing blocks are the blocks composed of the additional appliances and circuit boards in the bays. However, blocks that realize additional functions aside from the circuit blocks required as a minimum for receiving images may all be composed of appliances or circuit boards that have been additionally attached.

The construction of the television receiver 100 shown in FIG. 12 is described below. The television receiver 100 includes a terrestrial wave tuner 151 and a satellite broadcast tuner 152. The terrestrial wave tuner 151 is connected to a terrestrial wave antenna 191, while the satellite broadcast tuner 152 is connected to a satellite broadcast antenna 192. The reception channels of these tuners 151, 152 are set according to control data that is wirelessly transferred from the controller 171.

The image signal in a television broadcast signal received by the tuner 151 or 152 is wirelessly transferred to an image processing unit 153, the audio signal is wirelessly transferred to an audio processing unit 154, and when various kinds of other data are included in the broadcast signal, such data is wirelessly transferred to a data processing unit 155.

The image processing unit 153 executes image processing that processes the image signal for display. As one example, when the image signal has been compressed according to a certain format, the image processing unit 153 performs decompression processing. Image processing, such as processing for raising the image quality of the displayed images and video is also executed. When doing so, as necessary the image signal is wirelessly transferred to another image processing unit 160, with the image signal that has been processed by this image processing unit 160 being sent back to the image processing unit 153. By performing processing using the image processing unit 160, there are effects such as the ability to obtain a higher quality image signal or the ability to handle image signals in a different format. An example of when a plurality of such image processing units are used is given later in this specification.

The image signals that have been processed by the image processing unit 153 and the image processing unit 160 are wirelessly transmitted to an image combining processing unit 157 or a display driver 158. When image combining is required, the image signals are transferred to the image combining processing unit 157, but when image combining is not required, the image signals are transferred directly to the display driver 158.

The image combining processing unit 157 executes processing that combines a plurality of images and has them displayed as a single image, with the resulting image signals being wirelessly transferred to the display driver 158. Based on the transferred image signals, the display driver 158 generates signals to be supplied to the electron gun of the CRT 2 and also generates signals that drive the deflecting system (not illustrated) so as to have images displayed on the screen of the CRT 2.

The audio processing unit 154 executes audio processing that processes audio signals for output. As one example, when there are multi-channel audio signals, the audio processing unit 154 performs processing that decodes the audio signals for each channel. The audio signals for each channel that have been processed by the audio processing unit 154 are wirelessly transferred to an amp unit 161 that amplifies, etc., the signals in order to drive the speakers and supplies the amplified audio signals to the speakers for each channel. Here, the amp unit 161 has sufficient performance for processing audio signals in what is called "5.1 channel format" where there are right and left front channels, a center channel, right and left rear channels, and a dedicated low-frequency channel.

The audio signals for the front left (L) and right (R) channels outputted by the amp unit 161 are respectively supplied to the speakers 3L and 3R for these channels that are incorporated in the television receiver 100 and are outputted. The audio signals for the center channel, the audio signals for the rear left (L) and right (R) channels, and the audio signals for the low-frequency channel are respectively supplied to speakers 181, 182, 183, 184 that are connected to speaker terminals of the television receiver 100 and are outputted.

When data aside from images and audio is included in the received broadcast signals, the data processing unit 155 receives the data, performs processing, such as processing that demodulates the data, and extracts certain data based on instructions that are transferred from the controller 171. The data that has been demodulated and extracted by the data processing unit 155 is wirelessly transferred to a data image generation processing unit 162 as necessary and image signals for displaying a certain data screen are generated based on control by the controller 171. As one example, where electronic program information is included as data included in a broadcast signal, an image signal for a data screen that displays a program guide is generated based on received program information. The generated image signals are wirelessly transferred to the image combining processing unit 157 where the image signals are combined with the images in the image signals from the image processing unit 153 and processing that displays data screens of a certain format is performed.

The television receiver 100 of the present example includes a hard disk drive (HDD) 156 and the broadcast signals received by the tuner 151 or 152 are recorded on a hard disk included in the HDD 156. Signals that have been recorded can be read out and transferred to the image processing unit 153, the audio processing unit 154, the data processing unit 155, etc. The HDD 156 transfers data to the various processing units via wireless communication.

The controller 171 provided in the television receiver 100 of the present example is supplied with operation instructions from operation keys 172 and with instructions based on infrared signals (remote control signals) that have been received by an infrared receiving unit 173, and controls the operations of the various parts of the television receiver 100. The transferring of instructions from the controller 171 to the various processing units is also performed via wireless communication. The controller also receives data on the processing states of the various processing units via wireless transfers. The infrared receiving unit 173 receives remote control signals transferred from a remote control apparatus 193 for the television receiver 100 as infrared signals.

As one example, the controller 171 may also function as a controller for the wireless communication network that is required in order to perform wireless communication. This is to say, when a plurality of wireless communication units are provided within a single appliance as in the present example, a wireless communication network may be constructed with one wireless communication unit as a master and other wireless communication units as slaves that perform wireless communication under the control of the master. In this case, the master needs to manage such communication, though the controller 171 may also fulfill the role of this master. Alternatively, another wireless communication unit may act as the master. Wireless communication networks are described in detail later in this specification.

The controller 171 also detects whether an appliance or circuit board has been placed in each bay 4 and appropriately sets the signal processing state in the television receiver based on the functions of the appliances and circuit boards it has detected. As described above, the detection of whether an appliance or circuit board has been placed to each bay 4 may be performed based on the state of switches for detecting the presence of an appliance or circuit board provided in each bay 4, or based on whether power is being supplied to an appliance or circuit board in each bay, or processing for establishing a wireless network may be performed and the appliances and circuit boards detected in the establishment process for the wireless network may be judged as being present in the bays 4.

It should be noted that a power supply circuit 174 is provided inside the television receiver 100 so as to supply a low voltage DC signal or the like, which is produced by transforming and rectifying a commercial AC power supply, to every processing unit in the television receiver. When doing so, power from the power supply circuit 174 is also supplied via the power supply terminals to the appliances and circuit boards placed in the bays.

The transferring of data by the various units inside this television receiver 100 is performed by wireless communication, so that a corresponding reduction can be made in the amount of internal wiring in the television receiver 100. The television receiver of the present example is the bay-construction television receiver shown in FIGS. 1 and 2, with some of the processing units being electronic appliances and circuit boards that are placed in the bays. In this case too, there is no need to directly connect the electronic appliances and circuit boards that are attached to the bays to the processing units inside the television receiver 100 using signal lines, which makes it easy to attach appliances and circuit boards.

In the construction shown in FIG. 12, the transfer of audio signals from the television receiver 100 to external speakers is performed using signal lines, though such transfers to the external speakers may also be performed as wireless transfers.

Figure 13:
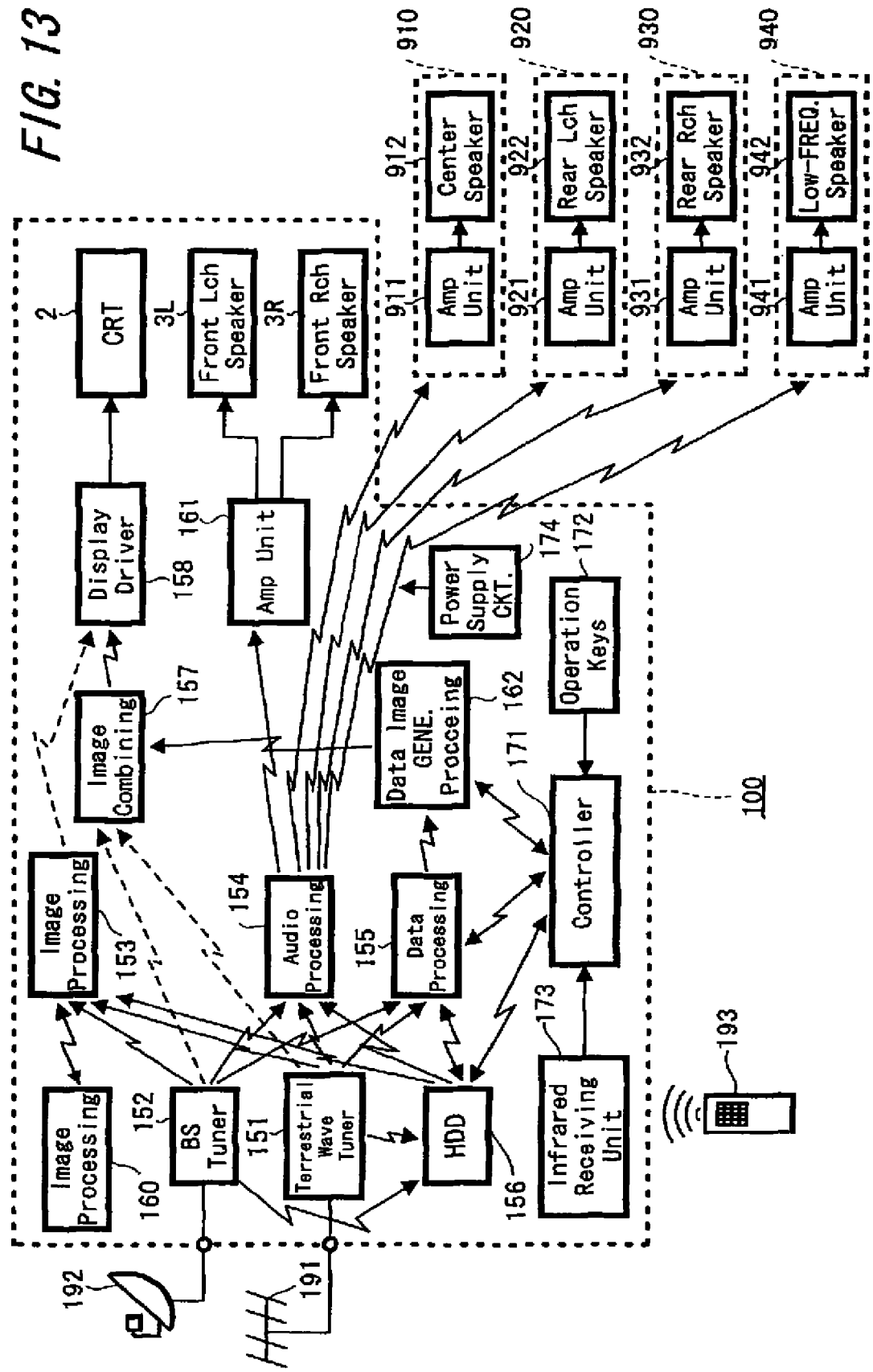
FIG. 13 is a block diagram showing another example construction of a television receiver according to an embodiment of the present invention.

This is to say, as shown in FIG. 13 for example, devices that respectively include amp units 911, 921, 931, 941 with built-in wireless communication units for receiving wireless signals and speakers 912, 922, 932, 942 that output signals that have been amplified by the respective amp units may be provided as external speaker apparatuses 910, 920, 930, 940. Audio signals for the front left and right channels are wirelessly transferred from the audio processing unit 154 to the amp unit 161 in the television receiver 100, and audio signals for other channels are wirelessly transferred from the audio processing unit 154 to the amp units 911 to 941 of the external speaker apparatuses 910 to 940. With this arrangement, it becomes no longer necessary to connect the television receiver 100 and the external speaker apparatuses with signal lines.

In this case, if the transfer method used for the wireless transfers from the audio processing unit 154 in the television receiver 100 to the amp unit 161 in the television receiver 100 is the same as the transfer method used for the wireless transfer from the audio processing unit 154 to the external speaker apparatuses 910-940, wireless transfers of the signals for every channel can be performed using a single wireless communication processing circuit provided in the audio processing unit 154. Also, if the same wireless transfer method is used, the control signals from the controller 171 in the television receiver can be transferred to the external speaker apparatuses 910 to 940, so that for example, control over the output volume and the switching on and off of the speaker apparatuses 910 to 940 can be performed by the controller 171 in the television receiver. The remaining parts of the television receiver 100 shown in FIG. 13 have the same construction as in the television receiver 100 shown in FIG. 12.

In the example shown in FIG. 12, the remote control signals from the remote control apparatus 193 are wirelessly transferred to the television receiver 100 via infrared signals, though the remote control signals from the remote control apparatus 193 may instead be wirelessly transferred using the same wireless transfer method as is used inside the television receiver 100.

Figure 14:
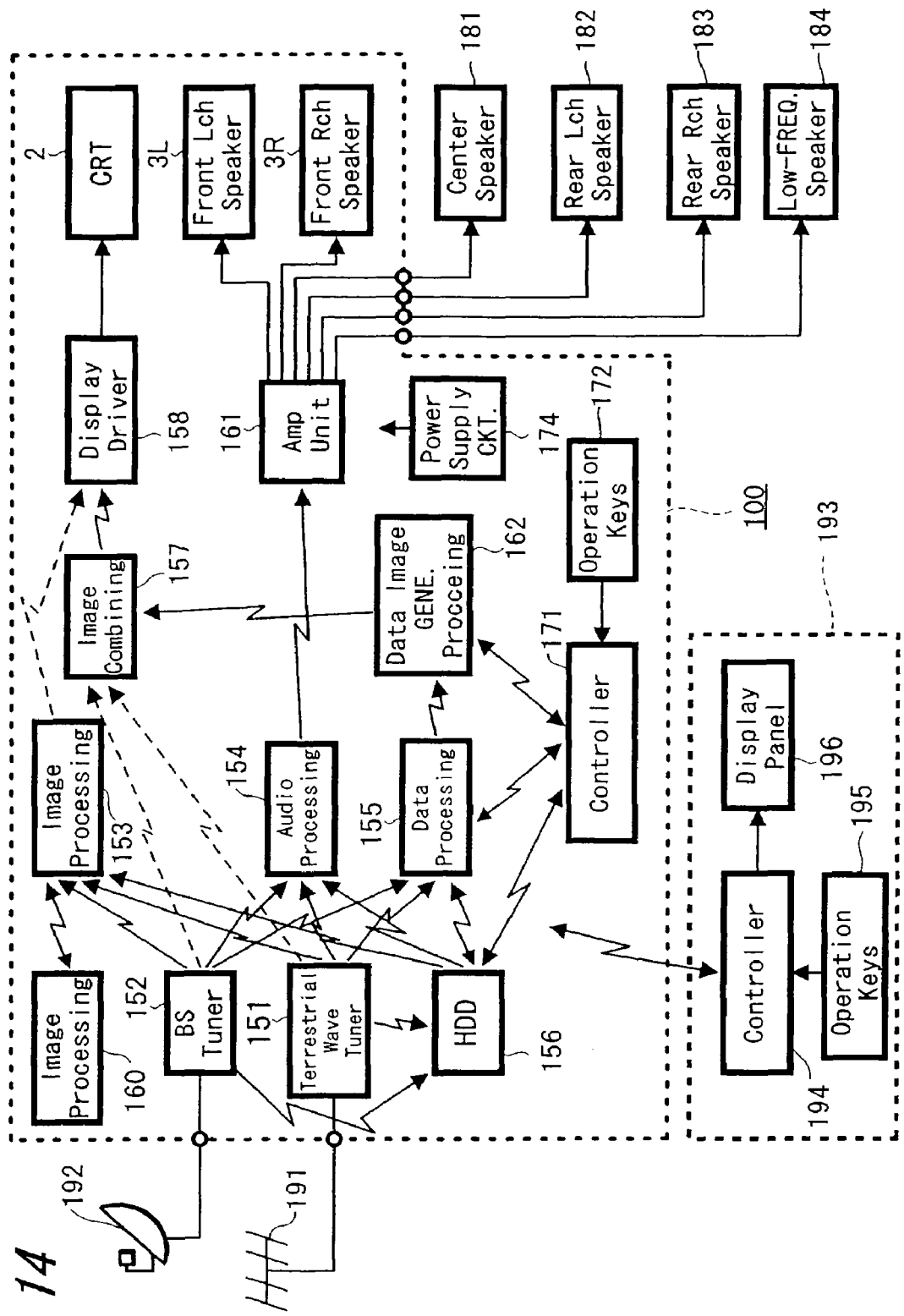
FIG. 14 is a block diagram showing yet another example construction of a television receiver according to an embodiment of the present invention.

FIG. 14 shows one example construction of the television receiver 100 in this case. The remote control apparatus 193 includes a controller 194 with a built-in wireless communication circuit, and when operation instructions from operation keys 195 are supplied, remote control signals based on these operation instructions are wirelessly transferred to the controller 171, etc., in the television receiver 100. A display panel 196 that displays text, numbers, images, etc. according to control by the controller 194 is also provided in the remote control apparatus 193.

When the construction shown in FIG. 14 is used, it is customary for the wireless signals from the controller 194 in the remote control apparatus 193 to be transferred to the controller 171 in the television receiver 100 and for various types of control to be performed in the television receiver 100 via the controller 171, though in some cases, control instructions may be wirelessly transferred to the various signal processing units in the television receiver 100 directly from the controller 194 in the remote control apparatus 193. As one example, when a channel switching key in the operation keys 195 of the remote control apparatus 193 has been operated, the controller 194 may wirelessly transfer a channel switching instruction directly to the tuner 151 or 152 so that the operation of the tuner is controlled by the remote control apparatus 193.

The controller 194 inside the remote control apparatus 193 may be used as the master that is required for establishing a wireless communication network in the television receiver 100, with the various units inside the television receiver 100 performing wireless communication under the control of the controller 194. As one example, when the controller 171 in the television receiver 100 is incapable of executing control over the wireless communication between the expansion appliances and circuit boards that have been provided, the controller 194 of the remote control apparatus 193 may execute control over wireless communication between an expansion appliance or circuit board that has been attached and the processing unit inside the television receiver. The other parts of the television receiver 100 shown in FIG. 14 have the same construction as in the television receiver 100 shown in FIG. 12.

Next, the following describes example constructions of the various signal processing units in the television receiver 100 of the present example that are equipped with a wireless communication function. The signal processing unit equipped with a wireless communication function in the following description can apply to the single processing unit that is provided from the outset in the television receiver 100 and to signal processing units that are constructed as expansion appliances or circuit boards that are placed in the bays.

Figure 15:
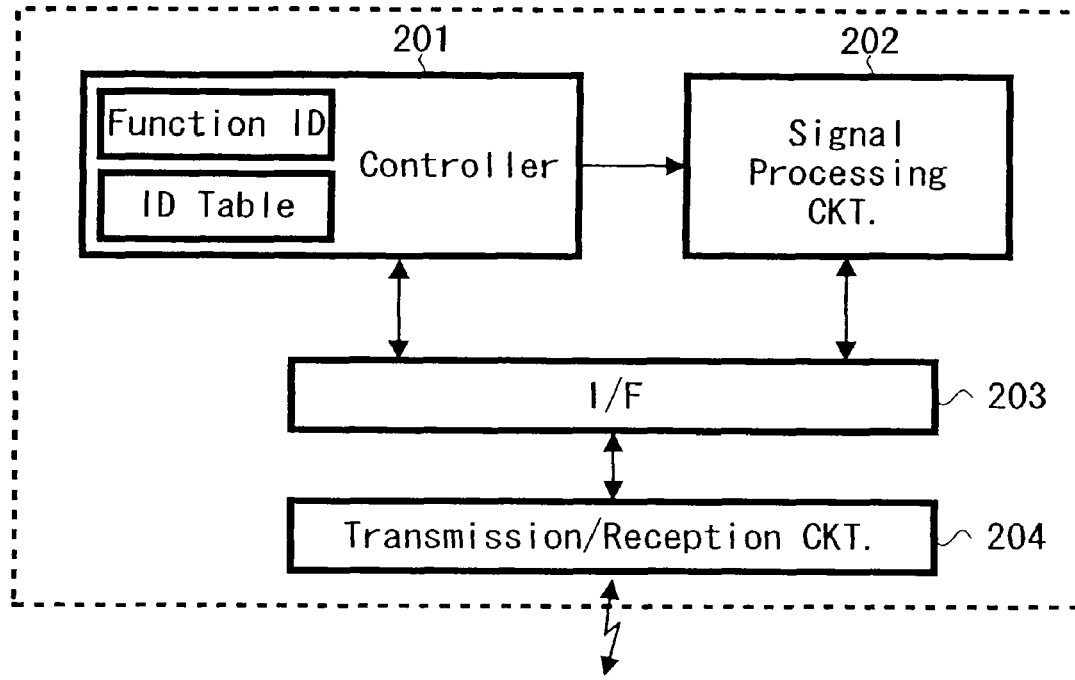
FIG. 15 is a block diagram showing an example construction of a single processing unit.

FIG. 15 shows an example construction of a signal processing unit that is provided in (or added on to) the television receiver 100. In the present example, the signal processing unit includes a controller 201 that controls the signal processing within the signal processing unit, a signal processing circuit 202 that performs the actual signal processing under the control of the controller 201, an interface unit 203, and a transmission/reception processing circuit 204. The interface unit 203 is a circuit that performs interface processing for data transfers between the controller 201/the signal processing circuit 202 and the transmission/reception processing circuit 204. When this signal processing unit performs an input or output via wired signal lines, the input processing and output processing are also executed by the interface unit 203.

The controller 201 stores a function ID and an ID table. The function ID is a unique ID (Identification) that indicates which functions the signal processing circuit 202 has, while the ID table associates function IDs with processing information that is described later.

As one example, when the signal processing circuit 202 is applied to the image processing unit 153, the signal processing circuit 202 is assumed to have a function for converting the image signal of a composite signal into an image signal of a component signal and a function for converting an image signal with standard definition (hereinafter, referred to as an SD (Standard Definition) image signal) to an image signal with high definition (hereinafter, referred to as an HD (High Definition) image signal.) However, the functions of the signal processing circuit 202 can be changed according to control by the controller 201.

Figure 16:
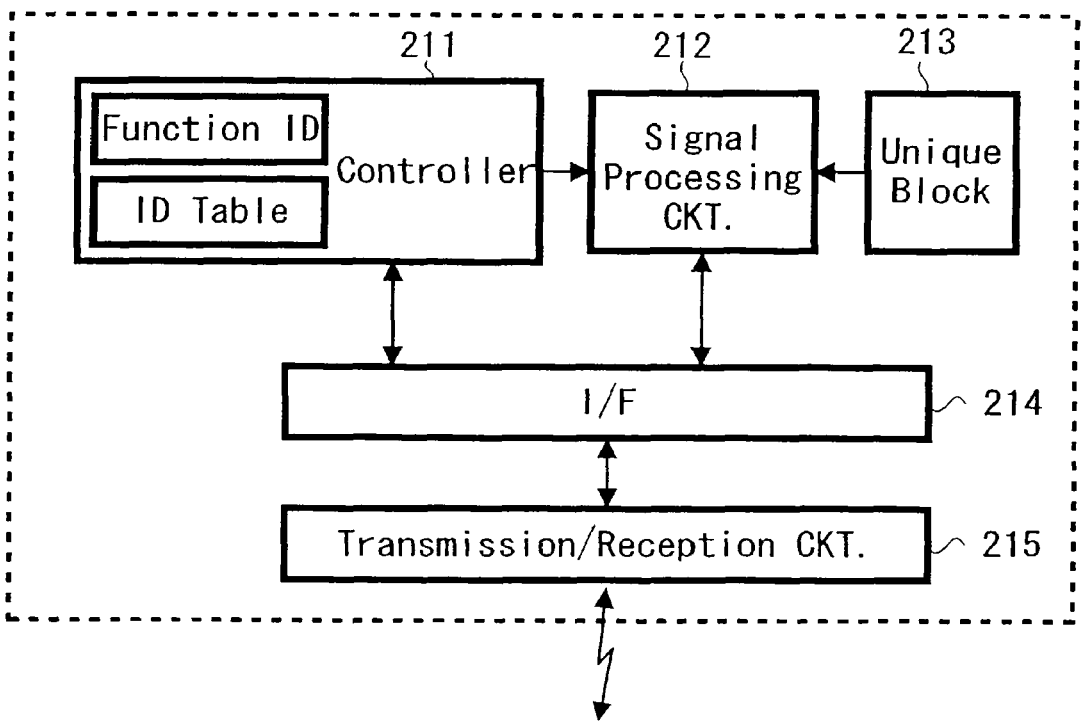
FIG. 16 is a block diagram showing an example construction of a single processing unit.

The construction shown in FIG. 16 may also be used when a signal processing unit is provided as an expansion appliance that is placed in a bay 4 of the television receiver 100. The signal processing unit shown in FIG. 16 is an example that functions as the image processing unit 160 of the television receiver 100 shown in FIG. 12.

As shown in FIG. 16, this signal processing unit includes a controller 211 that controls signal processing in the processing unit, a signal processing circuit 212 that performs the actual signal processing under the control of the controller 211, a unique block 213 that supplies signals to the signal processing circuit 212, an interface unit 214, and a transmission/reception processing circuit 215. The interface unit 214 is a circuit that performs interface processing for data transfers between the controller 211/the signal processing circuit 212 and the transmission/reception processing circuit 215, while the transmission/reception processing circuit 215 performs transmission processing and reception processing of wireless signals. When inputs and outputs are performed by this signal processing unit via wired signal lines, the input processing and output processing are executed by the interface unit 214.

The controller 211 stores a function ID and an ID table. The function ID is a unique ID (Identification) that indicates which functions the signal processing circuit 212 and the unique block 213 have, while the ID table associates function IDs with processing information that is described later.

The unique block 213 is a block that is unique to the appliance that composes this signal processing unit, and in the case of an electronic appliance that composes a DVD player, for example, the unique block 213 includes an optical pickup and the like that shines laser light onto a DVD (not illustrated), receives reflected light, and performs a photoelectric conversion. In the case of a digital VTR, the unique block 213 includes a driving mechanism for driving a video tape and a magnetic head or the like for recording/reproducing signals onto and from video tape.

When a DVD player or digital VTR composes this kind of unique block 213, the signal processing circuit 212 has a function for MPEG-decoding signals that have been encoded according to MPEG (Moving Pictures Experts Group). Additionally, the signal processing circuit 212 has a function for performing processing that raises the spatial definition, for example.

With the signal processing units shown in FIGS. 15 and 16, wireless communication is performed with the periphery of the signal processing unit, though a construction where wireless communication is also performed for the data transfers within the signal processing unit may be used. This corresponds to the case where as shown in the example in FIG. 11, a single circuit board 81 that composes one signal processing unit includes a plurality of chip components 83 that each have built-in communication processing blocks and the data transfers between such chip components are performed wirelessly, though the same operation may be used inside a signal processing unit provided in the television receiver from the outset or within an additionally provided expansion electronic appliance.

Figure 17:
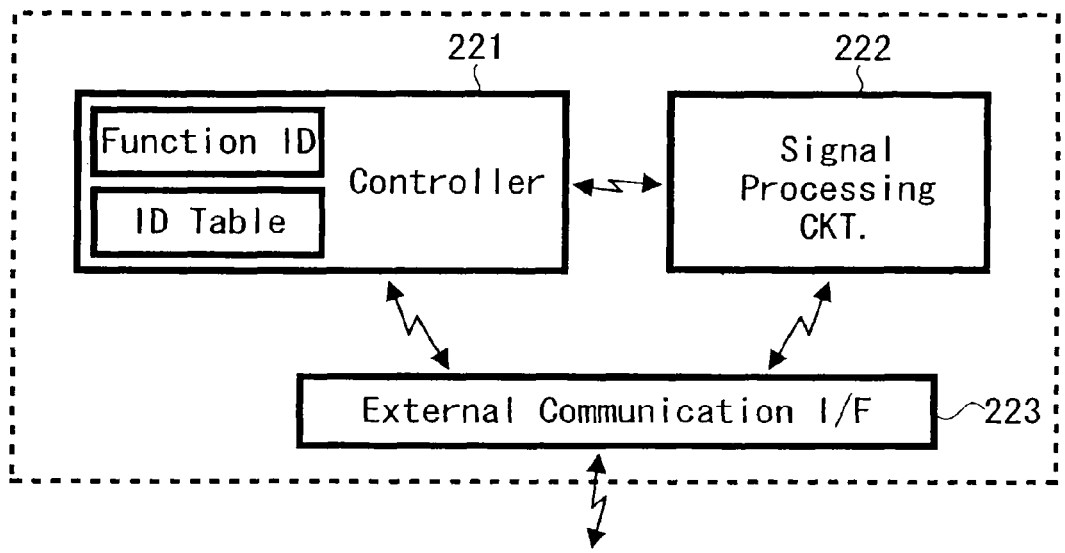
FIG. 17 is a block diagram showing an example construction of a single processing unit.

As one example, the construction shown in FIG. 17 may be used when the data transfers within the signal processing unit shown in FIG. 15 are performed wirelessly. This is to say, the signal processing unit may include a controller 221 that controls signal processing within the signal processing unit, a signal processing circuit 222 that performs the actual signal processing under the control of the controller 221, and an external communication interface unit 223 that controls data transfer processing between the controller 221/the signal processing circuit 222 and the periphery, with wireless communication circuits and antennas being built into each of these circuits 221, 222, 223.

Figure 18:
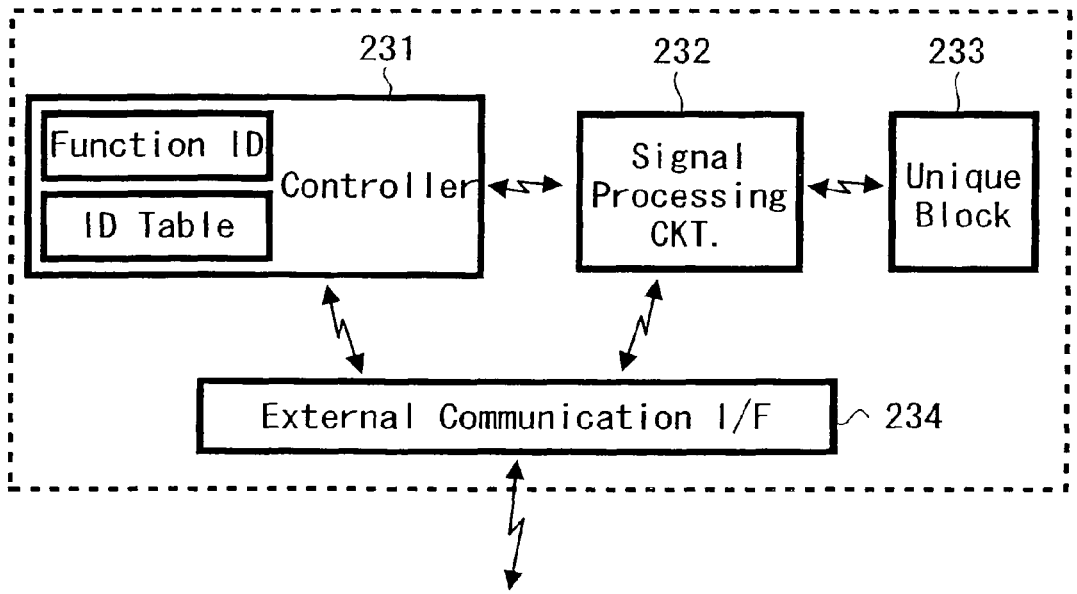
FIG. 18 is a block diagram showing an example construction of a single processing unit.

When the data transfers within the signal processing unit shown in FIG. 16, for example, are performed wirelessly, the construction shown in FIG. 18 can be used, for example. This is to say, a signal processing unit may include a controller 231 that controls signal processing within the signal processing unit, a signal processing circuit 232 and a unique block 233 that perform the actual signal processing under the control of the controller 231, and an external communication interface unit 234 that controls data transfer processing between the controller 221/the signal processing circuit 222/the unique block 233 and the periphery, with wireless communication circuits and antennas being built into each of these circuits 231, 232, 233, 234.

The following describes an example where data transfers are performed via wireless communication between signal processing units provided in (or added on to) the television receiver 100 or within the signal processing units. Here, an example where the wireless communication format called BLUETOOTH® is used is described. It should be noted that in the following explanation, one unit that performs wireless communication is simply described as being an "appliance" or a "terminal", though in the present example, add-on appliances or circuit boards that include the wireless communication unit (circuit) described above, and circuits within an appliance that include wireless communication units each correspond to an appliance or terminal that performs wireless communication.

Figure 19:
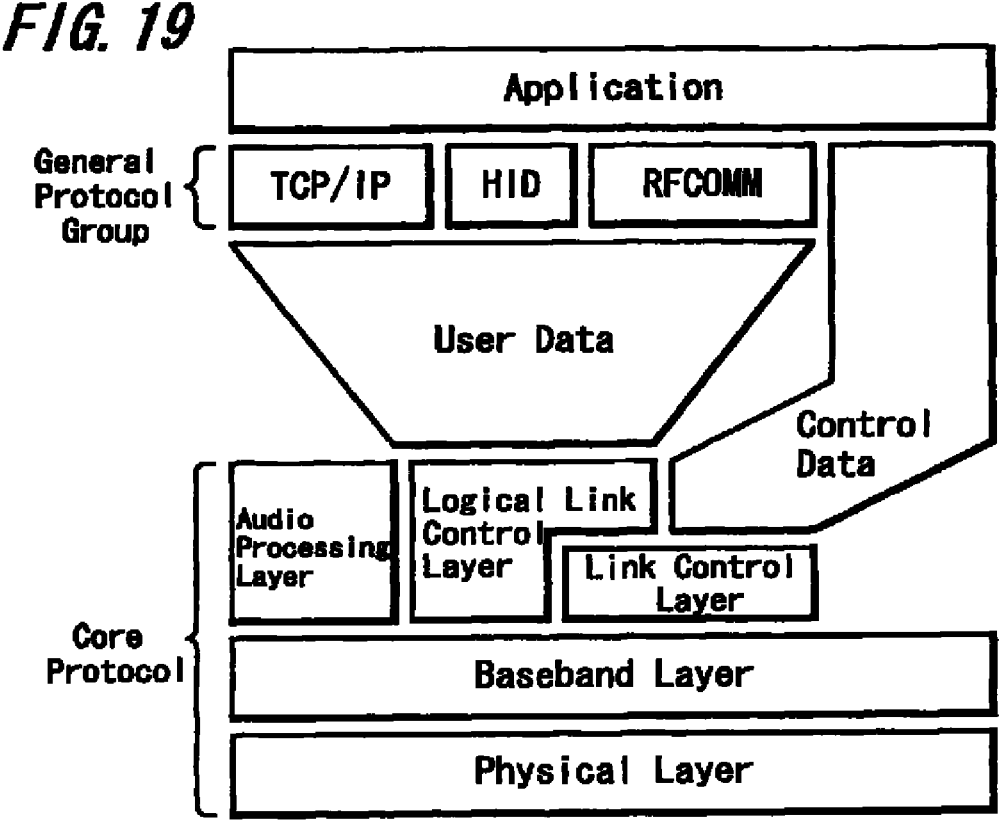
FIG. 19 is an explanatory figure showing an example of the protocol stack for performing wireless transfers.

FIG. 19 shows the protocol stack that is required in order to perform wireless communication according to the above method. The protocols of the entire system are divided into (1) core protocols that form the main part of the protocols, (2) application software that is in charge of the services of applications, and (3) a group of adopted protocols for coordinating the communication protocols for communication between the core protocol and the application software.

These protocols are composed of five protocols. From the bottom, the protocol stack includes a physical layer, a baseband layer, an actual data processing layer, and a logical link control layer.

The group of adopted protocols provides compatibility between the core protocols and the application software so that a variety of existing application software can be used. As examples, the group of adopted protocols includes TCP/IP protocol, RFCOMM protocol that emulates a serial port, and drivers for an HID (Human Interface Device) operated by the user.

An FH (frequency hopping)-type spread spectrum technique that uses a certain frequency (such as 2.4 GHz) is used as the physical layer. The transmission power is limited to a maximum of around 100 mW, so that wireless transfers can be performed over short distances of up to around 100 m. The physical layer is able to lower the transmission power to a minimum of −30 dBm according to control from the link layer.

The baseband layer is defined as a protocol that acts as an interface to the physical layer for the actual transmission/reception data packets. This layer provides communication links for transmitting and receiving data that is passed over from higher layers. Here, control over the frequency hopping and control over time-axis slots are performed. In addition, processing for the retransmission of packets and the correction and detection of errors are controlled by this baseband layer.

The link control layer is a protocol that acts as an interface for transmission and reception packets on the communication links, with the link control layer setting the communication links for the baseband layer and setting various communication parameters relating to such links. These are defined in the link control layer as control packets, and communication is performed as necessary with the link control layer of an opposing terminal. This layer also receives direct control from applications on a higher layer as necessary.

On the audio layer, after the link control layer has set communication links that can transmit data, audio data can be delivered. The "audio data" referred to here is mainly audio data for communication via telephone, so that when communication is performed for a wireless telephone or the like, a dedicated processing layer is provided in a relatively low layer in order to minimize delays in the data transfers.

A logic link control layer controls a logic channel and acts as a protocol that is an interface for the link control layer and the baseband layer. It should be noted that for transfers of data aside from audio data handled by the audio layer, data is provided from the applications on higher layers to the logic link control layer, though the actual data that is handled in this case is delivered with no regard for the size and timing of data packets that are transmitted and received on the baseband layer. For this reason, the logic link control layer controls data from the applications above as logic channels and performs processing that divides the data and reconstructs the data.

Figure 20:
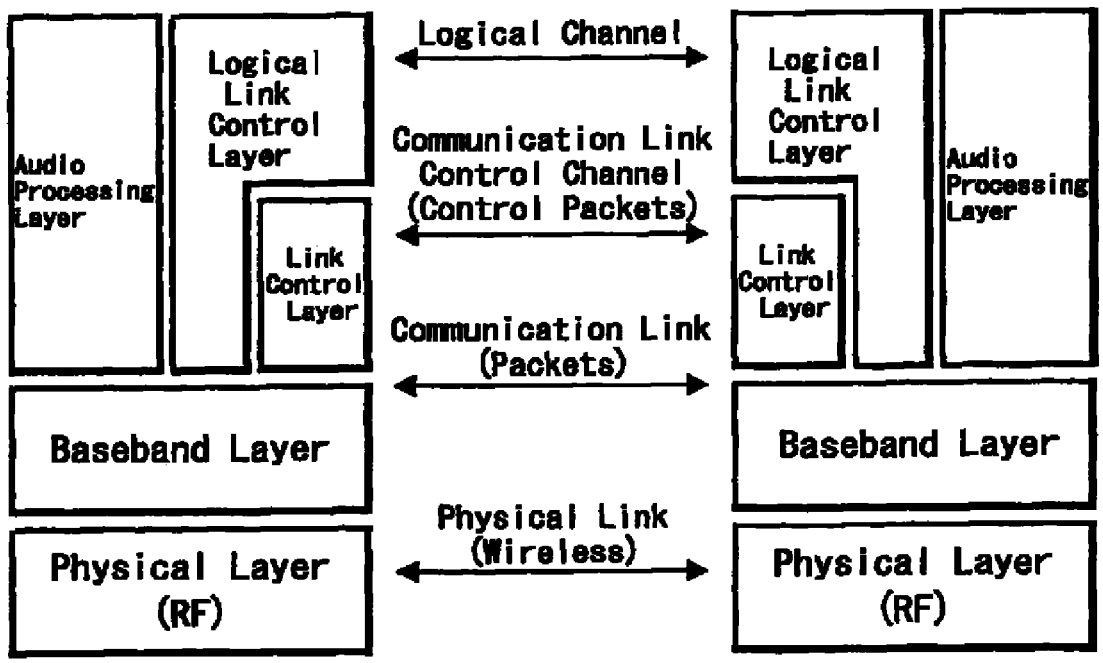
FIG. 20 is an explanatory figure showing an example of the hierarchical structure of wireless transfer.

FIG. 20 shows the processing on each level that is performed when wireless communication is performed between two appliances. On the physical layer, a physical wireless communication line is set, while on the baseband layer, packets are transmitted and received via the link set in this way. On the link control layer, control packets are transmitted and received on the communication link control channel. On the logic link control layer, packets of user data are transmitted and received on a logic channel. This user data corresponds to stream data that is the actual data to be transmitted and commands, etc.

Figure 21:
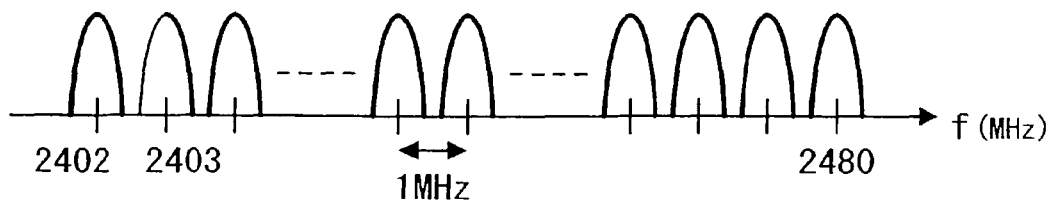
FIG. 21 is an explanatory figure showing an example setting of the transfer frequency.

The following describes the setting process of the physical communication frequency when wireless communication is performed according to this method. FIG. 21 shows examples of the frequencies that are used in this method. As one example, when the 2.4 GHz band is used, as shown in FIG. 21, 79 communication frequencies at 1 MHz intervals are provided from 2402 MHz to 2480 MHz. Each of the packets to be transmitted occupies a single communication spectrum within these 79 communication frequencies. Also, the communication spectrum that is used changes ("hops") randomly every 625µs.

Figure 22:
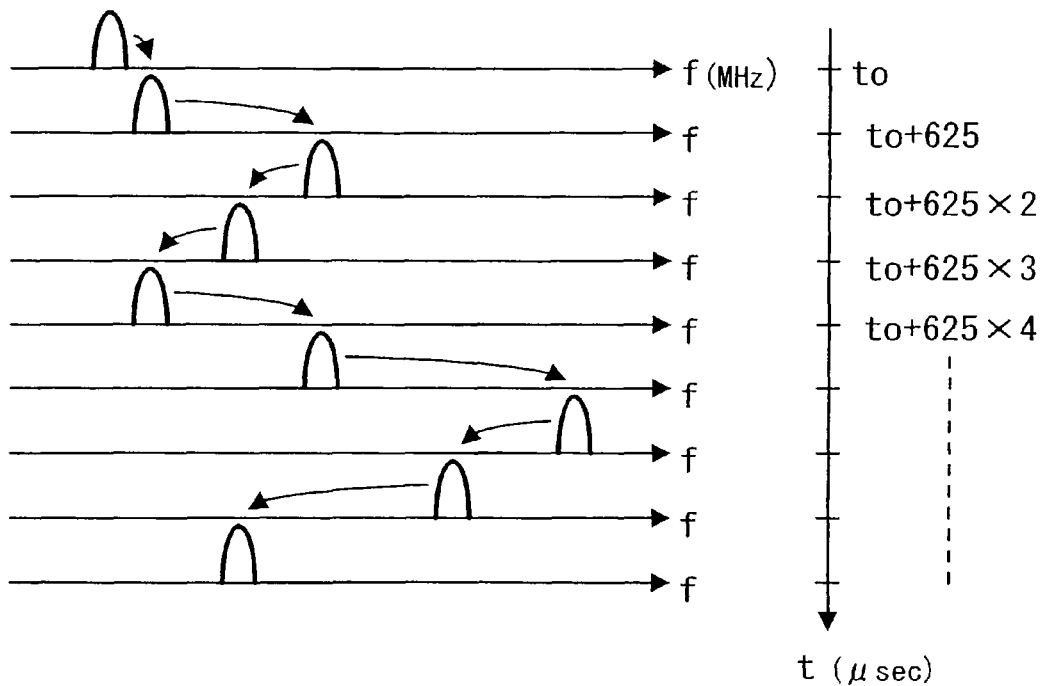
FIG. 22 is an explanatory figure showing the state of the frequency hopping.

FIG. 22 shows one example of the hopping of the communication frequency, with the communication frequency changing randomly every 625µs starting from a specified timing t0. By changing the communication frequency every 625µs, the frequency hops randomly around 1,600 times a second, so that data is transferred throughout the bandwidth shown in FIG. 21, resulting in communication over a spread spectrum.

It should be noted that with this communication method, the units for packets is 625µs, though transmission may be performed consecutively for plurality of entire packets. As one example, when a bidirectional transfer is performed between two appliances, there is no need for the communication in both directions to use the same number of packets, with there being cases where only the communication in one direction uses multiple packets.

Figure 23:
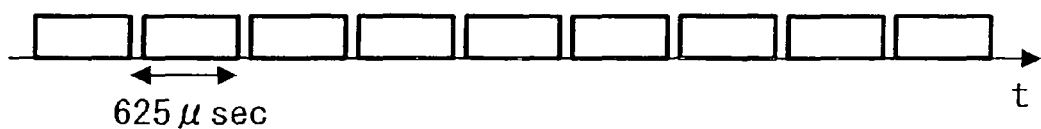
FIG. 23 is an explanatory figure showing an example arrangement of signal slot packets in the time axis.

When all of the packets that are transferred as shown in FIG. 23 are 625µs packets, frequency hopping is performed every 625µs as shown in FIG. 21. On the other hand, when as shown in FIG. 24, three packets are consecutively transmitted or five packets are consecutively transmitted, the transmission frequency is fixed while such slots are continuing.

When the state of the communication between the two appliances is as shown in FIGS. 25A and 25B and one of the appliances that performs this wireless communication is set as the master and the other appliance is set as the slave, data with a slot construction is transferred from the master to the slave in a period equal to one slot (625µs) (see FIG. 25A), and during the next slot, data with the slot construction is transferred from the slave to the master (see FIG. 25B). This alternating transfer is repeated so long as the transfer continues. However, the frequency on which the wireless transfer is performed changes every slot as described above to the frequency $f(k)$, $f(k+1)$, $f(k+2)$, ....

FIGS. 26A to 26C show example constructions of networks that are constructed between a plurality of apparatuses. The present communication method is not just for one-to-one wireless transfers, and can be used to compose a network of a plurality of appliances. This is to say, when a wireless transfer is performed between two appliances, as shown in FIG. 26A, one appliance becomes the master, the other appliance becomes the slave, and a bidirectional transfer is executed between the master MA11 and the slave SL11 under the control of the master MA11. On the other hand, as shown in FIG. 26B, a network may be constructed where, for example, three slaves SL21, SL22, SL23 are controlled by a signal master MA21 and wireless transfers are performed between these four appliances. Also, as shown in FIG. 26C, three masters MA31, MA32, MA33 and six slaves SL31, SL32, SL33, SL34, SL35, SL36 that are individually controlled by each master may be provided so as to construct three networks, with it also being possible to expand the network constructions by connecting these three networks together. In any of these cases, slaves are incapable of directly communicating with one another and such communication must be performed via a master.

It should be noted that a wireless network constructed of a single master and slaves that communicate directly with this master is called a "piconet". A group of networks including a plurality of masters (which is to say, a group of networks composed of a plurality of piconets) is called a "scatternet".

The following describes the types of links used when performing communication between appliances according to the present method. The present method has two types of communication links: SCO (Synchronous Connection-Oriented) links and ACL (Asynchronous Connection-Less) links, with it being possible to use these two types of links depending on how an application is used.

SCO links are connections used when performing one-to-one communication between a master and a specified slave, and are line-switching type links. These links are mainly used by applications that require real-time response, such as voice-based communication. For the communication links in a piconet, these SCO links reserve communication slots in advance at predetermined intervals, and even if other data is transferred during the communication, the data communication on the SCO links is given priority. This is to say, as shown in FIGS. 27A, 27B, data is alternately transferred between the master and the slave in SCO communication slots that come at predetermined intervals.

A maximum of three SCO links can be simultaneously supported by one master. In such cases, there are cases where three SCO links are supported for the same slave and cases where one SCO link is supported for each of three different slaves. It should be noted that the SCO links do not have a retransmission function, and that the packets transferred by SCO links are not appended with error correction codes.

ACL links are used for making what are known as packet-switching connections, and make it possible for one-to-many communication to be performed between a master and a plurality of slaves. In some cases, instead of being able to communicate with every slave in a piconet, the master may change the effective communication rates of individual slaves depending on the amount of data to be transferred or on the number of slaves. SCO links and ACL links may also be used simultaneously.

With ACL links, the maximum number of slaves that can simultaneously communicate with a master is seven. However, within a single piconet, only one ACL link is set for each slave, so that a plurality of ACL links cannot be simultaneously set for a single slave. In order to have a plurality of applications run on a single slave, it is necessary to perform protocol multiplexing for the higher-level applications. So long as there are no indications otherwise, the communication between a master and a slave is performed using single-slot ACL packets. A slave needs to have prior permission from a master to transmit multi-slot ACL packets. The master may reject a request to transmit multi-slot ACL packets from a slave, but a slave must accept transmission requests from a master.

The master informs the slave of only the maximum value for multi-slots, and the decision as to whether to transmit multi-slot ACL packets is left up to the slave. On the other hand, decisions as to whether the ACL packets transmitted from a master are single-slot or multi-slot are entirely left up to the master, with every slave needing to be ready to receive multi-slot packets at any time.

Aside from the definition of single-slot and multi-slot, the transmission of ACL packets is performed using what can be roughly classified into three packet communication methods. The first is asynchronous transfer, the second is isochronous transfer, and the third is broadcast transfer.

Asynchronous transfer is a communication method for transmission and reception of ordinary packets. The data transfer rate can fall due to the amount of traffic for slaves that are present in a piconet and due to packet retransmissions when there is deterioration in the quality of the communication line.

FIGS. 28A to 28D show an example of when communication is performed with three slaves (slaves 1, 2, 3) in the same piconet using asynchronous transfer. As shown in FIG. 28A, ACL packets are transmitted from the master to the slaves 1, 2, 3 in order and reception confirmation packets are sent back to the master from the slaves that receive such ACL packets, as shown in FIGS. 28B, 28C, and 28D.

It should be noted that there are cases where stream data such as image data and audio data is transferred using asynchronous transfer. When such stream data is transferred using asynchronous transfer, a time stamp is added to each ACL packet so that consecutive order of the stream data can be maintained on the receiver side.

Isochronous transfer is a method where packets are definitely transmitted from the master to slaves during predetermined timeslots. Accordingly to this method, a minimum lag can be ensured for the data being transferred. When isochronous transfer is used, the maximum polling time for the slot interval needs to be agreed upon by the master and the slave before communication according to isochronous transfer commences.

The master can forcibly indicate the maximum-polling interval to a slave and can refuse a setting request for isochronous transfer from a slave. However, a slave cannot indicate the maximum polling interval to a master, and cannot make a setting request for isochronous transfer.

FIGS. 29A and 29B show an example of when communication is performed between a master and a slave according to isochronous transfer. As shown in FIG. 29A, an ACL packet is transmitted from the master to the slave within the maximum polling interval, and immediately after the slave has received this ACL packet, a reception confirmation packet is sent back to the master, as shown in FIG. 29B.

Broadcast transfer is performed by setting the slave identifier in packet headers at zero. By doing so, broadcast transfer packets can be transmitted from the master to every slave. The slaves that receive the same packets do not transmit reception confirmation packets in response to such broadcast transfer packets. Instead of having slaves confirm reception, the master repeatedly transmits the broadcast transfer packets a number of times. Before broadcast transfer is performed, the master needs to inform the slaves of the number of times such packets are transmitted.

FIGS. 30A to 30D show an example of when communication is performed to every slave in a piconet using broadcast transfer. FIG. 30A shows the transmission packets sent from the master, while FIGS. 30B, 30C, 30D show the reception state of three slaves, slave 1, slave 2, and slave 3. In the example in FIGS. 30A to 30D, the positions marked "x" show where a packet could not be successfully received by a slave during the reception process, so that by repeating the transfer NBC times, all of the slaves can be reliably informed of the same information.

FIGS. 31A to 31D show an example of communication where both SCO links and ACL links are used. FIG. 31A shows the communication packets sent from the master, while FIGS. 31B, 31C, and 31D shows the communication packets sent from the three slaves 1, 2, and 3. In this example, ACL packets are transmitted from the master to the three slaves 1, 2, and 3 intermittently, with SCO packets also being transmitted by an SCO link between the master and slave 1 are fixed intervals. The broadcast transfer packets are repeatedly transmitted a predetermined number of times. While such broadcast transfer packets are being repeatedly transmitted, SCO packets are transmitted whenever the timing for transmitting SCO packets is reached.

The setting parameters that are required for isochronous transfer and broadcast transfer are collectively shown below in Table 1.

TABLE 1

Setting parameters for isochronous transfer and broadcast transfer

| Type of ACL communication link | Parameters for setting the communication methods |
| --- | --- |
| Isochronous transfer | Maximum polling interval |
| Broadcast transfer | Number of repeated packet transmissions ($N_{BC}$) |

The following describes the internal clocks of the master and the slaves. In this communication method, each appliance uses an internal clock, and settings such as the frequency hopping pattern are made. As shown in FIG. 32, the clocks in the master and the slaves may be set using a count value of a 28-bit counter composed of bits numbered 0 to 27. Each interval for this counter is 312.5μs, with 312.5μs being the minimum time unit for paging and inquiry processes. A 28-bit counter that is incremented by one every 312.5μs has a cycle that is approximately 23 hours long, which increases the randomness of the frequency hopping pattern.

The 312.5μs cycle where the clock value of the $0^{th}$ bit is set is a time cycle for a transmission packet when a master performs a paging or an inquiry. The 625μs cycle where the clock value of the $1^{st}$ bit is set is a time cycle for slots where the communication frequency is changed. The 1.25 ms cycle where the clock value of the $2^{nd}$ bit is set is a time cycle for reception and transmission by a master or slave. The 1.28 s cycle where the clock value of the $12^{th}$ bit is set is the clock timing for the time cycle in which the reception frequency is changed during an inquiry or a paging.

Each slave refers to the master clock and adds a fixed offset to its own clock so that its clock matches the master clock, and uses the clock resulting from this addition during communication.

Figure 33:
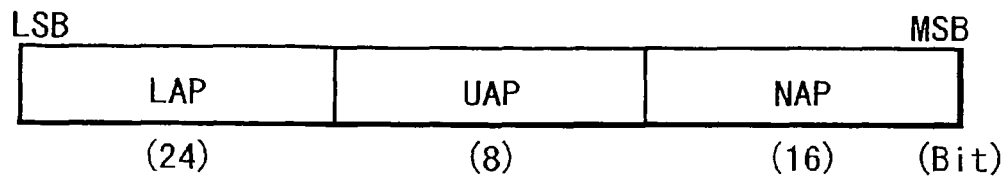
FIG. 33 is an explanatory figure showing an example of the composition of an address.

When calculating the frequency hopping pattern between the master and slave, aside from the clock described above, the 48-bit address assigned to each terminal is used as a parameter. The 48-bit address is defined according to an address method that is standardized according to the specification of IEEE 802 Standard, and is an absolute address that is individually assigned to each BLUETOOTH terminal respectively. FIG. 33 shows an example of the composition of such 48-bit addresses, with the address being composed of three parts: an LAP (Lower Address Part) composed of the lowest 24 bits, a UAP (Upper Address Part) composed of the next 8 bits, and an NAP (Non-significant Address Part) composed of the remaining 16 bits.

Out of the address of the master, all 24 bits of the LAP and the lowest 4 bits of the UAP are used in the generation of a frequency hopping pattern for synchronization within a piconet. By doing so, a frequency hopping pattern can be provided to each piconet based on the address of the master. When changing to the communication state, slaves are informed of the address of the master, so that each slave can calculate the same frequency hopping pattern by itself.

Figure 34:
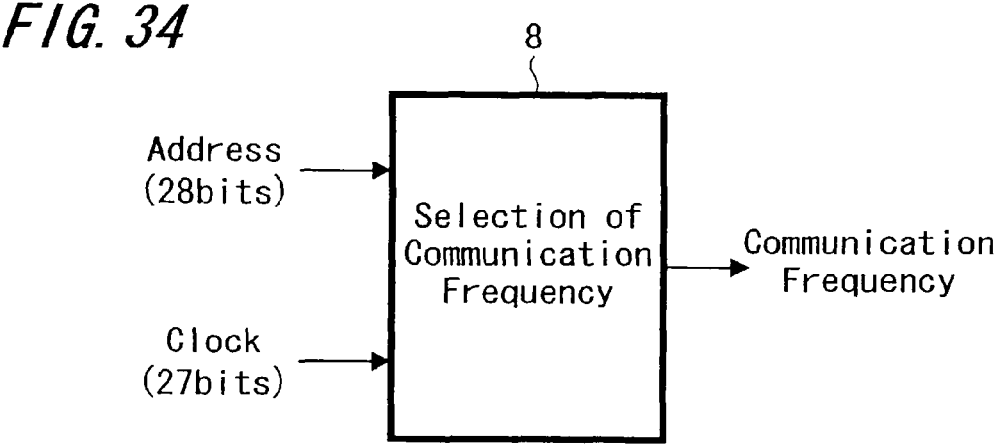
FIG. 34 shows an example of the composition of the generation processing for the frequency hopping pattern.

FIG. 34 shows an example construction for calculating the communication frequency. In this construction, the lowest 28 bits of the address of the master and the lowest 27 bits of the 28-bit clock are supplied to a communication frequency selecting unit 8, and a communication frequency that is the channel frequency hopping pattern is unanimously decided. However, a paging frequency hopping pattern and the inquiry frequency hopping pattern are different patterns to the channel frequency hopping pattern.

Figure 35:
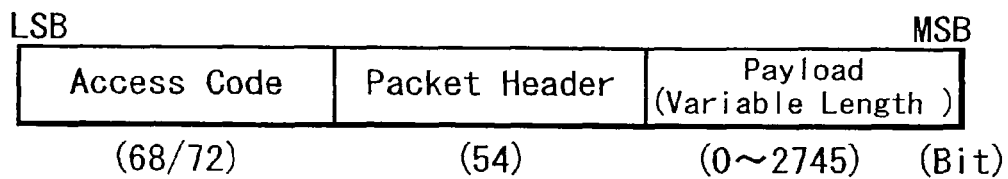
FIG. 35 is an explanatory figure showing an example of the packet format.

The following describes the composition of the data transferred between the master and slaves. FIG. 35 shows the packet format. The composition of each packet can be roughly classified into three parts: an access code; a packet header; and a payload. The payload has a variable length that is set depending on the amount of data being transferred.

Figure 36:
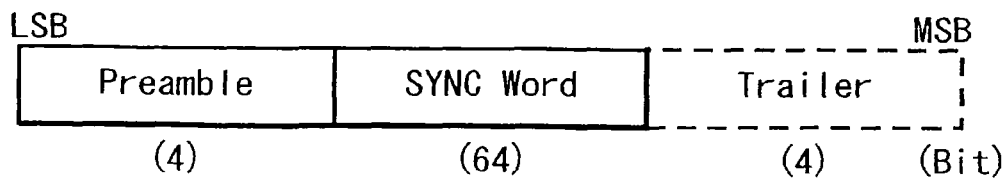
FIG. 36 is an explanatory figure showing an example of the composition of an access code.

FIG. 36 shows the composition of the access code. The access code is composed of 68- or 72-bit data and shows the destination of a transmission packet, with an access code being added to every packet that is transmitted and received. Depending on the type of packet, only an access code may be included.

In FIG. 36, the preamble is composed of fixed 4-bit data where a pattern of ones and zero is repeated according to the LSB of the sync word. The trailer is 4-bit data where ones and zeros are repeated according to the MSB of the sync word. Each of the preamble and the trailer function so as to erase the signal DC component of the entire access code. The 48-bit sync word is composed of 64-bit data that is generated based on the 24-bit LAP in the 48-bit address. This sync word is used for piconet identification. However, during communication in cases where the address of the master or a clock cannot be obtained, etc., there are cases where a different sync word is used in packets that are used for an inquiry or a paging.

The different types of access codes are collectively shown in Table 2 below.

TABLE 2

| Type | | LAP for access code generation | Piconet status | Corresponding frequency hopping pattern |
|---|---|---|---|---|
| Channel Access Code (CAC) | | LAP of master in piconet | Communication state | Channel frequency hopping pattern |
| Device Access Code (DAC) | | LAL of slave paged by master | Paging state | Page frequency hopping pattern |
| Inquiry Access Code | General Inquiry Access Code(GIAC) | LAP reserved in advance | Inquiry state | Inquiry frequency hopping pattern |
| | Dedicated Inquiry Access Code (DIAC) | LAP reserved in advance | | |

Figure 37:
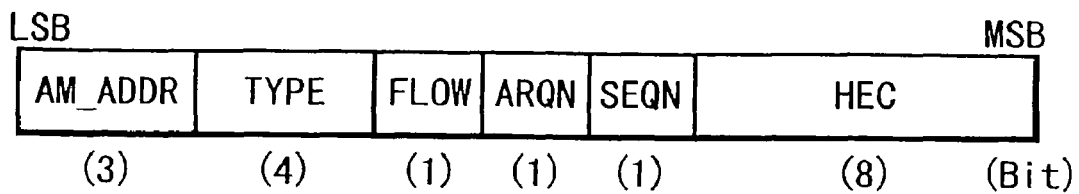
FIG. 37 is an explanatory figure showing an example of the composition of a packet header.

FIG. 37 shows the composition of the packet header. The packet header includes the parameters required for controlling communication links in the baseband layer.

The 3-bit AM ADDR is a value that the master assigns to each slave, and is an identification field that identifies the slaves that are performing communication in a piconet.

The 4-bit TYPE field is a packet type field that indicates what type of packet the entire packet is.

The 1-bit FLOW field is used to manage the flow control of packets transferred on ACL links.

The 1-bit ARQN field is used to inform the packet sender whether there is an error in a received packet. In BLUETOOTH standard, dedicated reply packets are not provided for confirming reception, so that this ARQN field is used to send a confirmation of the reception of packets to the packet sender. By setting the value of this field at one or zero, a terminal can inform another device that there are no errors in a received packet or that there has been an error. The presence or absence of errors in a received packet is judged using a header error detection code that is added to the packet header of the received packet and an error detection code that is added to the payload in the received packet.

The 1-bit SENQ field is used for management so that retransmitted packets are not repeated accepted by the receiver. When the same packet is retransmitted, the value of the SENQ field is switched between one and zero whenever a packet is transmitted.

The 8-bit HEC field is a field in which the error correction code of the packet header is arranged. This error correction code is generated according to a generation polynomial $g(D)=D^8+D^7+D^5+D^2+D+1$. When generating the error correction code, an initial value that is set in an 8-bit shift register for generated the error correction code is set at the 8 bits of the UAP in the BLUETOOTH address described earlier. The address used here is the same as the address used when generating the access code. The initial values used when generating these error correction codes are collectively shown in below in Table 3.

TABLE 3

| Access code | Initial value of 8-bit shift register for generating HEC | Description |
|---|---|---|
| Channel Access Code (CAC) | UAP of master in piconet | HEC is definitely added to the packets during communication |
| Device Access Code (DAC) | UAP of slave paged by master | Unrelated as there is no header in an ID packet |
| Inquiry Access Code (IAC) | Default Initial Value (00 in hexadecimal) | Unrelated as there is no packet header in an IQ packet applied to both GIC and DIAC |

A channel access code (CAC) that is generated based on the 24 bits of the LAP in the address of the master is used to identify the piconet in which communication is being performed. To synchronize the communication in the piconet, it is necessary to synchronize the frequency hopping pattern and the time slots. When doing so, if on the off chance there is another master in the vicinity with the same LAP and the frequency hopping pattern and the time slots just happen to be synchronized, the other master can be excluded using the HEC that is the error correction code of the packet header.

User data, which is the data to be actually transmitted and received between terminals, or control data is placed in the payload. The user data can be data that is transferred by an SCO link or data that is transferred by a packet exchange-type ACL link.

Figure 38:
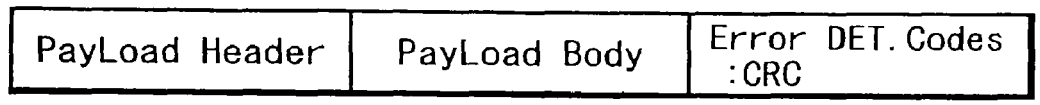
FIG. 38 is an explanatory figure showing an example of the composition of a payload.

FIG. 38 shows the composition of a payload of an ACL link. The payload is composed of three parts a payload header; a payload body; and an error detection code, with the overall length of the payload being variable. On the other hand, with SCO links, communication slots are cyclically reserved in advance and there is no retransmission of data packets, so that the payloads for SCO links are composed of payload bodies only, with no payload headers or error detection codes being added.

Figure 39:
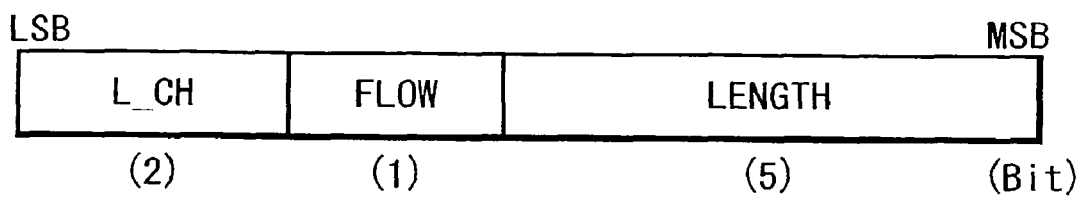
FIG. 39 is an explanatory figure showing an example of the composition of the payload header of a single slot packet.
Figure 40:
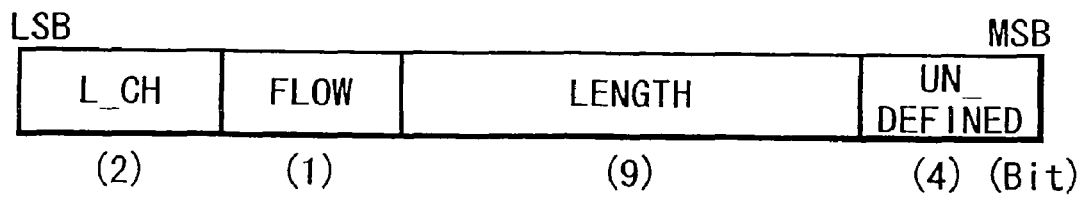
FIG. 40 is an explanatory figure showing an example of the composition of the payload header of a multi-slot packet.

The payload headers include the parameters required for controlling the data for higher levels than the baseband layer, and are data that is only included in ACL links. FIG. 39 shows the composition of a payload header for a single slot packet, while FIG. 40 shows the composition of a payload header for a multislot packet.

The 2-bit L_CH data included in the payload header is a field for identifying the logical channel that indicates what kind of data the data for higher layers than the baseband level is. SCO links and ACL links are links on the baseband layer, and control of such links is performed according to information set in the packet headers. The L_CH field identifies a logical channel that is defined on a higher layer than the baseband layer, the L_CH being defined as shown in Table 4 below for the three user logical channels.

TABLE 4

| Logical Channel | Communication link | L_CH code (2-bit) |
| --- | --- | --- |
| Communication link control channel | ACL link SCO link | L_CH = 11: |
| Asynchronous user logical channel | ACL link | L_CH = 11: |
| Isochronous user logical channel |  | L_CH = 01: |
| Synchronous user logical channel | SCO link | Not applicable |

The 1-bit FLOW field is data that is used to control the flow of data that is transmitted and received on a user logical channel. FLOW is managed separately for each user channel, and by sending back data with FLOW=0, the other device in communication can be made to temporarily suspend the transmission of data. When the reception buffer becomes empty, the other device can be made to resume the transmission of data by sending back data with the setting FLOW=1. The setting of this FLOW field is performed by the link control layer, though there is no guarantee that flow control can be performed for real-time data. Flow control for real-time data is managed by the baseband layer using the FLOW field in the packet headers. As all of the data in the control packets is processed on the link control layer, this data is not passed over to the logical link control layer. Accordingly, control packets are unaffected by the flow control by this FLOW field, and the value of FLOW in control packets is always set at 1.

The 5-bit or 9-bit LENGTH field shows the length of the data in the payload body in byte units. In the case of single slot packets, the LENGTH field is 5 bits long, while in the case of multislot packets, the LENGTH field is 9 bits long.

The UNDEFINED field is only present in the payload headers of multislot packets, and at present is an undefined field that is set at all zeros.

Data of the length indicated by the LENGTH field in the payload header is included in the payload body. During communication with an SCO link, the payload of a data packet is composed of only the payload body, so that there is no indication of the data length by a LENGTH field. However, when DV packets are used, the data length of the data part is shown.

The CRC field is a 16-bit field showing the error detection code, and is a code for detecting whether there are any errors in the payload header and payload. This error detection code is generated using the generation polynomial $g(D)=D^{16}+D^{12}+D^5+1$. When this error detection code is generated, the initial value set in a 16-bit shift register is set at a 16-bit value produced by adding eight zero bits to the 8 bits of the UAP in the address described earlier. Like the HEC, the address used here is the same as that used when generating the access code.

The following describes the various types of packets.

As mentioned during the description of the packet headers, the TYPE field indicates the packet type. The packet types that may be indicated are common packets that may be used by both SCO links and ACL links and unique packets that are used by SCO links only or by ACL links only.

The common packets that may be used are NULL packets, POLL packets, FHS packets, DM1 packets, IQ packets, and ID packets.

NULL packets are composed of an access code and a packet header and have no payload. The length of such packets is fixed at 126 bits. These packets are packets for transmitting and receiving the status of a communication link, and manage the reception confirmation (ARQN) of packets and flow control (FLOW). A confirmation response is not needed when a NULL packet is received.

POLL packets, like NULL packets, are composed of an access code and a packet header, have a fixed length of 126 bits, and are used to manage the status of a communication link. However, unlike NULL packets, whenever a POLL packet is received, it is necessary to transmit a confirmation of the reception of the POLL packet, even when there is no data to be transmitted.

Figure 41:
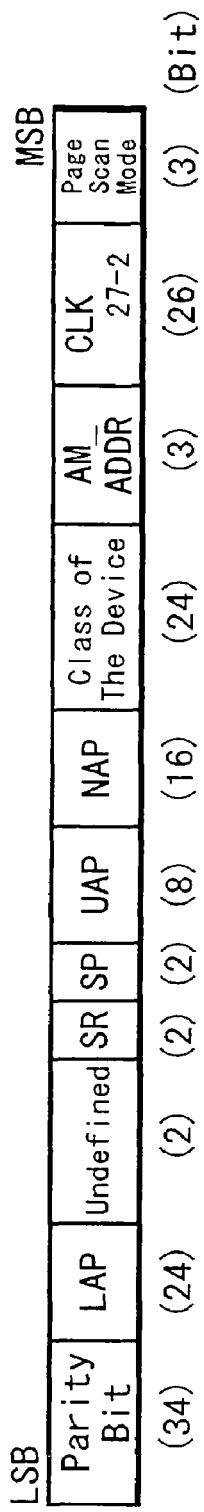
FIG. 41 is an explanatory figure showing an example of the composition of the payload of an FHS packet.

FHS packets are important control packets for improving the synchronization within a piconet, and are transmitted when a clock and an address, which are parameters that are essential for establishing synchronization between a master and slaves, are exchanged. FIG. 41 shows an example composition for the payload of an FHS packet. The payload of an FHS packet is composed of eleven fields, with a 16 bit error detection code being added to the 144 bits of these eleven fields, making a total of 160 bits. The eleven fields that compose an FHS packet are as follows.

The 34-bit parity bits form a field that includes parity data for the sync word in the access code that is set by the FHS packet.

The 24-bit LAP is the lowest 24 bits of the address of the terminal that transmits the FHS packet. The 2 bits that follow the LAP field are an undefined field, and are set at zero.

The 2-bit SR field is as follows. During a paging, the SR field indicates the number of repetitions for the transmission of an ID packet sequence from the master to a slave and the scanning cycle for when the slave scans the ID packet sequence from the master.

The 2-bit SP field is as follows. During an inquiry, after a slave has received an IQ packet from the master and transmitted an FHS packet to the master, the SP field indicates the time in which the slave performs a mandatory page scan.

The 8-bit UAP field is the upper 8 bits of the address of the terminal which transmitted the FHS packet.

The 16-bit NAP field is 16 bits, out of the address of the terminal which transmitted the FHS packet, that are not the LAP or the UAP.

The 24-bit device class is a field that shows the type of the terminal.

The 3-bit AM ADDR is a 3-bit field for enabling a master to identify a slave. During the processing for paging, AM ADDR in an FHS packet that the master transmits to a slave indicates a slave identifier used in the piconet. In an FHS packet that is transmitted by a slave as a response to an IQ packet from a master, AM ADD has no meaning, and so needs to be set at zero.

The 26-bit CLK 27-2 field shows the upper 26-bits of the clock of the terminal. This clock has a clock precision of 1.25 μs, and when an FHS packet is transmitted, it is always necessary to set the value of the clock at that point.

The 3-bit page scan mode field indicates a default page scan mode that is supported by a terminal that sent the FHS packet.

The following describes a DM1 packet. When a DM1 packet is transmitted and received on an SCO link, the DM1 definitely functions as a control packet. On the other hand, when DM1 packets are transmitted and received on an ACL link, the DM1 packets function as control packet and are also used to transmit and receive data packets.

When common packets are transmitted on an SCO link or an ACL link, the packets are defined as control packets on the link control layer. However, when a DM1 packet is transmitted and received on an ACL link, it is not possible to know whether the packet is a user packet or a control packet just by looking at the TYPE field that indicates the packet type. Accordingly, by setting the logical channel type field in the payload header at L_CH=11, it is possible to indicate that a DM1 packet is a control packet for the link control layer. In the case of a data packet, depending on whether the original user data is fragmented, the logical channel type field is set at L_CH=01 or L_CH=10.

IQ packets are packets that are broadcast by a master during an inquiry, and are composed of only an inquiry access code.

ID packets are transmitted during a paging with the master indicating a specified slave, and are composed of only an access code. In IQ packets and ID packets, the type field in the packet headers is not defined.

The following describes the SCO packets that are data packets that are transmitted and received on an SCO link. SCO packets are composed of four types of packets: HV1 packets, HV2 packets, HV3 packets, and DV packets.

The payloads of HV1 packets are composed of only a payload body in which 10 bytes of user data is held. As a rule, SCO packets are not resent, so that an error detection code is not included in these 10 bytes. Accordingly, the data is encoded with error correction codes at a ⅓ rate, so that HV1 packets end up with a final payload length of 240 bits.

The payloads of HV2 packets are also composed of only a payload body in which 20 bytes of user data is held. An error detection code is not included in these 20 bytes. Accordingly, the data is encoded with error correction codes at a ⅔ rate, so that HV1 packets end up with a final payload length of 240 bits.

The payloads of HV3 packets are also composed of only a payload body in which 30 bytes of user data is held. An error detection code is not included in these 30 bytes. The data is also not encoded with error correction codes.

DV packets are composed of an audio part whose length is fixed at 10 bytes and a data part with a variable length up to a maximum of 9 bytes. The 10 bytes of the audio part does not include error correction codes, but a two-byte error detection code is added to a part with a maximum length of 10 bytes that is produced by expanding the data part with one byte of the payload header.

The ACL packets transmitted and received on an ACL link are DM1 packets, DH1 packets, DM3 packets, DH3 packets, DM5 packets, DH5 packets, and AUX1 packets.

The payload of a DM1 packet is composed of a 1-byte payload header, a payload body with a variable length up to a maximum of 17 bytes, and an error detection code.

The composition of a DH1 packet is the same as a DM1 packet. However, the payload is not encoded with error correction codes. Accordingly, data with a variable length of up to 27 bytes can be transmitted and received.

The payload of a DM3 packet is composed of a 2-byte payload header and a payload body with a variable length of up to 121 bytes and error correction codes. The payload of a DM3 packet is encoded with error correction codes at a ⅔ rate.

The composition of a DH3 is the same as the composition of a DM3 packet. However, the payload is not encoded with error correction codes. Accordingly, data with a variable length of up to 183 bytes can be transmitted and received.

The payload of a DM5 packet is composed of a 2-byte payload data, a payload body with a variable length of up to a maximum of 224 bytes, and a 2-byte error correction code.

A DH5 packet has the same composition as a DM5 packet. However, the payload is not encoded with error correction codes. Accordingly, data with a variable length of up to a maximum of 339 bytes can be transmitted and received.

AUX1 packets are the same as DH1 packets that do not include 2-byte error detection codes. This means that AUX1 packets are not retransmitted. Two bytes are added to the payload body, so that data with a variable length of up to a maximum of 29 bytes can be transmitted and received.

Figure 42:
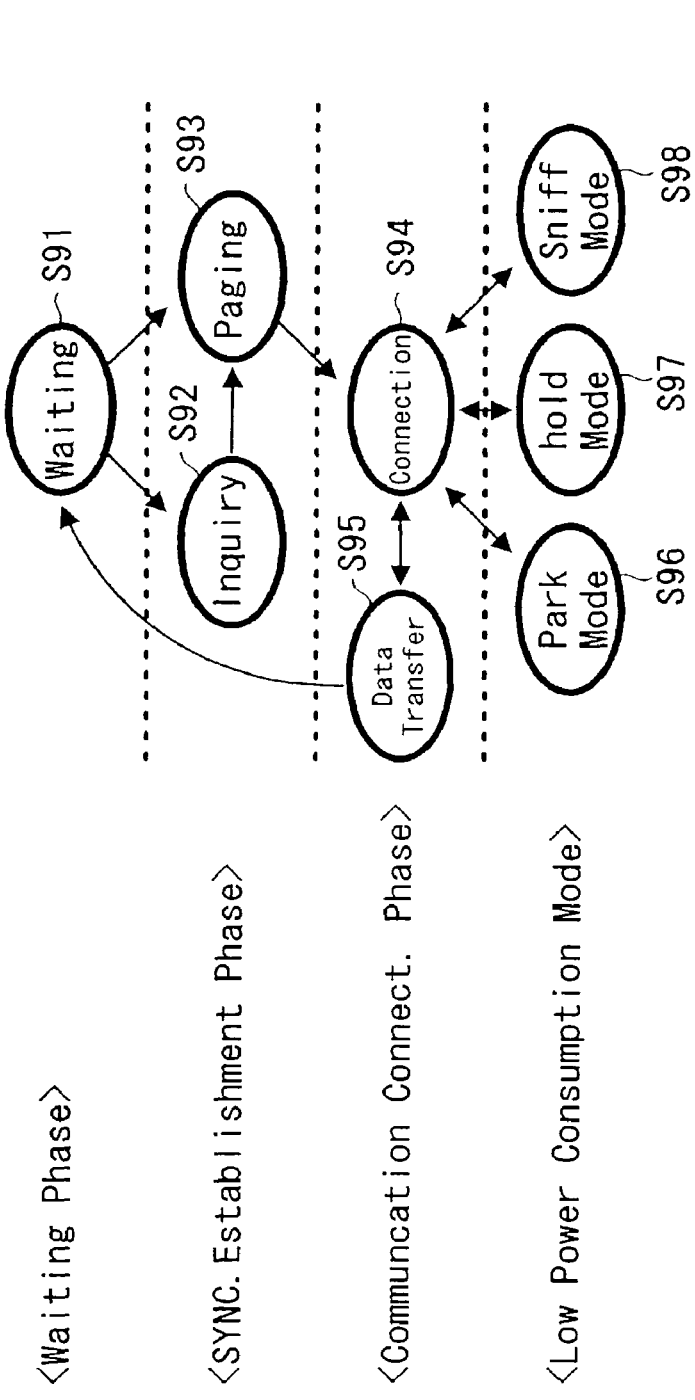
FIG. 42 is an explanatory figure showing an example of the state transitions of an appliance.

The following describes the transition states for communication with the method of the present example. The transition states with this method are composed of a three-stage communication phase and low power consumption modes that relate to power consumption by a terminal. The three-stage communication phase is split into a waiting phase, a synchronization establishment phase, and a communication phase, with the low power consumption modes including a park mode, a hold mode and a sniff mode. FIG. 42 shows an example of the state transitions, with the state changing as shown by the arrows.

The waiting phase (S91) is composed of a single processing state, and is a phase where the transmission and reception of any kind of packet is not performed. Immediately after the power of a terminal has been turned on, or when a communication link has been cut off, the terminal enters the waiting state. In this waiting state, there is no difference in the roles of the master and the slaves.

The synchronization establishment phase is composed of two types, an inquiry (S92) and a paging (S93).

An inquiry is the first-stage processing state where synchronization is established within a piconet. After being in the waiting state, a terminal that attempts to communicate for the first time definitely makes a transition to an inquiry.

A paging is the second-stage processing state where synchronization is established within a piconet. As a rule, a transition is made from an inquiry to a paging, but in cases where the first stage processing that establishes synchronization within the piconet has been completed in the inquiry state, there are cases where a transition is made from the waiting state directly to a paging.

In an inquiry, the roles of a master and a slave are clearly different. A master in this processing state consecutively broadcasts IQ packets regardless of whether slaves are present in the vicinity. If slaves that are in the inquiry state are present in that vicinity, whenever such a slave receives an IQ packet, the slave transmit an FHS packet to inform the master of the slave's attributes. Thanks to these FHS packets, the master can know the addresses and clocks of the slaves.

FIGS. 43A and 43B show the processing performed by a master and a slave that are in the inquiry state. First, once the master in the center has transmitted IQ packets as shown in FIG. 43A, the slaves in the vicinity transmit FHS packets to the master as shown in FIG. 43B. In this way, the master in the inquiry state receives FHS packets from an unspecified large number of slaves.

Here, there is the problem that a plurality of slaves transmit FHS packets in response to the specific IQ packets. When a plurality of FHS packets are simultaneously transmitted, the packets collide with one another, which makes it difficult for the master to judge the FHS packets that have been transmitted. Under BLUETOOTH standard, such collisions are avoided by using a random time backoff when FHS packets are transmitted. That is, in response to the IQ packets received for the first time, slaves do not transmit FHS packets to the master, and while a random time backoff is being performed, the reception of IQ packets is suspended. After this, a slave resumes the reception of IQ packets, and immediately after the next IQ packet has been received, the slave transmits an FHS packet to the master. On receiving an FHS packet, a slave once again suspends the reception of an IQ packet during the random time backoff. Thereafter, the same operation is repeated.

Figures 44A, 44B:
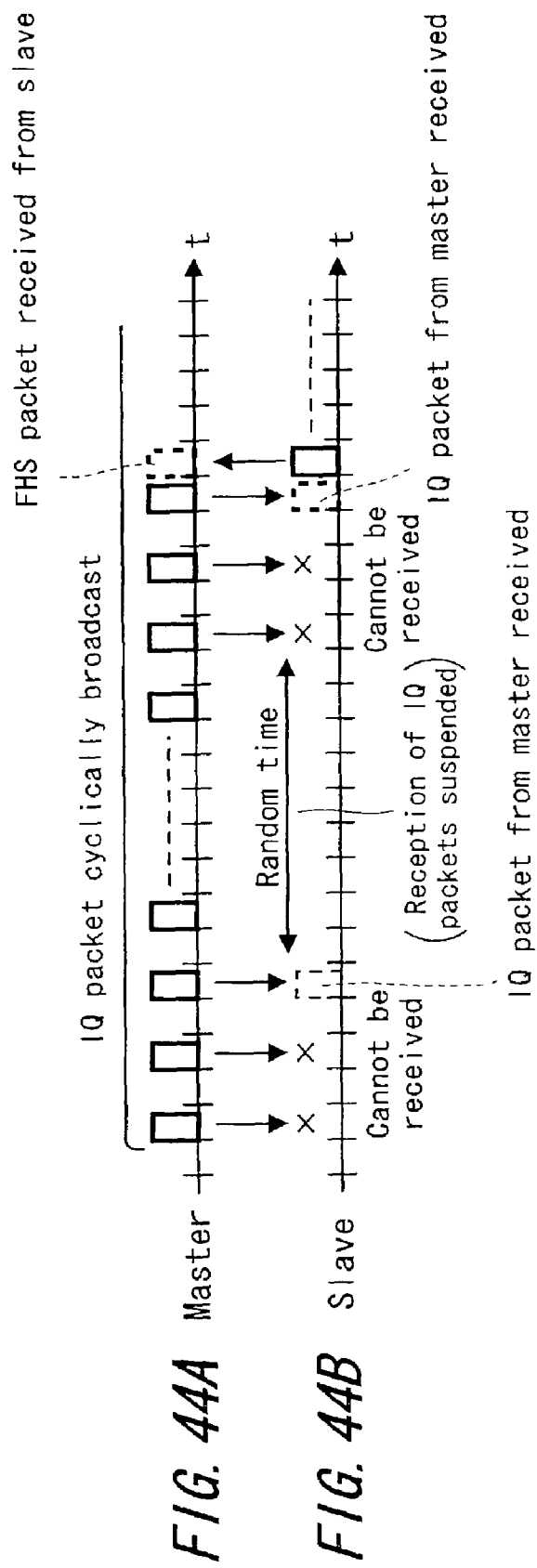
FIGS. 44A and 44B are timing charts showing an example of processing for an inquiry.

FIGS. 44A and 44B show an overview of the processing of a master and a slave during an inquiry, with FIG. 44A showing the transmission and reception state of the master and FIG. 44B showing the transmission and reception state of the slave. Since the master does not inform slaves that FHS packets have been received without errors, the slaves in the inquiry state end up in a state where the transmission of the FHS packets is endlessly repeated. However, since the same IQ packets are repetitively broadcast for a predetermined time, the master receives a plurality of FHS packets from each slave in the inquiry state. Eventually, after this inquiry has continued for a predetermined time, there is a high probability that FHS packets will have been transmitted and received.

In the case of a paging also, the roles of the master and the slaves are different. In this processing state, the master selects the slave to communicate with based on the information in an FHS packet transmitted and received in the inquiry state, and transmits an ID packet to the selected slave. On confirming the reception of the ID packet, the master transmits an FHS packet to the slave. By doing so, a slave can know the address and clock of a master.

A page access code is used as the access code in the ID packet and the FHS packet that are transmitted and received here.

FIGS. 45A and 45B show an overview of the processing operation performed by a master and a slave in the paging state. As shown in FIG. 45A, the master in the center transmits an ID packet to a slave so as that the slave can confirm the reception. Also, as shown in FIG. 45B, the master transmits an FHS packet to a slave so as to provide confirmation of reception.

Unlike the inquiry state where processing is performed for the unspecified number of slaves, during the paging state processing is performed by a specified slave and the master. By performing a one-to-one communication of packets, the master and slave perform processing while confirming that the transmission and reception of such packets.

A slave that has received an ID packet from the master transmits the same ID packet to the master so as to confirm the reception of the ID packet. Next, the master transmits an FHS packet to the slave so as to inform the slave of the master's clock and address. On receiving the FHS packet normally, the slave transmits an ID packet to the master to confirm the reception of the FHS packet. At this point, in accordance with the processing in the inquiry state, information on the address and clock that are required for synchronization in the piconet are exchanged between the master and the slave.

FIGS. 46A and 46B show one example of the processing by the master and the slave in a paging state, with FIG. 46A showing the transmission and reception state of the master and FIG. 46B showing the transmission and reception state of the slave.

The communication connection phase shown in the state transition in FIG. 42 includes a connection state (S94) and data transfer state (S95). In this communication connection phase, the master and slave establish synchronization in the piconet through a synchronization establishment phase, so that the actual communication can be performed in this phase. In this connected state, the transmission and reception of data packets is not performed. The transmission and reception performed at the point are limited to control packets for setting communication links, control packets that are security related, control packets related to low power consumption mode, and the like.

On the other hand, in the data transfer state, the transmission and reception of data packets are permitted. When the state has first changed to the connection state via the synchronization establishment phase, as a rule the state cannot change to the data transfer state if the connection authentication and encryption processes performed by the master and slave have not been completed. The roles of the master and the slaves in the connection differ according to the content of the control packets that are managed by the master and slave.

The transmission and reception of data packets during data transfer are performed in accordance with rules on the master, the slaves, and time slots. When a terminal terminates communication via data transfer state, or a hardware reset is performed on the controller within a terminal, the terminal changes makes a transition from the data transfer state to the waiting state.

Low power consumption mode is a mode that provides low power consumption states for terminals that have moved from the connection state. There are three types of low power consumption mode: park mode (S96), hold mode (S97) and sniff mode (S98).

Park mode is a low power consumption mode that is unique to slaves where the synchronization in a piconet that has been established by a connection is maintained.

Hold mode is a low power consumption mode that both a master and a slave can enter. In hold mode, the synchronization in a piconet that has been established by a connection is maintained, and in the case of a slave, the slave identifier provided by the master is stored.

Sniff mode is a low power consumption mode that is unique to slaves. Like hold mode, in sniff mode the slaves maintain the synchronization in the piconet that has been established by a connection, and the slave identifier provided by the master is stored.

It should be noted that in this communication method, the master/slave roles can be switched between the master and certain slaves in a piconet.

The process related to security that is executed in the connection state of the communication connection phase can be roughly classified into two processes: authentication and encryption. The authentication processing judges whether to permit a connection between the present device and a specified other device. The encryption processing protects against third parties eavesdropping on the data sent during communication by the present device.

Security in BLUETOOTH is managed using a concept called a link key. A link key is a parameter that manages one-to-one security for each of a specified two terminals. This link key must not be disclosed to third parties.

An initialization key that is used by terminals that are trying to connect for the first time is used as the link key. In cases where a connection has been made previously and a link key is set as a parameter in a database, the link key set in this way is used. The initialization key is generated using a PIN code from a higher-level application and data that is generated internally.

Data transfer is performed by wireless communication within the television receiver of the present embodiment using the short-range wireless transfer method described above. It should be noted that while the general-purpose wireless communication method called BLUETOOTH has been described here as an example, it should be obvious that other types of wireless communication methods, which have been implemented or merely proposed, may be used. With the transfer rate of the presently implemented version of the communication method described above, when transferring image data it is necessary to subject the image to some degree of compression, though by increasing the bandwidth of the transfer frequency band or by simultaneously using a plurality of channels, etc., it is technically possible to increase the effective transfer rate, so that for example, the short-range wireless transfer of high resolution image data in almost real-time is technically possible.

The wireless communication method described thus far is a general-purpose wireless communication method, though in place of this kind of general-purpose wireless communication method, a dedicated short-range wireless communication method that has been developed for wireless communication within appliances such as a television receiver may be used. When wireless communication is performed over extremely short distances such as within a single casing (or between the casing and the periphery) as in the case of the television receiver of the present embodiment, the transmission power can be set extremely weak so that there is no interference with the periphery, and by using a wireless communication method that resembles (or is different to) the wireless communication method described above, wireless communication that can transfer image signals, audio signals, control data, etc. over a plurality of processing blocks can be achieved.

As one example, the wireless communication method disclosed by IEEE 802.11 Standard may be used to perform wireless communication for image signals, audio signals, control data, etc. between a plurality of processing blocks. A wireless version of IEEE 1394 Standard, where data transfer is performed via wired bus lines, or so-called "wireless IEEE 1394" may also be used. When this wireless IEEE 1394 is used, some of the data transfers may be performed using the IEEE 1394 method where wired bus lines are used, so that a combination of wired and wireless transfer may be used. It is also possible to use only part of the processing that is standardized according to such general-purpose communication methods. As one example, wireless transfer may be performed within only certain appliances, so that part of the processing, such as the processing related to security, may be omitted. Processing, such as frequency hopping, that is included mainly for communication between moving bodies, may also be omitted, and the transfer frequency may be fixed.

The following describes an example of the signal processing performed when wireless communication is performed within the television receiver or between the television receiver and an appliance in the periphery by using the type of wireless communication methods described above.

Figure 47:
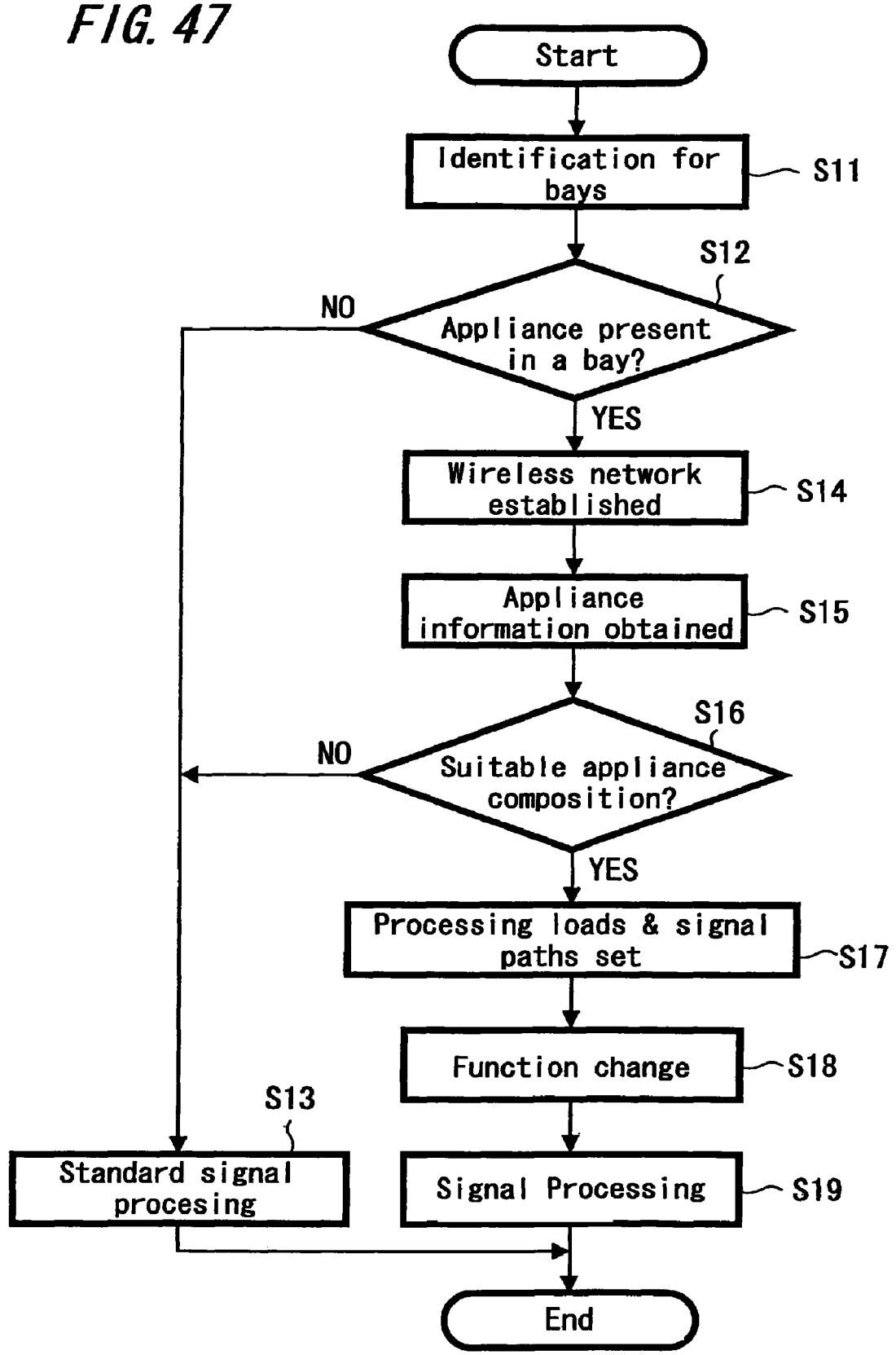
FIG. 47 is a flowchart showing an example of the signal processing settings by an embodiment of the present invention.

FIG. 47 is a flowchart showing an example of the processing for the settings related to wireless communication within the television receiver of the present embodiment. In this example, the wireless communication unit provided in the controller 171 inside the television receiver is the master for the wireless communication, with the controller 171 constructing a wireless network with other wireless communication units within the television receiver and performing the wireless communication that is required for data transfers. As described earlier with regard to FIG. 26C, when it is necessary to construct a plurality of wireless networks within a single television receiver, the wireless communication units of other processing units inside the television receiver may be set as masters. In the flowchart in FIG. 47, an example of the wireless communication setting processing performed under the control of the controller 171 is shown.

First, in step S11 the controller 171 performs an identification process for the appliances and circuit boards housed in the bays 4. As one example, when switches for detecting attached appliances are provided in each of the bays 4, this identification process is performed by detecting the states of these switches. The appliances and circuit boards may alternatively be detected by detecting the state of the power supply to the appliances and circuit boards placed in the bays 4. It should be noted that when the expression "expansion appliance" is used in the explanation hereinafter, the expression "appliance" also covers circuit boards, as shown in FIG. 9 and FIG. 11.

From the detected states, the controller 171 judges whether appliances are placed in the bays 4 (step S12), and when no appliances are present, the processing advances to step S13, where the controller 171 executes standard signal processing that is set in advance in the television receiver.

When it has been judged in step S12 that some kind of appliance has been placed in a bay 4, a wireless network is established under the control of the controller 171 in the periphery of the television receiver including the expansion appliance (step S14). When the wireless communication network has been established, information on the expansion appliance is obtained via wireless communication that uses the established network (step S15). By obtaining this appliance information, the controller 171 judges what functions the expansion appliance or circuit board has and judges whether the appliance has suitable functions for use with this television receiver (step S16). Here, when an attached appliance is not suitable for use with the television receiver, this appliance is not used, the processing returns to step S13, and the controller 171 executes standard signal processing that is set in advance in the television receiver.

When in step S16 the controller 171 judges that an appliance with a suitable function has been provided, the processing loads of the processing of image signals, etc. for the expansion appliance (or circuit board) and the signal processing unit that is provided as standard in the television receiver are decided, with the transfer paths for data being set based on the decided processing loads and data transfers being performed on the set transfer paths (step S17). Here, in the case of the present embodiment, wireless transfer paths formed by wireless communication are used as the transfer paths, and wireless transfer paths that use the wireless network established in step S14 are set so that data transfer can be performed in the appropriate range.

By setting wireless transfer paths in this way, the function as a television receiver can be changed (step S18) and the signal processing of image signals and audio signals, etc., that is required by the television receiver is executed by this changed function (step S19).

Figure 48:
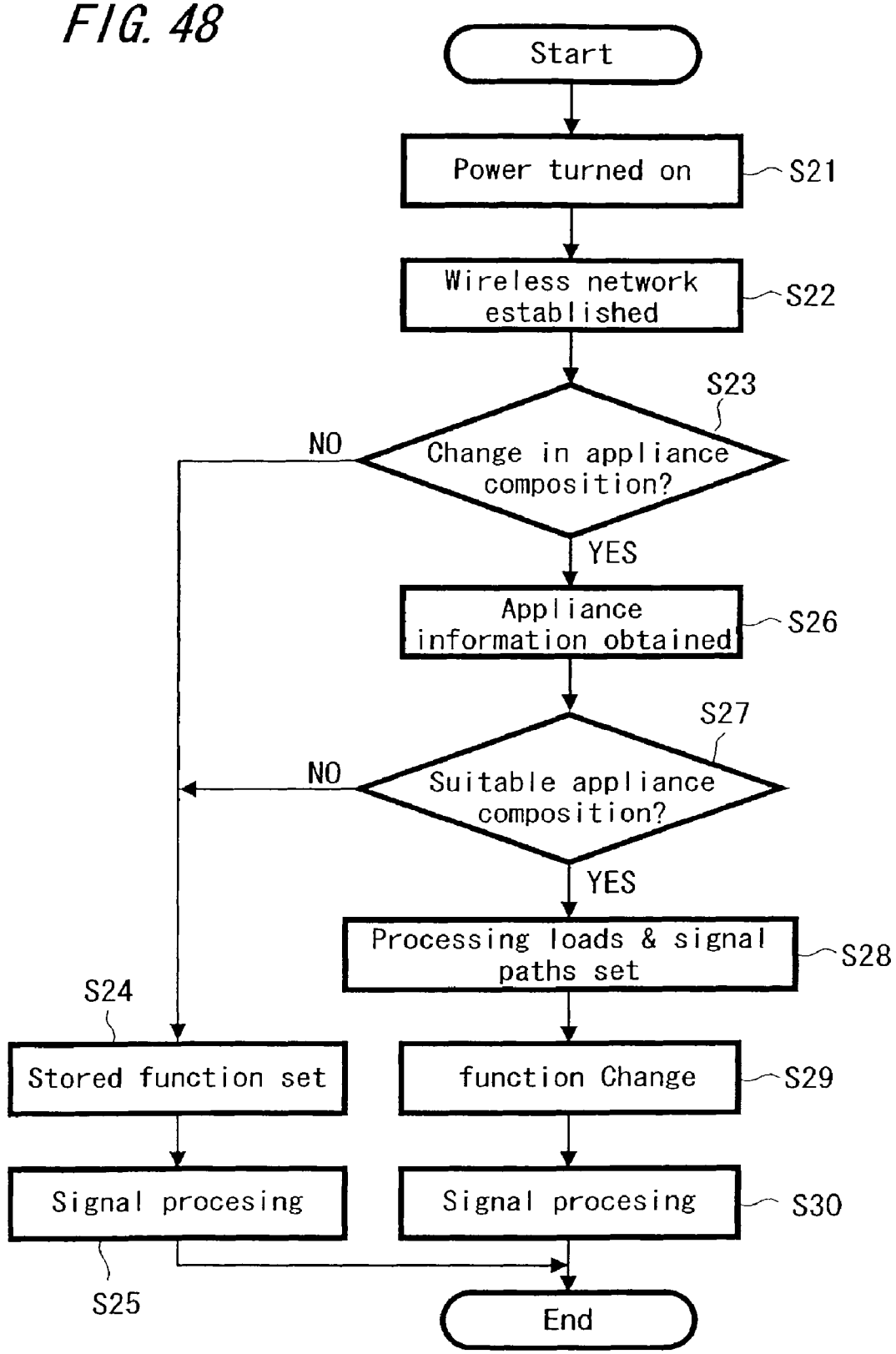
FIG. 48 is a flowchart showing another example of the signal processing settings by an embodiment of the present invention.

In the flowchart of FIG. 47, the recognition of the appliances and the circuit boards that have been placed in the bays is performed by judgements on the states of recognition switches, on a power supply state, etc., though the appliances and circuit boards that are placed in the bays may be recognized via wireless communication. The flowchart in FIG. 48 shows an example of when the appliances and circuit boards that are placed in the bays of the television receiver are recognized via such wireless communication.

In this example, the following processing is performed when the controller 171 in step S21 detects that the power of the television receiver has been turned on. This turning on of the power may be achieved by an operation of a power switch in the operation keys 172 or by the transfer of a "power-on" instruction from the remote control apparatus 193.

When the controller 171 has detected that the power has been turned on, the controller 171 first becomes the master and establishes a wireless communication network in the periphery of the television receiver (step S22). By establishing this wireless communication network, the controller 171 judges whether the appliance composition of the wireless network has changed from the composition from the last time the power was turned on (step S23). When this judgement finds that there is no change in the appliance composition of the wireless network, the controller 171 sets the functions of the television receiver that are already stored (which is to say the functions set the last time the power was turned on) (step S24), with the signal processing of this television receiver being executed by these functions (step S25).

When the judgement in step S23 finds that there has been a change in the appliance composition of the wireless network, a process is performed to obtain information on each appliance (or information on the changed appliances) in the wireless network (step S26). By obtaining this appliance information, the controller 171 judges the functions of each expansion appliance or circuit board, and judges whether appliances that have suitable functions for use with the television receiver have been provided (step S27). Here, in the case of an appliance that is not suitable for use with the television receiver, the appliance is not used, and the processing proceeds to step S24 where the controller 171 sets the functions of the television receiver that are already stored (step S24), with the signal processing of this television receiver being executed by these functions (step S25).

When the judgement of the controller 171 in step S27 has found that an appliance with appropriate functions has been provided, the controller 171 decides the loads for processing image signals, etc., by the appliance (or circuit board) that have been newly provided and the signal processing unit that is provided in the television receiver from the outset, with the paths for transferring data being set based on the decided processing loads, and the transfers of data being performed using the transfer paths set in this way (step S28). Here, in the present embodiment, wireless transfer paths achieved by wireless communication are used as the transfer paths, and wireless transfer paths that use the wireless network established in step S22 are set so that data transfers can be performed in the appropriate range.

By setting such wireless transfer paths, the functions of the television receiver can be changed (step S29), so that the signal processing of image signals, audio signals, etc., that is required by the television receiver is executed by these changed functions (step S30).

In this way, by establishing a wireless network, confirming the appliance composition, etc., in this network by wireless communication, and setting the processing loads and transfer paths, the controller 171 can make all of the processing possible through wireless control, so that processing that uses the appliances and circuit boards held in the bays 4 can be executed easily and reliably.

Next, an example where the appliances and circuit boards that are held in the bays 4 are recognized and signal processing is executed in order by the recognized appliances and circuit boards is described with reference to FIG. 49.

Figure 49:
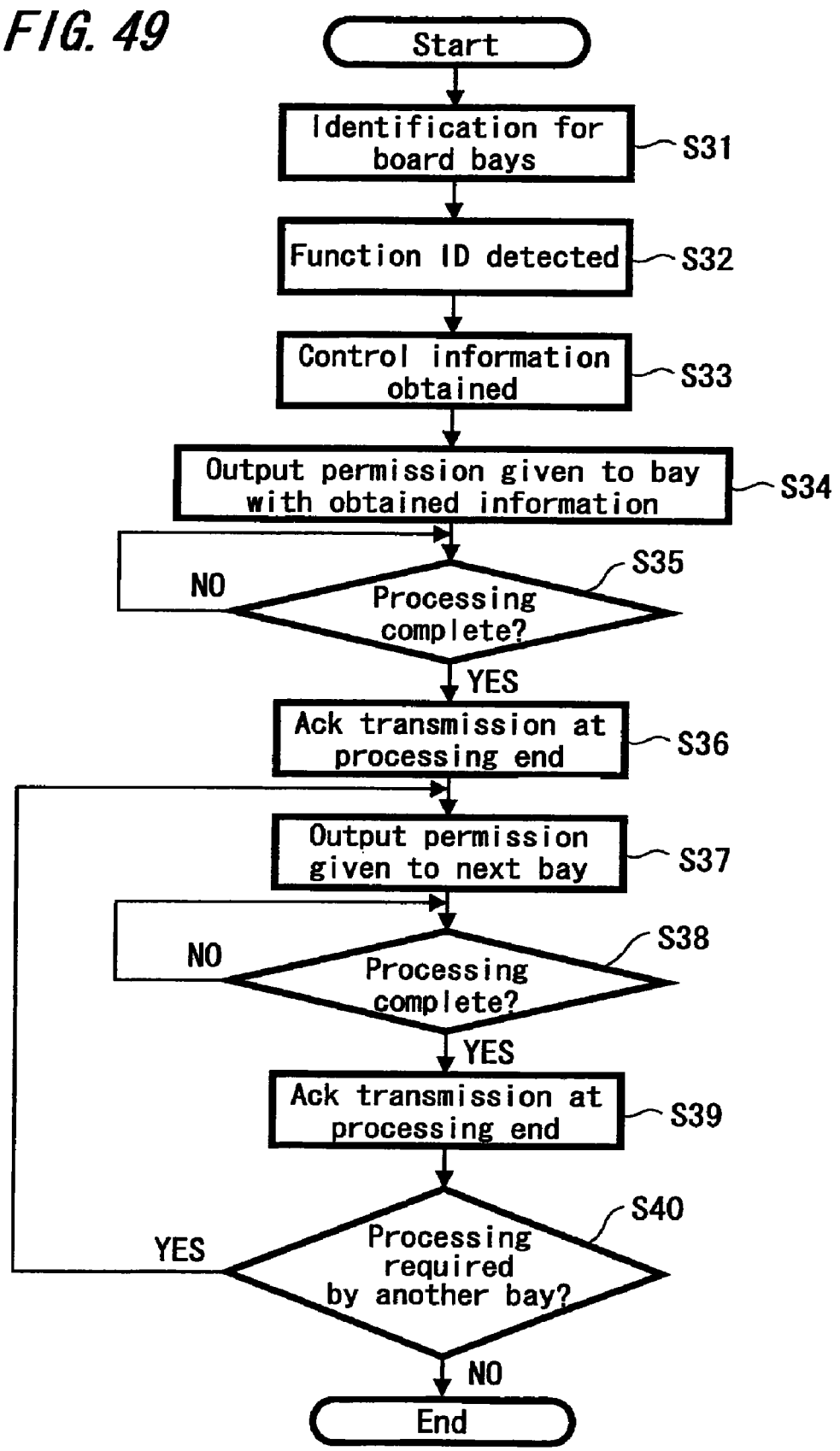
FIG. 49 is a flowchart showing an example of the recognition for a circuit board bay and the consecutive processing by an embodiment of the present invention.

In the example shown in FIG. 49, a plurality of circuit boards that have been provided are recognized and signal processing is successively executed by each of these circuit boards. First, the controller 171 recognizes the appliance ID of an expansion circuit boards (step S31), requests the transfer of the function ID of this circuit board and receives the function ID (step S32), and obtains control information for the expansion circuit board (step S33). Based on the obtained information, output permission is performed through wireless communication of signals to the bays in which the circuit board is provided (step S34), and the controller 171 waits until the processing of the outputted signals is complete (step. S35).

After this, when an acknowledge signal Ack showing that signal processing has ended is transmitted (step S36), output permission is performed for signals to another circuit board provided in a bay (step S37), and the controller 171 waits until the processing of the outputted signals is complete (step S38). In addition, when an acknowledge signal Ack showing that the signal processing has ended is transmitted from this circuit board (step S39), the controller 171 judges whether signal processing is required by another circuit board (step S40), and when signal processing is required by another circuit board, the processing returns to step S37, and output to that circuit board is permitted. Conversely, when in step S40 signal processing is not required by another circuit board, the processing that uses these expansion circuit boards ends.

By performing an output of signals to a recognized circuit board and the processing of signals sent to the circuit board as shown in the flowchart in FIG. 49 when images are actually received in the television receiver, signal processing can be executed using the expansion appliances and circuit boards. It should be noted that when the provision of appliances and circuit boards in the bays has been recognized by the processing shown in the flowchart of FIG. 47 and FIG. 48, for example, the processing shown in FIG. 49 may send image signals and audio signals for test purposes, with these test image signals and audio signals being processed by the expansion circuit boards, etc., and the controller 171, etc., then confirming the processing state. By doing so, the exchanging of acknowledge signals can be omitted when processing signals that are actually received as a television receiver.

Figures 50, 51:
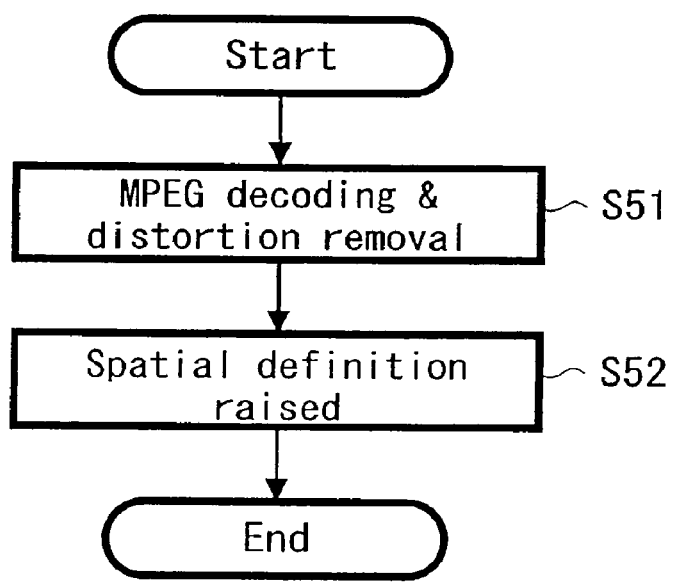
FIG. 50 is an explanatory figure showing an example of the control information table according to an embodiment of the present invention.
FIG. 51 is a flowchart showing an example of processing that is shared by the internal signal processing unit and an expansion appliance.

When the actual signal processing is executed in this way, information that shows in what order the data should be transferred in the wireless network, for example, is indicated as the control information in step S33. This is to say, as shown in FIG. 50 for example, for each appliance ID (or function ID) that is judged to have been provided, a table that includes the expansion appliance (circuit board) and stores in what order data should be transferred and processed is provided as storage data or the like in a built-in memory of the controller 171. Also, a processing order for input signals is set by control information that is based on the stored data in this table. In FIG. 50, in the control information, each wireless communication unit is shown as a node and data transfers are shown with regard to which nodes are passed and the order in which they are processed.

The following describes, with reference to the flowchart in FIG. 51, an example of the actual processing performed on an image signal using appliances that have been placed in the bays 4. In this example, the image signal processing function of a television receiver is changed using an appliance or circuit board that is provided in a bay 4 so that a higher quality processing result is obtained than when image signal processing is performed using the image signal processing unit in the television receiver alone. The signal processing unit in the expansion appliance corresponds to the image processing unit 160 in the television receiver shown in FIG. 12, for example, and the image processing unit that is provided in the television receiver from the outset corresponds to the image processing unit 153 in the television receiver shown in FIG. 12. It should be noted that in the following description, image (video) signals with standard resolution are referred to as SD (Standard Definition) image signals and image (video) signals with high resolution are referred to as HD (High Definition) image signals.

The following explanation refers to the flowchart in FIG. 51. First, in step S51 a specific signal processing unit in the appliance placed in the bay performs both an MPEG decoding process and a distortion removing process on an inputted image signal, and wirelessly transfers the SD image signal (from which distortion has been removed) of the component signal produced by such processing to the signal processing unit in the television receiver. The distortion removing processing referred to here removes distortion such as block distortion that is caused by the MPEG encoding, for example.

In step S52, the signal processing to which the decoded image signals have been wirelessly transmitted performs a spatial definition raising process on the SD image signal. The HD image signal of the component signal obtained by performing this spatial definition raising process is supplied to the display driver 158 and images are displayed on the CRT 2.

Next, the spatial definition raising process on an image signal (video signal) is described as an example of the processing inside one signal processing unit. As one example, this spatial definition raising process can be realized, for example, by classification/adaptive processing that has been previously proposed by the Applicant of this invention.

The classification/adaptive processing is composed of a classification process and an adaptive process, with the classification process dividing signals (data) into classes based on their properties and the adaptive process then being performed on each class.

Here, a spatial definition raising process that converts an SD image to an HD image is described as an example of the adaptive process.

In this case, the adaptive process finds estimated values for the pixels in an HD image that has a higher spatial definition than an SD image through a linear combining of the pixels (hereinafter referred to as "SD pixels" where appropriate) that compose the SD image and predetermined tap coefficients, and by doing so obtains an image with a higher resolution than the SD image.

In more detail, it is possible, for example, to set a given HD image as "teaching data" and an SD image that is a lower resolution version of the HD image as "study data", and to calculate estimated values E[y] for the pixel values y of the pixels (hereinafter referred to as "HD pixels" where appropriate) that compose an HD image using a linear one-dimensional combining model that is defined by the linear combination of a group of pixel values $x_1, x_2, \ldots$ of a number of SD pixels (pixels that compose the SD pixels) and predetermined tap coefficients $w_1, w_2, \ldots$. In this case, the estimated values E[y] are given by the following equation.

$$E[y] = w_1 x_1 + w_2 x_2 + \ldots \qquad \text{Equation 1}$$

In order to generalize Equation 1, a matrix W that is a group of tap coefficients $w_j$, a matrix X that is a group of study data $x_{ij}$, and the matrix Y that is a group of estimated values E[yj] are defined as shown below.

$$X = \begin{bmatrix} X_{11} & X_{12} & \cdots & X_{1J} \\ X_{21} & X_{22} & \cdots & X_{2J} \\ \cdots & \cdots & \cdots & \cdots \\ X_{I1} & X_{I2} & \cdots & X_{IJ} \end{bmatrix} \qquad \text{Equation 2}$$

$$W = \begin{bmatrix} W_1 \\ W_2 \\ \cdots \\ W_J \end{bmatrix}, \quad Y' = \begin{bmatrix} E[y_1] \\ E[y_2] \\ \cdots \\ E[y_I] \end{bmatrix}$$

When the matrices are defined as shown in Equation 2, the following observation equation is established.

$$XW = Y' \qquad \text{Equation 3}$$

Here, the component $x_{ij}$ of the matrix X refers to the jth study data in the ith group of study data (which is to say, the group of study data that is used to estimate the ith teaching data yi), with the component $w_j$ of the matrix W representing the tap coefficient that is multiplied with the jth study data in the group of study data. Also, yi represents the ith teaching data, so that E[yi] represents the estimated value of the ith teaching data. It should be noted that the "y" on the left side of Equation 2 is written with the suffix i of the components yi in the matrix Y having been omitted, and $x_1, x_2, \ldots$ on the right side of Equation 2 are also written with the suffix i of the $x_{ij}$ components in the matrix X having been omitted.

It is believed that by applying a least-square method on the observation equation, estimated values E[y] that are close to the pixel values y of the HD image can be found. In this case, a matrix E, which is composed of a group of the residuals e between (1) the matrix Y that is the group of the true pixel values y of the HD image that is the teaching data and (2) the estimated values E[y] for the pixel values y of the HD pixels, is defined as follows.

$$E = \begin{bmatrix} e_1 \\ e_2 \\ \cdots \\ e_i \end{bmatrix}, \quad Y = \begin{bmatrix} y_1 \\ y_2 \\ \cdots \\ y_i \end{bmatrix} \qquad \text{Equation 4}$$

The following residual equation is established from this Equation 4.

$$XW = Y + E \qquad \text{Equation 5}$$

In this case, tap coefficients $w_j$ for finding the estimated values E[y] that are close to the pixel values y of the HD pixels can be found by minimizing the squared errors shown by Equation 6 below.

$$\sum_{i=1}^{I} e_i^2 \qquad \text{Equation 6}$$

Accordingly, when the differential of the above squared errors with respect to the tap coefficients $w_j$ is zero, which is to say, when the tap coefficients $w_j$ satisfy the following equation, the values of the tap coefficients $w_j$ are optimal for finding estimated values E[y] that are close to the pixel values y of the HD pixels.

$$e_1 \frac{\partial e_1}{\partial w_j} + e_2 \frac{\partial e_2}{\partial w_j} + \ldots + e_I \frac{\partial e_I}{\partial w_j} = 0 (j = 1, 2, \ldots, J) \quad \text{Equation 7}$$

Accordingly, first Equation 5 is differentiated with respect to the tap coefficients wj to establish the following equation.

$$\frac{\partial e_i}{\partial w_1} = x_{i1}, \frac{\partial e_i}{\partial w_2} = x_{i2}, \ldots, \frac{\partial e_i}{\partial w_J} = x_{iJ}, (i = 1, 2, \ldots, I) \quad \text{Equation 8}$$

Equation 9 below is obtained from Equation 7 and Equation 8.

$$\sum_{i=1}^{I} e_i x_{i1} = 0, \sum_{i=1}^{I} e_i x_{i2} = 0, \cdots \sum_{i=1}^{I} e_i x_{iJ} = 0 \quad \text{Equation 9}$$

In addition, in view of the relationship between the study data xij, the tap coefficients wj, the teaching data yi, and the residuals ei in the residual equation, Equation 5, the following normal equations can be obtained from Equation 9.

$$\left(\sum_{i=1}^{I} x_{i1} x_{i1}\right) w_1 + \left(\sum_{i=1}^{I} x_{i1} x_{i2}\right) w_2 + \cdots + \left(\sum_{i=1}^{I} x_{i1} x_{iJ}\right) w_J = \left(\sum_{i=1}^{I} x_{i1} y_i\right)$$

$$\left(\sum_{i=1}^{I} x_{i2} x_{i1}\right) w_1 + \left(\sum_{i=1}^{I} x_{i2} x_{i2}\right) w_2 + \cdots + \left(\sum_{i=1}^{I} x_{i2} x_{iJ}\right) w_J = \left(\sum_{i=1}^{I} x_{i2} y_i\right)$$

$$\left(\sum_{i=1}^{I} x_{iJ} x_{i1}\right) w_1 + \left(\sum_{i=1}^{I} x_{iJ} x_{i2}\right) w_2 + \cdots + \left(\sum_{i=1}^{I} x_{iJ} x_{iJ}\right) w_J = \left(\sum_{i=1}^{I} x_{iJ} y_i\right)$$

Equation 10

It should be noted that for the normal equation shown above as Equation 10, the matrix A (a covariance matrix) and the vector V can be defined by Equation 11 below.

$$A = \begin{pmatrix} \sum_{i=1}^{I} x_{i1}x_{i1} & \sum_{i=1}^{I} x_{i1}x_{i2} & \cdots & \sum_{i=1}^{I} x_{i1}x_{iJ} \\ \sum_{i=1}^{I} x_{i2}x_{i1} & \sum_{i=1}^{I} x_{i2}x_{i2} & \cdots & \sum_{i=1}^{I} x_{i2}x_{iJ} \\ & & \cdots & \\ \sum_{i=1}^{I} x_{iJ}x_{i1} & \sum_{i=1}^{I} x_{iJ}x_{i2} & \cdots & \sum_{i=1}^{I} x_{iJ}x_{iJ} \end{pmatrix} \quad \text{Equation 11}$$

$$V = \begin{pmatrix} \sum_{i=1}^{I} x_{i1} y_i \\ \sum_{i=1}^{I} x_{i2} y_i \\ \vdots \\ \sum_{i=1}^{I} x_{iJ} y_i \end{pmatrix}$$

In addition, when the vector W is defined as shown in Equation 2, the vector W can be expressed as follows.

$$AW = v \quad \text{Equation 12}$$

For the normal equations shown as Equation 10, by providing a certain number of sets of the study data xij and the teaching data yi, the number of normal equations that can be formed is the same as the number J of tap coefficients wj to be found. Accordingly, by solving Equation 12 for the vector W (note that to solve Equation 12 the matrix A in Equation 12 must be regular), the optimal tap coefficients wj for solving Equation 12 can be found. It should be noted that when solving Equation 12, it is possible to use a sweeping method (the Gauss-Jordan elimination method), for example.

As described above, the adaptive processing uses study data and teaching data to study how to find optimal tap coefficients wj for estimating the teaching data from the study data and the tap coefficients, and then uses the tap coefficients wj in Equation 1 to find estimated values E[y] that are close to the teaching data y.

It should be noted that the adaptive processing differs from simple interpolative processing, for example, in that components that are not included in the SD image but are included in the HD image are regenerated. This is to say, while Equation 1 may appear the same as an interpolation process where a so-called interpolation filter is used, the tap coefficients w that correspond to the tap coefficients of such an interpolation filter are found through learning performed using teaching data and study data, so that the components included in the HD image can be regenerated. From this, it can be seen that the adaptive process has an image creating (resolution creating) effect.

While an example of where raising the spatial definition has been described as the adaptive processing, it is possible for various other types of processing, such as a raising of the S/N (Signal to Noise) ratio and/or a correction of fuzziness, may be performed using various types of tap coefficients obtained through learning performed with different teaching data and study data.

This is to say, in order to raise the S/N ratio or correct fuzziness by performing adaptive processing, tap coefficients can be found using image data with a high S/N ratio as the teaching data and an image produced by lowering the S/N ratio of the teaching data (or a blurred image) as the study data.

As another example, to collectively perform a composite/component conversion process and a spatial definition raising process via the adaptive processing, tap coefficients can be found by setting an HD image in the component signal as the teaching data and an image produced by lowering the spatial definition of the teaching data and converting it into a composite signal as the study data.

As yet another example, to have the adaptive processing perform a spatial definition raising process on an image of a component signal, tap coefficients can be found by setting an HD image in the component signal as the teaching data and an SD image produced by lowering the spatial definition of the teaching data as the study data.

As yet another example, to have the adaptive processing collectively perform an MPEG decoding process and a spatial definition raising process on an image that has been MPEG encoded, tap coefficients can be found by setting an HD image in a component signal after MPEG decoding as the teaching data and an image produced by lowering the spatial definition of the teaching data and encoding according to MPEG as the study data.

As yet another example, to have the adaptive processing collectively perform an MPEG decoding process and a spatial definition raising process on an image that has been MPEG encoded, tap coefficients can be found by setting an image in a component signal as the teaching data and an image produced by encoding the teaching data according to MPEG as the study data.

Figure 52:
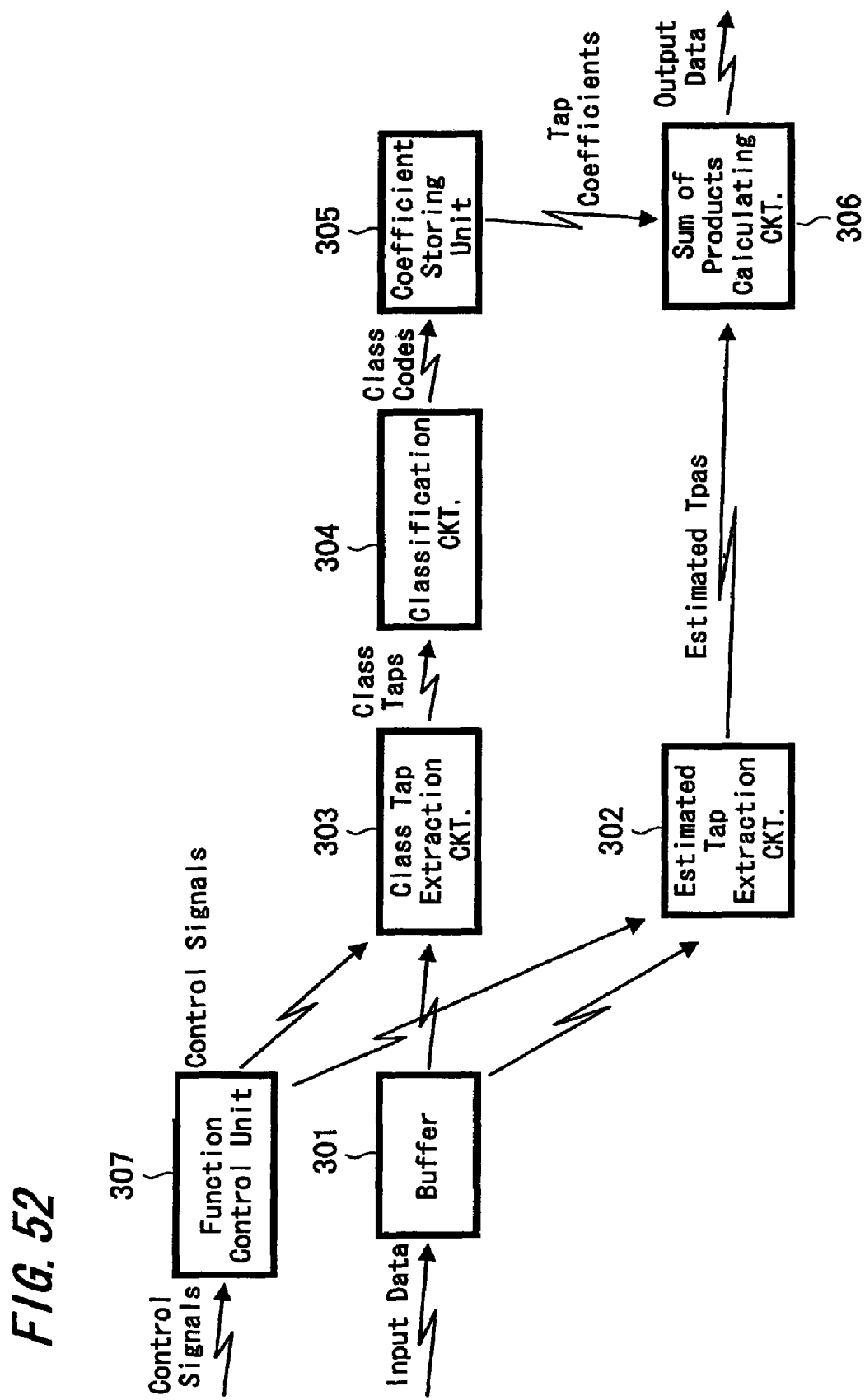
FIG. 52 is a block diagram showing an example of the internal construction of a signal processing unit.

The following describes, with reference to FIG. 52, an example of the construction of an image processing unit that is realized by a classification/adaptive processing circuit that performs the classification/adaptive processing described above. This image processing unit may be constructed so as to use all or part of the image processing unit 160 or 153 in the television receiver shown in FIG. 12, for example, and is an example where the data transfers between each block are performed by wireless communication. However, the construction shown in FIG. 52 shows the case where wireless communication is used to the greatest possible extent for the communication between blocks, and even where it is not explicitly stated, wireless communication may be used for data transfers between blocks as shown in FIG. 52. Here, it is possible to use a construction where some of the data transfers between blocks are performed using signal lines that directly connect the blocks, or to have transfers made using an internal bus. Alternatively, as described later, only the inputs and outputs for one block in a processing circuit may be performed via wireless communication, with the data transfers between other blocks being performed using signal lines.

The input data (input signal) to be processed by this circuit is supplied to a buffer 301 by a data transfer performed by wireless communication, with the buffer 301 temporarily storing the supplied input data.

An estimated tap extracting circuit 302 sets pieces of output data that are to be found by a sum of products calculating circuit 306 successively as focus data, has the input data that is used to estimate this focus data wirelessly transferred from the buffer 301, and sets the input data as estimated taps.

This is to say, in an example case where the input data is SD image data and the output data is HD image data produced by raising the spatial definition of the SD image, the estimated tap extracting circuit 302 extracts, as estimated taps, several SD pixels in the SD image that are located spatially or temporally close to a position corresponding to an HD pixel that is the focus data.

As another example case, the input data may be data produced by MPEG encoding an image and the output data may be image data produced by MPEG decoding this encoded data. In this case, the estimated tap extracting circuit 302 may extract, as estimated taps, DCT (Discrete Cosine Transform) coefficients that compose a DCT block (a block that is the unit for the DCT process performed during MPEG encoding) including the pixel that is the focus data, DCT coefficients or the like that are spatially or temporally positioned close to this DCT block, and additionally, in the case when the pixel that is the focus data has been produced by MPEG encoding an image of another frame (or field) as a predicted image (such as a P pictures or a B picture), the DCT coefficients and the like of the pixels that form the predicted image. It should be noted that it is also possible to set pixels in an image, which is a predicted picture which has already been outputted as output data, as estimated taps.

Once the estimated tap extracting circuit 302 has obtained the estimated taps for the focus data, the estimated tap extracting circuit 302 supplies these estimated taps for the focus data to the sum of products calculating circuit 306.

Control signals are transferred from a function control unit 307 to the estimated tap extracting circuit 302, with the estimated tap extracting circuit 302 determining the input data that composes the estimated taps (and output data), which is to say, the composition of the estimated taps, in accordance with these control signals from the function control unit 307.

A class tap extraction circuit 303 extracts input data, which is used for sorting the focus data into one of a plurality of classifications, from the buffer 301, and sets the input data as class taps.

The class tap extraction circuit 303 is also supplied with control signals from the function control unit 307, and like the estimated tap extracting-circuit 302, the class tap extraction circuit 303 determines the input data that composes the class taps, which is to say, the composition of the class taps, according to these control signals that are wirelessly transferred from the function control unit 307.

It should be noted that in order to simplify the explanation, the estimated taps obtained by the estimated tap extracting circuit 302 and the class tap extraction circuit 303 are set as having the same tap composition. However, it should be obvious that it is also possible for the estimated taps and class taps to have separate compositions.

The class taps for the focus data that have been obtained by the class tap extraction circuit 303 are supplied to a classification circuit 304. The classification circuit 304 classifies the focus data based on the class taps received from the class tap extraction circuit 303 and wirelessly transmits a class code corresponding to the class that is obtained as a result.

Here, ADRC (Adaptive Dynamic Range Coding) or the like may be used as the method for performing this classification.

In a method that uses ADRC, the input data that composes the class taps is subjected to ADRC processing and the class of the focus data is determined according to the resulting ADRC codes.

It should be noted that for k-bit ADRC codes, a maximum value MAX and a minimum value MIN of the input data that composes the class taps are detected, a local dynamic range DR for the group is set as DR=MAX−MIN, and the input data that composes the class taps is re-quantized to K-bit data based on this dynamic range DR. This is to say, out of the input data that composes the class taps, the minimum value MIN is subtracted and the result of this subtraction is divided (quantized) by the expression DR/2K. The K-bit input data that composes the class taps and has been obtained in this way is then outputted as bit sequences that have been arranged in a predetermined order as ADRC codes. Accordingly, if the class taps have been subjected to a 1-bit ADRC process for example, each piece of input data that composes the class taps has the minimum value MIN subtracted from it and is then divided by the average of the maximum value MAX and the minimum value MIN, so that each piece of input data is set as one bit (converted to binary). A bit sequence in which the pieces of 1-bit input data have been arranged in a predetermined order are then outputted as ADRC codes.

It should be noted that a level distribution pattern of input data that composes the class taps can also be outputted as it is by the classification circuit 304 as the class code, though in this case, if a class tap is composed of N pieces of input data and each piece of input data is assigned K bits, the number of combinations of class code that can be outputted by the classification circuit 304 is $(2N)^K$, which is a huge number exponentially proportional to the number of bits K of the input data.

Accordingly, it is preferable for the amount of information for the class taps to be compressed by the ADRC process described above and/or vector quantization before classification is performed in the classification circuit 304.

The class codes outputted by the classification circuit 304 are provided to a coefficient storing unit 305 as addresses.

The coefficient storing unit 305 stores tap coefficients that are obtained by performing a learning process, and the tap coefficients that are stored at an address corresponding to the class codes outputted by the classification circuit 304 are wirelessly transmitted to the sum of products calculating circuit 306.

It should be noted that as described later, a plurality of sets of tap coefficients, which are obtained by learning using a plurality of sets of teaching data and learning data, are stored in the coefficient storing unit 305. Out of the plurality of sets of tap coefficients stored in the coefficient storing unit 305, the set of tap coefficients to be used is determined in accordance with control signals that are wirelessly transmitted from the function control unit 307. This is to say, the coefficient storing unit 305 receives control signals that are wirelessly transmitted from the function control unit 307, determines which out of the sets of tap coefficients is to be used in accordance with these control signals, and wirelessly transmits a set of tap coefficients that corresponds to the class codes wirelessly transferred from the classification circuit 304 to the sum of products calculating circuit 306.

The sum of products calculating circuit 306 obtains estimated taps that have been wirelessly transferred from the estimated tap extracting circuit 302 and tap coefficients that have been wirelessly transferred from the coefficient storing unit 305, uses these estimated taps and tap coefficients to perform the linear predictive equation (sum of squares) shown as Equation 2, and wirelessly transfers the result of this calculation as output data to a latter-stage image processing unit.

Control signals from the controller 171 (see FIG. 13) of the television receiver are wirelessly transmitted to the function control unit 307, and in accordance with these control signals, the function control unit 307 controls the estimated tap extracting circuit 302, the class tap extraction circuit 303, and the coefficient storing unit 305 by wirelessly transferring control signals.

Figure 53:
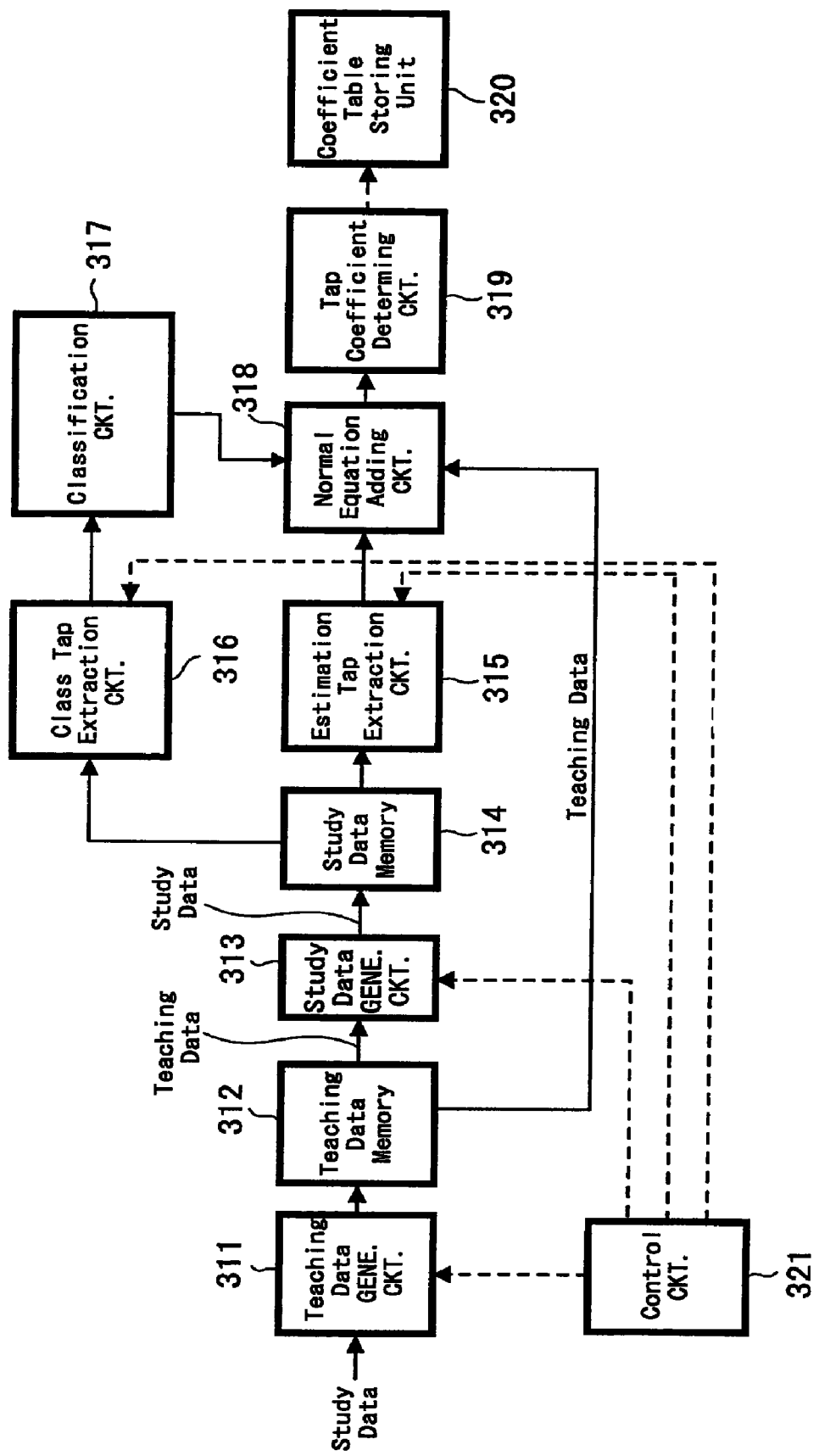
FIG. 53 is a block diagram showing an example of the internal construction of a signal processing unit.

FIG. 53 shows an example of the construction of a learning apparatus that performs a learning process for the tap coefficients stored in the coefficient storing unit 305 shown in FIG. 52. As the learning apparatus shown in FIG. 53, an example is shown where a coefficient memory 320 is supplied with coefficient data by wireless transfers and the supplying of control signals from the control circuits 321 to the other circuits is also performed by wireless transfers, though a construction where the transfers of other signals are performed wirelessly may be used.

A teaching data generating circuit 311 is supplied with learning data that is used in the learning. Here, high-quality data, such as HD image data or the like, may be used as the learning data.

The teaching data generating circuit 311 generates the teaching data that is the "teacher" for the learning from the learning data.

This is to say, in a case where the learning data is HD image data for example, the tap coefficients that are to be found by the learning are coefficients that convert an SD image into an HD image and/or coefficients that convert MPEG encoded data into an HD image, the teaching data generating circuit 311 may output the HD image data for the learning process data as it is as the teaching data.

As one example, when the learning process data is HD image data and the tap coefficients to be found through learning are coefficients for converting an SD image with a low S/N ratio to an SD image with a high S/N ratio and/or coefficients for converting an MPEG encoded image into an SD image, the teaching data generating circuit 311 subsamples, etc., a number of pixels from the HD image data for the learning data to generate SD image data and outputs the result as the teaching data.

The teaching data outputted by the teaching data generating circuit 311 is supplied to a teaching data memory 312. The teaching data memory 312 stores the teaching data received from the teaching data generating circuit 311.

A study data generating circuit 313 generates study data that is the "student" for the learning process from the teaching data stored in the teaching data memory 312.

This is to say, when the tap coefficients to be found by learning are coefficients for converting an SD image into an HD image, as described above an HD image used as the teaching data is stored in the teaching data memory 312, and in this case, the study data generating circuit 313 subsamples, etc., a number of pixels from the teaching data to generate SD image data and outputs this SD image data as the study data.

As another example, when the tap coefficients to be found by learning are coefficients for converting MPEG-encoded data into an HD image, as described above an HD image used as the teaching data is stored in the teaching data memory 312, and in this case, the study data generating circuit 313 encodes the teaching data according to MPEG to generate encoded data and outputs this encoded data as the study data.

As yet another example, when the tap coefficients to be found by learning are coefficients for converting an SD image with a low S/N ratio to an SD image with a high S/N ratio, as described above an SD image used as the teaching data is stored in the teaching data memory 312, though in this case, the study data generating circuit 313 generates the SD image data with the low S/N ratio by adding noise to the teaching data and outputs this generated SD image data as the study data.

As yet another example, when the tap coefficients to be found by learning are coefficients for converting an MPEG-encoded image to an SD image, as described above an SD image used as the teaching data is stored in the teaching data memory 312, and in this case, the study data generating circuit 313 generates the encoded data by encoding the teaching data according to MPEG and outputs the generated encoded data as the study data.

The study data outputted by the study data generating circuit 313 is supplied to a study data memory 314. The study data memory 314 stores the study data supplied from the study data generating circuit 313.

An estimated tap extraction circuit 315 successively sets each piece of teaching data stored in the teaching data memory 312 as focus data, and in the same way as the estimated tap extracting circuit 302 shown in FIG. 22, extracts the study data that is used to estimate this focus data from the study data memory 314, and sets the extracted data as the estimated taps. The estimated taps obtained by the estimated tap extraction circuit 315 are supplied to a normal equation adding circuit 318.

In the same way as the class tap extraction circuit 303 in FIG. 52, a class tap extraction circuit 316 extracts study data from the study data memory 314 using the classification of the focus data, and supplies the extracted study data to a classification circuit 317 as the class taps. In the same way as the classification circuit 304 shown in FIG. 52, the classification circuit 317 performs a classification using the class taps from the class tap extraction circuit 316, and supplies a class code showing the class of the focus data to the normal equation adding circuit 318.

The normal equation adding circuit 318 reads the teaching data that is the focus data from the teaching data memory 312 and performs a supplementing on the study data that composes the estimated taps from the estimated tap extraction circuit 315 and the teaching data that is the focus data.

This is to say, the normal equation adding circuit 318 uses estimated taps (study data) for each class that corresponds to the class code supplied from the classification circuit 317 to perform a calculation that corresponds to the summation (..) of the products (xinxim) of pairs of study data that are the components of the matrix A in Equation 12.

The normal equation adding circuit 318 also uses estimated taps (study data) and focus pixels (teaching data) for each class that corresponds to the class code supplied from the classification circuit 317 to perform a calculation that corresponds to the summation (..) of the products (xinyi) of study data and teaching data that are the components of the vector v in Equation 12.

The normal equation adding circuit 318 performs the above supplementing for all of the teaching data stored in the teaching data memory 312 as the focus data, and by doing so forms the normal equation shown in Equation 12.

A tap coefficient determining circuit 319 solves the normal equation generated by the normal equation adding circuit 318 for each class to find tap coefficients for each class, wirelessly transmits the tap coefficients to a coefficient table storing unit 320, and has the tap coefficients stored at addresses corresponding to each class in the coefficient table storing unit 320.

It should be noted that depending on the data provided as the learning data, there may be cases where there are classes for which the normal equation adding circuit 318 cannot obtain the required number of normal equations for finding the tap coefficients, though the tap coefficient determining circuit 319 may instead transmit default tap coefficients, for example, for such classes.

The coefficient table storing unit 320 stores tap coefficients for each class that have been wirelessly transferred from the tap coefficient determining circuit 319.

A control circuit 321 controls the processing of the teaching data generating circuit 311, the teaching data memory 312, the estimated tap extraction circuit 315, and the class tap extraction circuit 316 by wirelessly transmitting control signals, for example.

This is to say, in the learning apparatus of FIG. 53, as information showing what kind of processing for which tap coefficients are to be learnt, processing information that shows the content of the processing that uses the tap coefficients is operated upon by an operation unit (not shown in the drawing) and is set in the control circuit 321. In accordance with the processing information set by the operation of the operating unit, the control circuit 321 controls the teaching data generating circuit 311, the teaching data memory 312, the estimated-tap extraction circuit 315, and the class tap extraction circuit 316.

By doing so, the teaching data generating circuit 311 generates teaching data from the learning data in accordance with the control by the control circuit 321. The study data generating circuit 313 generates the study data from the teaching data also in accordance with the control by the control circuit 321. In addition, in the estimated tap extraction circuit 315, the tap composition of the estimated taps is set and estimated taps with this tap composition are generated in accordance with the control by the control circuit 321. In the class tap extraction circuit 316, the tap construction of the class taps is set and class taps with this construction are generated in accordance with the control by the control circuit 321.

Figure 54:
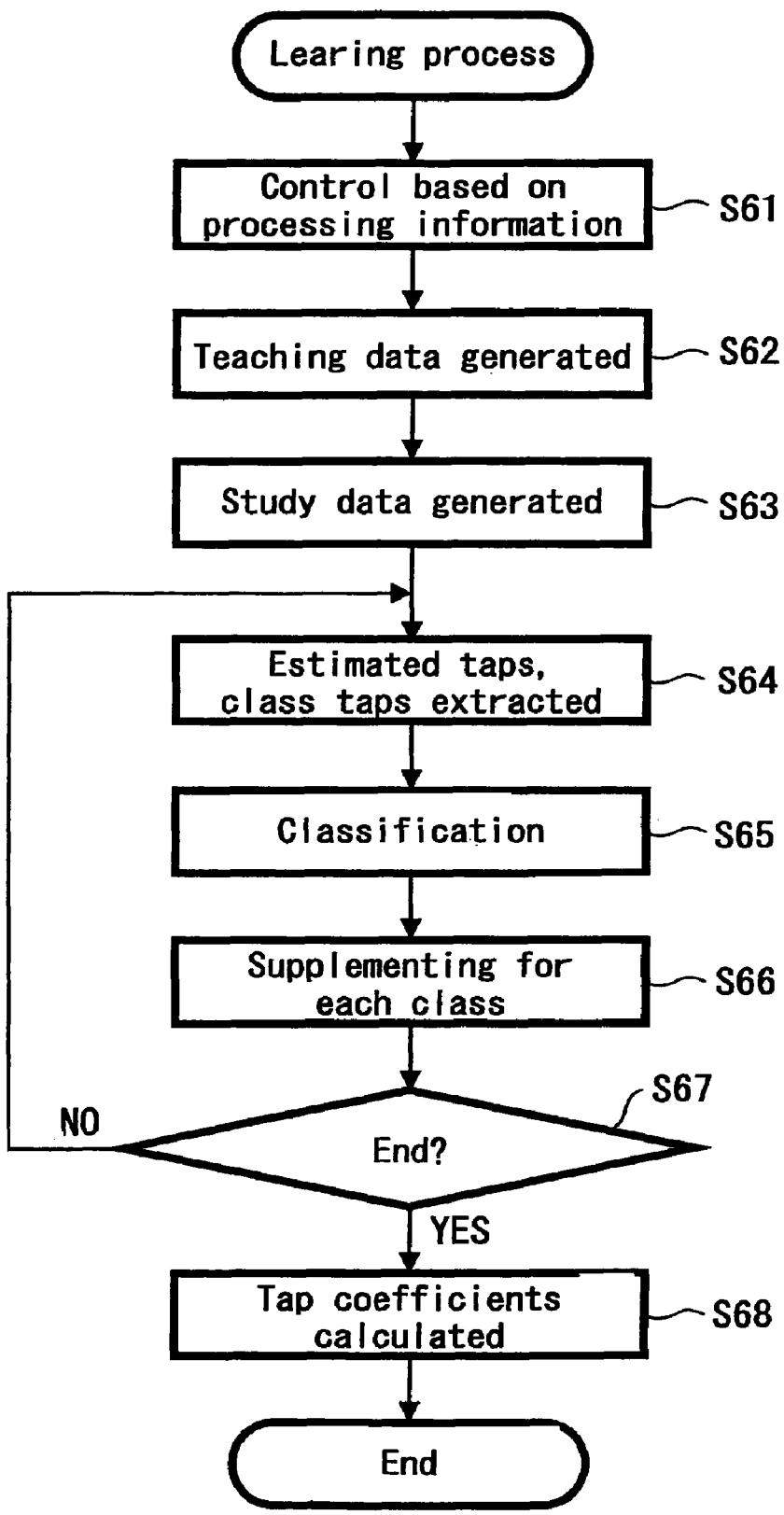
FIG. 54 is a flowchart showing an example of the learning process.

The following describes the processing (learning process) of the learning apparatus shown in FIG. 53, with reference to the flowchart shown in FIG. 54.

First, in step S61, the control circuit 321 controls the teaching data generating circuit 311, the teaching data memory 312, the estimated tap extraction circuit 315, and the class tap extraction circuit 316 based on the set processing information. This sets the method for generating the teaching data from the learning data in the teaching data generating circuit 311 and sets the method of generating the study data from the teaching data in the study data generating circuit 313. In addition, the tap composition of the estimated taps is set in the estimated tap extraction circuit 315 and the tap composition of the class taps is set in the class tap extraction circuit 316.

Next, the processing proceeds to step S62, where the teaching data generating circuit 311 generates the teaching data from the learning data with which it is supplied in accordance with the method of generating set in step S61, and supplies the teaching data to the teaching data memory 312 where the teaching data is stored.

After this, in step S63 the study data generating circuit 313 generates the study data from the teaching data stored in the teaching data memory 312 in accordance with the method of generating set in step S61, and supplies the study data to the study data memory 314 where the study data is stored.

Next, the processing proceeds to step S64, where the estimated tap extraction circuit 315 sets, as the focus data, a piece of the teaching data stored in the teaching data memory 312 that is yet to be placed in focus. Also, by reading out the study data from the study data memory 314, the estimated tap extraction circuit 315 generates estimated taps for the focus data that have the tap composition set in step S61 and supplies the estimated taps to the normal equation adding circuit 318.

Also, in step S64, by reading the study data from the study data memory 314, the class tap extraction circuit 316 generates class taps for the focus data with the tap composition set in step S61 and supplies the class taps to the classification circuit 317, with the processing then proceeding to step S65.

In step S65, the classification circuit 317 performs a classification using the class taps from the class tap extraction circuit 316 and finds the class code for the focus data. The classification circuit 317 supplies this class code to the normal equation adding circuit 318.

In step S66, the normal equation adding circuit 318 reads the teaching data that is the focus data from the teaching data memory 312 and performs the supplementing described above for the matrix A and the vector v in Equation 12, for the study data composed of the estimated taps supplied from the estimated tap extraction circuit 315 and the teaching data that is the focus data. Note that this supplementing is performed for each class corresponding to the class codes from the classification circuit 317.

Next, the processing proceeds to step S67, where the estimated tap extraction circuit 315 judges whether the supplementing has been performed for all of the teaching data stored in the teaching data memory 312 as focus data. When the estimated tap extraction circuit 315 judges that the supplementing has not been performed for all of the teaching data as focus data, the processing returns to step S64 where the estimated tap extraction circuit 315 sets a piece of the teaching data that has not yet been in focus as the new focus data and thereafter the same processing as above is repeated.

In step S67, when the estimated tap extraction circuit 315 judges that the supplementing has been performed for all of the teaching data as focus data, the processing proceeds to step S68 where the tap coefficient determining circuit 319 solves the normal equations generated for each class by the supplementing performed in the normal equation adding circuit 318 in step S66. By doing so, the tap coefficient determining circuit 319 finds the tap coefficients for each class. The tap coefficient determining circuit 319 transfers the tap coefficients to the addresses in the coefficient table storing unit 320 that correspond to each class to have the tap coefficients stored. At this point the processing is complete.

In this way, tap coefficients for each class, which are used for performing the processing that is expressed by the processing information set by the control circuit 321, are stored in the coefficient table storing unit 320.

The learning process performed by the above kind of learning apparatus is performed by changing the processing information set in the control circuit 321, with sets of tap coefficients being found for each piece of processing information.

In this way, the coefficient storing unit 305 in FIG. 52 stores a plurality of sets of tap coefficients that are found for each of a plurality of pieces of processing information.

Figure 55:
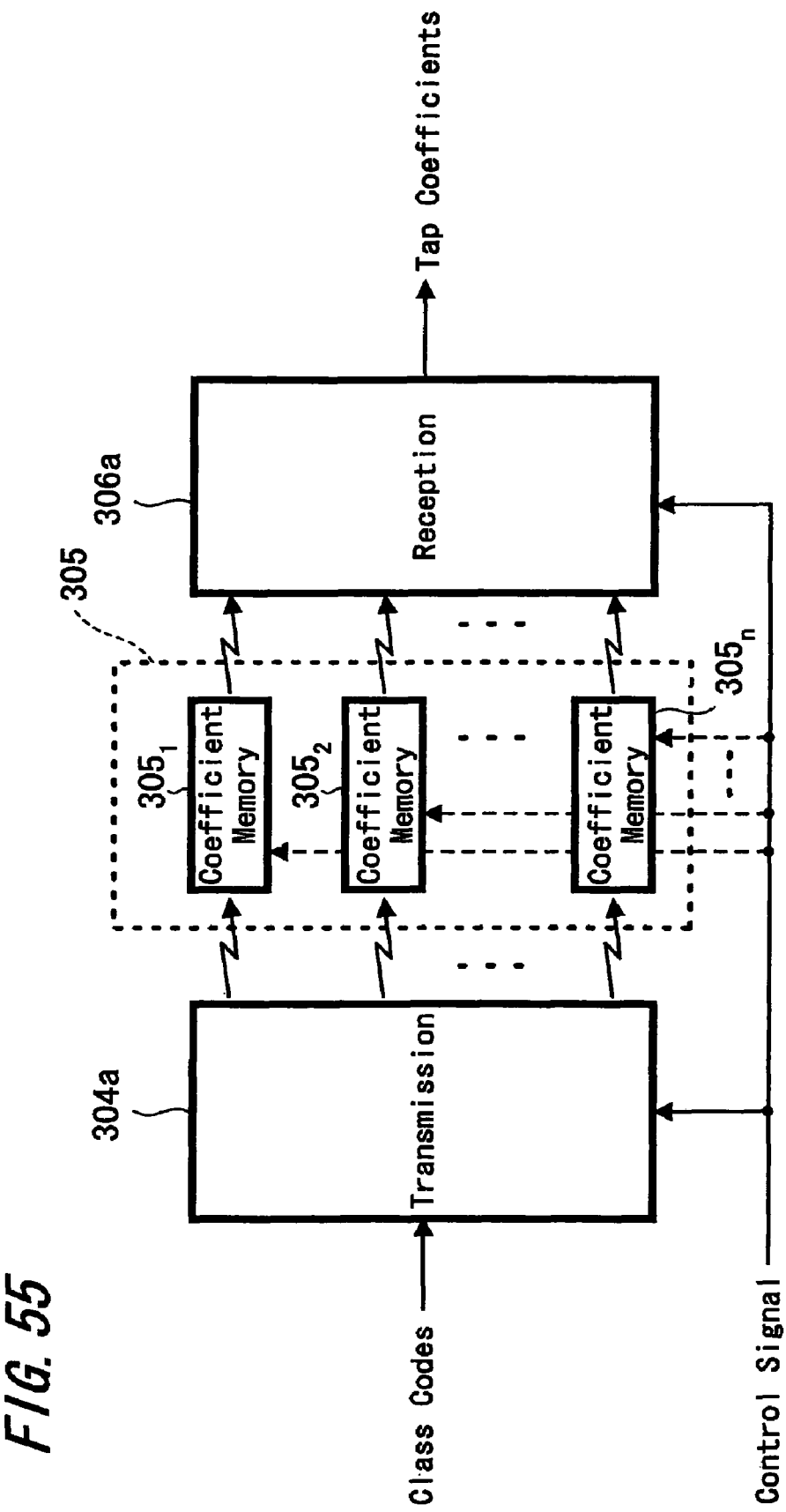
FIG. 55 is a figure showing an example construction of the coefficient storing unit.

Here, FIG. 55 shows an example of the composition of the coefficient storing unit 305 in FIG. 55.

The class codes that are wirelessly transmitted from a transmission unit 304a of the classification circuit 304 that is the former-stage circuit are stored in one coefficient memory selected out of N (where N is a freely chosen integer) coefficient memories 305₁ to 305N in the coefficient storing unit 305 in accordance with control signals from the function control unit 307. One of the outputs from the selected coefficient memory 305₁ to 305N is wirelessly transmitted as the tap coefficients to a reception unit 306a of the sum of products calculating circuit 306 that is a latter-stage circuit.

Each of the coefficient memories 305₁ to 305N stores a set of tap coefficients, which have been found by the learning apparatus shown in FIG. 53, for each piece of processing information.

In accordance with control signals supplied from the function control unit 307, the coefficient storing unit 305 with the composition described above uses one coefficient memory out of the N coefficient memories 305₁ to 305N to store the class codes. The coefficient storing unit 305 reads out the tap coefficients stored at the address corresponding to the class codes in this coefficient memory and transfers the tap coefficients to the sum of products calculating circuit 306 (see FIG. 52).

It should be noted that the coefficient memories 305₁ to 305N that store the sets of tap coefficients for each piece of processing information do not need to be physically separate memories. This is to say, the coefficient memories 305₁ to 305N can be realized by a single memory that is switched between these coefficient memories 305₁ to 305N, for example.

Here, in the present embodiment, by additionally providing an appliance or a circuit board in the bays 4, the functions of the image processing unit can be changed from a function that collectively performs a composite/component conversion process and a spatial definition raising process to a function that only performs a spatial definition raising process, and to do so, at least the following two sets of tap coefficients are stored in the coefficient storing unit 305 in the signal processing circuit.

This is to say, in the coefficient storing unit 305 in the image processing unit that is provided from the outset in the television receiver (for example the image processing unit 153 shown in FIG. 12), a first set of tap coefficients is stored in a coefficient memory 305i out of the plurality of coefficient memories 305₁ to 305N. This first set of tap coefficients is produced by performing a learning process with an HD image of a component signal as the teaching data and an image produced by converting an SD image, which has been obtained by lowering the spatial definition of the teaching data, from a component signal into a composite signal as the study data. In addition, a second set of tap coefficients is stored in a coefficient memory 305j out of the plurality of coefficient memories 305₁ to 305N. This second set of tap coefficients is produced by performing a learning process with an HD image of a component signal as the teaching data and an SD image, which has been obtained by lowering the spatial definition of the teaching data as the study data.

Also in the present embodiment, by additionally providing an appliance or a circuit board in the bays 4, the functions of the image processing unit can be changed from a function that collectively performs an MPEG decoding process and a spatial definition raising process to a function that collectively performs an MPEG decoding process and a distortion removing process, with at least the following two sets of tap coefficients being stored in the coefficient storing unit 305.

This is to say, as one example, a set of tap coefficients is stored in one coefficient memory 305i of a coefficient storing unit 135 of an image processing unit (the image processing unit 160 of FIG. 12, for example) in the appliance or circuit board additionally provided in the bays 4. This set of tap coefficients is obtained by performing a learning process with an HD image produced by MPEG encoding an HD image of a component signal and then MPEG decoding this encoded data as teaching data and encoded data produced by MPEG encoding an SD image produced by lowering the spatial definition of this teaching data as study data. In addition, another set of tap coefficients is stored in another coefficient memory 305j in the coefficient storing unit 305, with this set of tap coefficients being obtained by performing a learning process with an SD image in a component signal as the teaching data and encoded data produced by MPEG encoding the teaching data as the study data.

It should be noted that it is possible to store other tap coefficients in the coefficient storing unit 305 provided in the image processing unit. This is to say, as examples, tap coefficients that enlarge/reduce (i.e., resize) an image, tap coefficients that improve the resolution in the temporal axis, tap coefficients that improve the resolution in terms of color depth, tap coefficients that improve blurring, tap coefficients that remove noise and distortion, etc., may be stored in the coefficient storing unit 305, with it being possible to supply these coefficients to the processing units as required.

In this way, sets of various types of tap coefficients can be stored in the coefficient storing unit 305 and the decision as to which of these sets to use can be changed along with the tap compositions of the estimated taps and class taps, so that the function of the image processing unit in the television receiver can be changed easily.

The present case is a construction where wireless transfers are used for the inputs of data into the coefficient storing unit 305 in the present embodiment and the outputs of data from the coefficient storing unit 305, though it is possible for the coefficient storing unit 305 provided in any one of the image processing units to be shared by a plurality of image processing units. This is to say, as one example, a coefficient storing unit, which stores coefficients for improving the functions, may be provided in an expansion appliance or circuit board that is placed in the bays 4, and the processing of the image processing unit that is provided from the outset in the television receiver may be changed so as to obtain coefficients not from the coefficient storing unit provided in this image processing unit but instead from another coefficient storing unit that has been attached, which makes it easy to change the functions of the television receiver.

Such processing that changes which coefficient storing unit is used can be simply performed by changing the device with which wireless communication is performed, with for example a controller making appropriate changes when setting the wireless transfer paths, so that the functions can be changed. When doing so, switching by a physical switch or the like is completely unnecessary.

Figure 56:
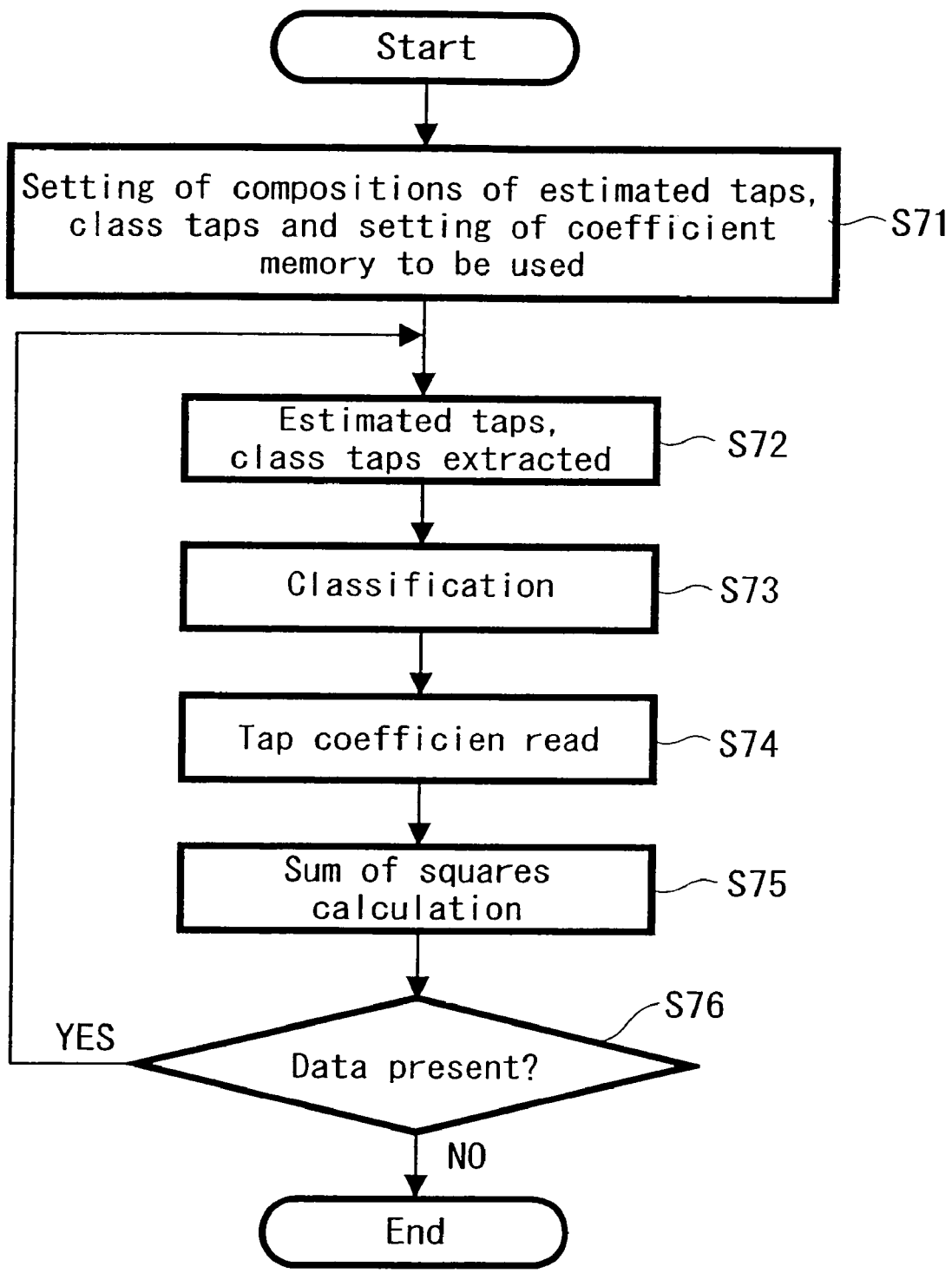
FIG. 56 is a flowchart showing an example of the processing by a signal processing circuit that includes a classification/adaptive processing circuit.

The following describes the processing of the signal processing circuit shown in FIG. 52 with reference to the flowchart in FIG. 56.

In step S71, the function control unit 307 receives control signals for changing the functions of the signal processing unit from the controller 171, and controls the estimated tap extracting circuit 302, the class tap extraction circuit 303, and the coefficient storing unit 305 in accordance with these control signals.

This is to say, the control signals supplied from the controller 171 to the function control unit 307 include processing information corresponding to a function ID stored in the controller 171 and the function control unit 307, in the same way as the control circuit 321 in FIG. 53, controls the estimated tap extracting circuit 302, the class tap extraction circuit 303, and the coefficient storing unit 305 in accordance with this processing information.

As a result, the estimated tap extracting circuit 302 is set so as to generate estimated taps with the same tap composition as the case with the estimated tap extraction circuit 315 of the learning apparatus shown in FIG. 53, and the class tap extraction circuit 303 is set so as to generate class taps with the same tap composition as the case with the class tap extraction circuit 316 of the learning apparatus shown in FIG. 53.

The coefficient storing unit 305 is set so as to use the coefficient memory 305$n$ (see FIG. 55) that stores a set of tap coefficients corresponding to the processing information included in the control signals from the function control unit 307.

After this, input data is supplied and stored in the buffer 301, and the processing proceeds to step S72 where the estimated tap extracting circuit 302 extracts data, out of the output data that is to be found by the sum of products calculating circuit 306, that is yet to be placed in focus as the focus data. Also, by reading out input data from the buffer 301, the estimated tap extracting circuit 302 generates estimated taps for the focus data with the tap composition set in step S71 and supplies these estimated taps to the sum of products calculating circuit 306.

Also, in step S72, by reading out the input data from the buffer 301, the class tap extraction circuit 303 generates class taps for the focus data with the tap composition set in step S71 and supplies these class taps to the classification circuit 304, with the processing then proceeding to step S73.

In step S73, the classification circuit 304 performs a classification using the class taps received from the class tap extraction circuit 303 and so finds the class code for the focus data. This class code is supplied to the coefficient storing unit 305.

When the coefficient memory 305$n$ set in step S71 is selected and a class code is supplied from the classification circuit 304, in step S74 the coefficient storing unit 305 reads out the tap coefficients from the address in the coefficient memory 305$n$ that corresponds to the class code received from the classification circuit 304 and supplies these tap coefficients to the sum of products calculating circuit 306.

The sum of products calculating circuit 306 obtains tap coefficients that have been supplied from the coefficient storing unit 305, and in step S75, uses these tap coefficients and the estimated taps supplied from the estimated tap extracting circuit 302 in step S72 to perform the sum of products calculation shown as Equation 2, thereby finding the estimated value for the focus data, which the sum of products calculating circuit 306 outputs as output data.

In this case, the output data outputted by the sum of products calculating circuit 306 is obtained using (1) the estimated taps and class taps with tap compositions corresponding to the processing data and (2) a set of tap coefficients, so that processing shown by the processing information is performed on the input data.

After this, the processing proceeds to step S76, where the estimated tap extracting circuit 302 judges whether there is still any output data that needs to be set as focus data. When the estimated tap extracting circuit 302 judges in step S76 that there is output data to be set as focus data, the processing returns to step S72, where output data that is yet to be set as focus data is set as the new focus data and the same processing as above is repeated.

On the other hand, when the estimated tap extracting circuit 302 judges in step S76 that there is no output data to be set as focus data, the processing ends.

As described above, in accordance with the processing information, the image processing unit in the television receiver changes its functions by setting the tap composition of the estimated taps generated by the estimated tap extracting circuit 302, the tap composition of the class taps generated by the class tap extraction circuit 303, and the type of set of tap coefficients that is used by the sum of products calculating circuit 306.

In the same way as the signal processing unit inside the television receiver, the function of a signal processing unit that has been placed in the bays can be changed. By changing the functions of each processing unit, the processing of input signals can be divided up among these processing units. In this case, output data with higher quality can be obtained than when the processing is performed by only one out of the plurality of image processing units available when expansion appliances or circuit boards have been provided.

This is to say, when for example the image processing unit 153 alone uses tap coefficients, which are obtained by performing a learning process with an HD image in a composite signal as the teaching data and data produced by converting an SD signal obtained by reducing the spatial definition of the teaching data from a component signal to a composite signal (hereinafter such tap coefficients are referred to as composite/component conversion and SD/HD conversion tap coefficients where appropriate), to process a baseband SD image signal that is outputted by the tuner 151 or 152 (see FIG. 12) and is also a composite signal, the SD image signal that is the composite signal is converted into an HD image signal that is a component signal.

The image processing unit 160 that is included in the electronic appliance that is placed in the bays 4 alone uses tap coefficients, which are obtained by performing a learning process with an HD image produced by MPEG decoding an HD image in a composite signal that has been MPEG encoded as the teaching data and encoded data produced by MPEG encoding an SD signal obtained by reducing the spatial definition of the teaching data (hereinafter such tap coefficients are referred to as MPEG decoding and SD/HD conversion tap coefficients where appropriate), to process encoded data produced by MPEG encoding the SD image signal of a component signal, thereby converting the encoded data to an HD image signal of a component signal.

On the other hand, when appliances and/or circuit boards are additionally provided and data transfer can be performed with the signal processing units in these appliances and/or circuit boards via wireless communication, the functions of the signal processing unit in the television receiver and the signal processing unit(s) in the expansion appliances can be changed and the processing of input signals can be divided up among these signal processing units.

This is to say, when an electronic appliance 11 that has the signal processing unit 160 including the unique block 213 shown in FIG. 16, for example, is additionally provided, the signal processing unit in this expansion electronic appliance uses tap coefficients, which are obtained by performing a learning process with an SD image of a component signal as the teaching data and encoded data produced by MPEG encoding the teaching data as study data (hereinafter such tap coefficients are referred to as MPEG decoding tap coefficients where appropriate), to process encoded data that is outputted by the unique block and is produced by MPEG encoding the SD image signal of the component signal, thereby converting the encoded data to the SD image signal of the component signal.

The image processing unit 153 in the television receiver uses tap coefficients, which are obtained by performing a learning process with an HD image of a component signal as the teaching data and an SD image produced by lowering the spatial definition of the teaching data as study data (hereinafter such tap coefficients are referred to as SD/HD converting coefficients where appropriate), to process an SD image signal that is a component signal obtained by the image processing unit 160 of the electronic appliance 11, thereby converting the SD image signal into an HD image signal of a component signal.

Accordingly, when processing is performed by only one of the image processing units 153 and 160, or when processing is performed cooperatively by both signal processing units, an HD image signal of a component signal is finally obtained.

However, while it is possible to perform to convert an SD image of a composite signal into an HD image of a component signal with a single process by having only one image processing unit use the composite/component conversion and SD/HD conversion tap coefficients, the accuracy of this conversion is inferior to the case where the conversion of an SD image of a composite signal to an SD image of a component signal and the conversion of an SD image of a component signal to an HD image of an component signal are performed separately.

This is to say, the conversion of an SD image of a composite signal into an SD image of a component signal can be performed using tap coefficients that are obtained by performing a learning process with an SD image of a composite signal as the teaching data and an SD image produced by converting this teaching data into a composite signal as the study data (hereinafter, such tap coefficients are referred to as composite/component conversion tap coefficients where appropriate).

The conversion of an SD image of a component signal to an HD image of a component signal can be performed using the aforementioned SD/HD tap coefficients (tap coefficients that are obtained by performing a learning process with an HD image of a component signal as the teaching data and an SD image produced by reducing the spatial definition of this teaching data as the study data).

The composite/component conversion tap coefficients are dedicated to a process that converts an SD image of a composite signal to an SD image of a component signal, and by focusing only on the conversion of a composite signal to a component signal, a more accurate conversion of an SD image of a composite signal to an SD image of a component signal can be performed than the conversion performed by composite/component conversion and SD/HD conversion tap coefficients that convert an SD image of a composite signal to an HD image of a component signal in a single process.

The SD/HD conversion tap coefficients are dedicated to a process that converts an SD image to an HD image, and by focusing on raising the spatial definition, it is possible to obtain an HD image in which the spatial definition of the SD image has been raised more accurately than when composite/component conversion and SD/HD conversion tap coefficients are used.

In the same way, by using MPEG decoding and SD/HD conversion tap coefficients, it is possible to subject encoded data that has been produced by MPEG encoding an SD image signal of a component signal to MPEG decoding and a conversion to an HD image in a single process, though compared to a case where MPEG decoding tap coefficients are used, the use of the MPEG decoding and SD/HD conversion tap coefficients results in lower decoding accuracy. Also, compared to when SD/HD converting tap coefficients are used, the use of the MPEG decoding and SD/HD conversion tap coefficients results in lower conversion accuracy.

From the above, it can be seen that when a plurality of signal processing units share the processing load and MPEG decoding tap coefficients are used to convert encoded data to an SD image and SD/HD conversion tap coefficients are then used to convert this SD image to an HD image, an HD image with higher quality can be obtained than when composite/component conversion and SD/HD conversion tap coefficients are used by the signal processing unit in the television receiver alone or than when MPEG decoding and SD/HD conversion tap coefficients are used by the signal processing unit in an expansion electronic appliance alone.

It should be noted that by using MPEG decoding tap coefficients, it is possible not only to decode encoded data according to MPEG but also to remove distortion such as block distortion that is caused by MPEG encoding.

This is to say, as described above, MPEG decoding tap coefficients are obtained by performing a learning process with an SD image of a component signal as the teaching data and encoded data produced by MPEG encoding this teaching data as the study data, so that encoded data can be converted to an image that has the minimum square error compared to the original image. Accordingly, when such MPEG decoding tap coefficients are used, encoded data is converted into an image that is close to the original image and is not distorted, so that in addition to MPEG decoding, distortion, such as block distortion that is caused by MPEG encoding, is also removed.

It should be noted that in a case where the tap coefficients are obtained by performing learning process with data produced by MPEG decoding an SD image that has been encoded as the teaching data and encoded data produced by MPEG encoding the teaching data as the study data, such tap coefficients convert encoded data to the decoded image that is obtained when MPEG decoding is performed as per normal, which is to say, an image that is close to a decoded image including block distortion and the like that is caused by MPEG encoding. This means that in this case, the removal of distortion mentioned above is not performed.

As described above, by placing an electronic appliance that can be set in one of the bays of the television receiver in a bay 4 of a bay-construction television receiver (see FIGS. 1 and 2) and performing data transfers between the electronic appliance and the circuits in the television receiver via wireless communication, the processing load can be shared and high-quality images, etc., can be obtained. The same processing can be performed by incorporating a device that performs the same type of processing as a circuit board 81 as shown in FIG. 9 or FIG. 11 and attaching the circuit board 81 using a bay adapter box 14 or the like. When this kind of circuit board 81 is used, in place of the bays shown in FIG. 1 it is possible to provide a construction for inserting expansion circuit boards at the back of the television receiver, for example, with the same kind of processing being performed by attaching the appropriate circuit board 81 at the position where this construction is provided.

Also, with the present embodiment, data transfers to and from the expansion appliances and circuit boards are performed via wireless communication, so that there is no need for the bays for housing appliances or the construction for housing expansion circuit boards to be integrally formed with the main body of the television receiver, and bays and an construction for expansion circuit boards may be provided on a rack on which the television receiver is placed, for example.

Also in the present embodiment, data transfers between circuits (blocks) that compose an integrated circuit or the like within one appliance or circuit board are also performed via wireless communication, so that it is easy to exchange or additionally provide certain circuit components in the appliances or circuit boards without having to change the wiring of the circuit boards. This is to say, the coefficient storing unit 305 shown in FIGS. 52 and 55, for example, is composed so as to perform data inputs and outputs via wireless transfers, so that the circuit components composing this coefficient storing unit 305 can be attached to the circuit board with only the minimum connections, such as a connection to a power supply circuit. There is no need to connect a large number of circuit pins or the like, so that it is extremely easy to exchange or increase the circuit components that compose the coefficient storing unit 305.

It should be noted that in the above case, different functions are achieved by constructing each of the image processing units with a classification/adaptive processing circuit that performs the classification/adaptive processing shown in FIG. 52, though as an alternative construction, it is also possible for each image processing unit to be constructed with modules (blocks) that perform processing that is suited to each of the different functions.

FIG. 57 shows an example of a different construction for the image processing unit 153 in the television receiver and the image processing unit 160 in the electronic appliance 11 that have been described thusfar.

This is to say, FIG. 57A shows an alternative construction for the image processing unit 153. Here, the signal processing circuit 202 (see FIG. 15) in the image processing unit 153 is not composed of a classification/adaptive processing circuit, but instead includes a conversion unit 205, a spatial definition raising processing unit 206, a noise removal processing unit 207 and an interface unit 203. In the same way as with the construction shown in FIG. 15, a transmission/reception processing circuit 204 that performs data transfers for this signal processing circuit 202 and the controller 201 via wireless communication is provided.

FIG. 57B shows an alternative construction for the image processing unit 160. In this case, a classification/adaptive processing circuit is not included, and instead an MPEG decoder 216, a distortion removal processing circuit 217 and an interface unit 214 are provided as the signal processing circuit 212 (see FIG. 16) that executes processing under the control of the controller 211. Like the construction shown in FIG. 16, a unique block 213 and a transmission/reception processing circuit 215 are provided.

When processing is performed by the image processing unit 153 alone, an SD image signal of a composite baseband signal that is wirelessly transferred by the tuner 151 or 152 (see FIG. 12) for example is received by the transmission/reception processing circuit 204 and is supplied via the interface unit 203 to the signal processing circuit 202.

In the signal processing circuit 202, the signal from the tuner 151 or 152 is processed by the exchanges shown by the dotted lines in FIG. 57A.

This is to say, in the signal processing circuit 202, the inputted SD image signal of the composite signal is supplied to the conversion unit 205. In the conversion unit 205, the supplied SD image signal of the composite signal is converted to an SD image signal of a component signal and sent back to the interface unit 203. This converted SD image signal of the component signal is then supplied to the spatial definition raising processing unit 206 by the interface unit 203.

In the spatial definition raising processing unit 206, processing that raises the spatial definition of the supplied SD image signal of the component signal is performed, and the HD image signal of the component signal obtained as a result is sent back to the interface unit 203. This HD image signal of the component signal is then supplied to the noise removal processing unit 207 by the interface unit 203.

In the noise removal processing unit 207, noise removal processing is performed on the supplied HD image signal and the resulting HD image signal is sent back to the interface unit 203. After this the interface unit 203 supplies the HD image signal from the noise removal processing unit 207 to the transmission/reception processing circuit 204, and the HD image signal is wirelessly transmitted from the transmission/reception processing circuit 204.

This signal that is wirelessly transmitted from the transmission/reception processing circuit 204 is supplied to the display driver 158 (see FIG. 12), for example, and a corresponding HD image is displayed on the CRT 2.

Accordingly, when processing is performed by only the image processing unit 153, which is built into the television receiver, there is a function that converts a composite signal to a component signal, a function that raises the spatial definition (a function that converts an SD image to an HD image), and a function that removes noise.

On the other hand, when processing is performed by only the image processing unit 160 in an electronic appliance that is additionally placed in one of the bays of the television receiver, encoded data that is outputted by the unique block 213 and is obtained by encoding an SD image is supplied to the signal processing circuit 212.

In the signal processing circuit 212, the encoded data is processed by the exchanges shown by the dotted lines in FIG. 57B.

This is to say, in the signal processing circuit 202, the interface unit 214 receives the encoded data from the unique block 213. Next, the interface unit 214 supplies the encoded data to the MPEG decoder 216.

The MPEG decoder 216 MPEG decodes the supplied encoded data and sends back the decoded image signal (SD image signal) obtained as a result to the interface unit 214.

The interface unit 214 then supplies this decoded image signal to the distortion removal processing circuit 217.

The distortion removal processing circuit 217 performs distortion removal processing that removes block distortion from the supplied decoded image signal, and sends back the resulting decoded image signal to the interface unit 214. The interface unit 214 supplies the decoded image signal from the distortion removal processing circuit 217 to the transmission/reception processing circuit 215, which wirelessly transmits the decoded image signal.

Accordingly, when processing is performed by only an expansion electronic appliance placed in one of the bays, the signal processing circuit 212 of the electronic appliance has a function for MPEG decoding image data that has been MPEG encoded and a function for removing block distortion and the like.

The following describes an example where the processing is shared between an expansion electronic appliance in a bay and the image processing unit inside the television receiver when the constructions shown in FIGS. 57A and 57B are used. This is to say, by detecting the appliance in the bay and checking the function ID of this appliance, the controller 171 of the television receiver can change the signal processing function.

As one example, the signal processing circuit 202 is changed from having three functions described above that are a function that converts a composite signal to a component signal, a function that raises the spatial definition, and a function that removes noise to having only a function that raises the spatial definition.

The signal processing circuit 212 is kept with the two functions mentioned above, a function for MPEG decoding encoded image data and a function for removing block distortion and the like.

Figure 58:
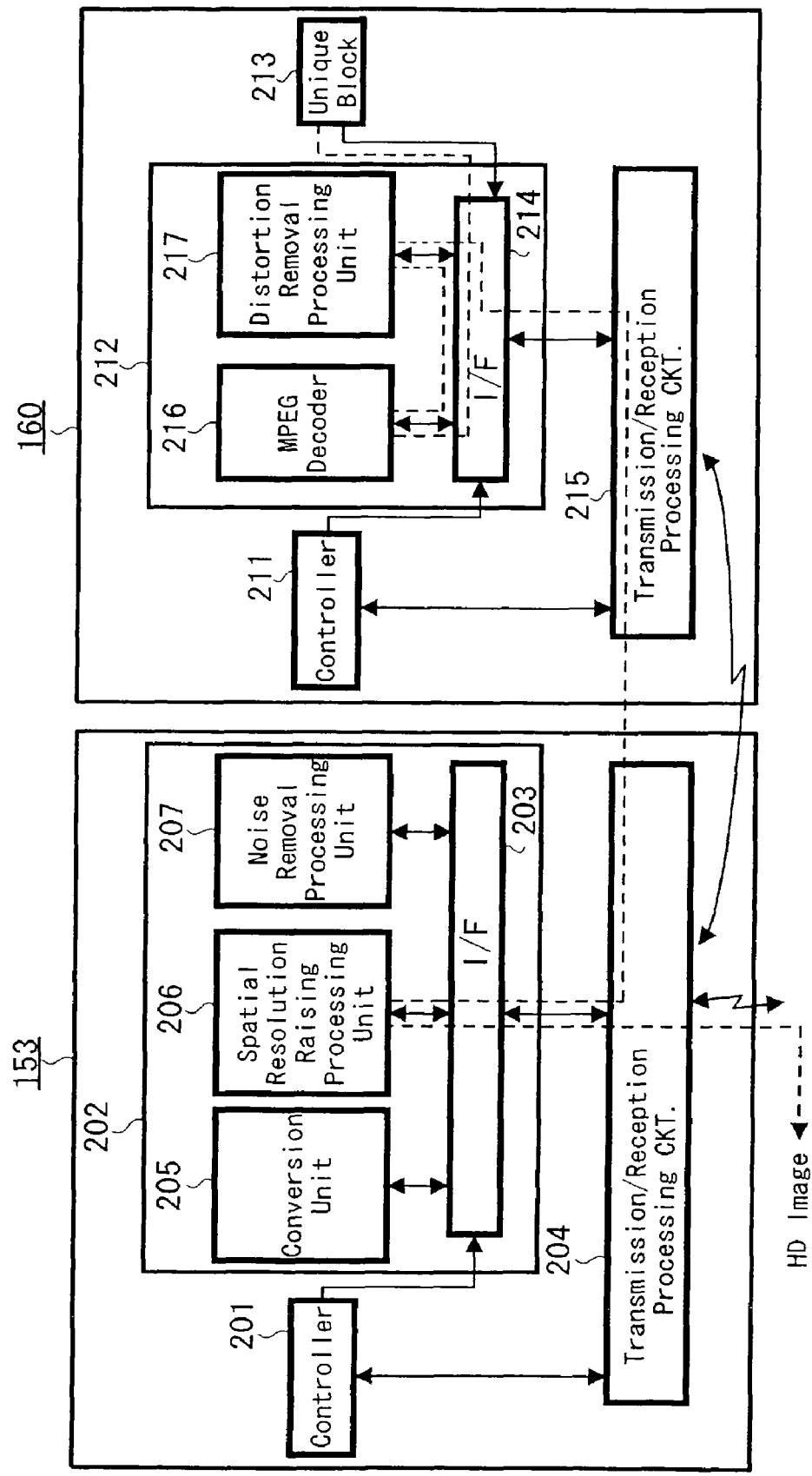
FIG. 58 is an explanatory figure showing the processing executed when processing is shared out between the internal signal processing unit and the expansion appliance.

In the signal processing circuit 202 and the signal processing circuit 212, encoded data is processed by the exchanges shown by the dotted lines in FIG. 58.

This is to say, in the signal processing circuit 212, the same processing is performed as in FIG. 57B, which results in a decoded image signal from which distortion has been removed being wirelessly transmitted from the transmission/reception processing circuit 215.

This decoded image signal that has been wirelessly transmitted is received by the transmission/reception processing circuit 204 in the image processing unit 153 of the television receiver. It should be noted that depending on the construction of the wireless network, the decoded image signal may be wirelessly transferred via another wireless communication unit.

The image signal received by the transmission/reception processing circuit 204 is supplied to the spatial definition raising processing unit 206 via the interface unit 203, processing that improves the spatial definition of the decoded image signal is performed, and the HD image signal obtained as a result is set to the transmission/reception processing circuit 204 via the interface unit 203 and is wirelessly transmitted.

The signal wirelessly transmitted from this transmission/reception processing circuit 204 is supplied to the display driver 158 (see FIG. 12) for example, and a corresponding image is displayed on the CRT 2.

Accordingly, when processing is performed by only the appliance that includes the image processing unit 160, encoded data is MPEG decoded, with distortion being removed from the resulting decoded image signal. However, when the processing is shared by this appliance and the circuit in the television receiver, it is possible to obtain an HD image signal where the spatial definition of the decoded image signal, from which the distortion has been removed, is improved.

It should be noted that when as shown in the examples in FIGS. 57A, 57B, and 58, the signal processing circuit 202 and 212 are composed of modules (blocks) corresponding to different functions, it is necessary for the signal processing circuits 202 and 212 to have the same number of modules as the number of functions, and since the number of modules increases as the number of functions increases, the scale of the circuits becomes large.

On the other hand, when the signal processing circuits 202 and 212 include classification/adaptive processing circuits as shown in FIG. 52, fundamentally the only thing that increases when the number of functions increases is the storage capacity of the coefficient storing unit 305, so that increases in circuit scale can be tempered. Also, as shown in FIGS. 17 and 18, when the signal processing units are constructed so that data transfers within the signal processing units are performed by wireless communication, it is easy to replace the coefficient storing unit 305 and the like, so that the coefficient storing unit can be changed when changing the functions, which makes it easy to improve the functions.

It should be noted that by using the image processing units described above, the series of processes described above can be executed by hardware or by software. When the series of processes is executed by software, the program that composes such software is installed into a computer, such as a microcomputer.

Figure 59:
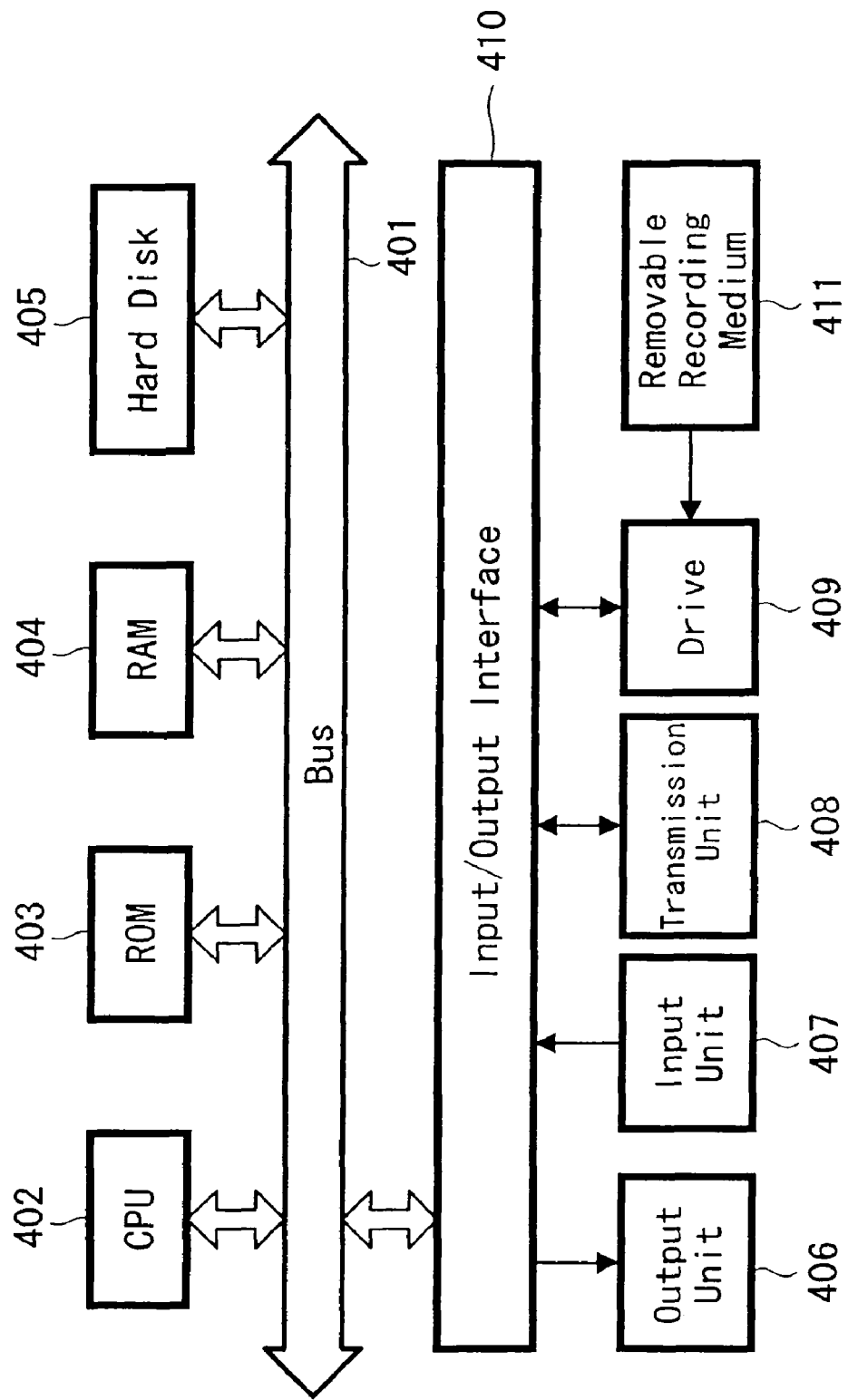
FIG. 59 is a block diagram showing an example of the construction of a computer to which the present invention can be applied.

FIG. 59 shows an example construction of a computer in which a program that executes the series of processes described above has been installed.

The program can be stored in advance in a hard disk drive 405 or a ROM (Read Only Memory) 403 that is a recording medium provided inside the computer.

Alternatively, the program may be stored (recorded) temporarily or permanently on a removable recording medium 411 such as a magnetic disc, a CD-ROM (Compact Disc Read Only Memory), an MO (Magneto optical) disc, a DVD (Digital Versatile Disc), or a semiconductor memory. This kind of removable recording medium 411 can be provided as what is called "packaged software".

It should be noted that instead of installing the program from the above kind of removable recording medium 411, the program may be transferred from a download-site wirelessly via a digital satellite broadcasting satellite, or transferred via a transfer medium such as a LAN: (Local Area Network), the Internet, etc., to the computer wirelessly or over wired lines, with a reception unit 408 in the computer then receiving the transferred program and the program being installed onto an internal hard disk drive 405.

The computer is internally provided with a CPU (Central Processing Unit) 402. The CPU 402 is connected via a bus 401 to an input/output interface 410, and when an instruction, which has been inputted by the user through an operation of an input unit 410 such as a keyboard, a mouse, a microphone, etc., is inputted into the CPU 402 via the input/output interface 410, the CPU 402 executes a program stored in the ROM (Read Only Memory) 403 in accordance with the instruction. Alternatively, the CPU 402 loads into the RAM (Random Access Memory) 404 a program that has been stored on the hard disk drive 405, a program that has transferred via a satellite or a network, received by a communication unit 408, and installed on the hard disk drive 405, or a program that has been read from a removable recording medium 411, which has been placed in a drive 409, and installed on the hard disk drive, and executes the loaded program. By doing so, the CPU 402 executes processing in accordance with the flowcharts described above or the processing with the construction shown in the block diagrams described above. As necessary, the CPU outputs the processing result via the input/output interface 410 to an output unit 406 composed of an LCD (Liquid Crystal Display) and speakers, or has the processing result transmitted from the communication unit 408 and recorded on the hard disk drive 405.

In the present specification, a processing step that writes the program for having a computer perform various processes does not need to have the processing performed in series in the order in which the flowcharts are written, so that parallel processes and processes performed independently (such as parallel processes and processing by objects) may be included.

The programs may be executed by a single computer or may be executed by distributed processing by a plurality of computers. The program may also be transferred to a remote computer and executed.

The processing by a computer may execute part of the processing of the television receiver. This is to say, in the above example, since a construction is used where wireless communication is performed between the television receiver and expansion appliances, the expansion appliances may be replaced with a computer, wireless communication may be performed between the television receiver and the computer, and part of the image processing in the television receiver may be executed within the computer.

It should be noted that the electronic appliances placed in the bays 4 of the bay-construction television receiver (see FIGS. 1 and 2) are not limited to the DVD player and digital VTR, etc., that are mentioned above, so that a printer, a HD (Hard Disk) recorder or any other kind of device may be placed in the bays 4.

Also, the above explanation describes an example where the tuners 151, 152, and image processing unit 153, etc., are incorporated in advance in the TV rack 1 (see FIG. 1) that composes the television receiver main body to construct a bay-construction television receiver (see FIGS. 1 and 2) and an appliance that includes only the image processing unit 160 is placed in a bay 4, though each processing unit such as the tuners 151, 152, and the image processing unit 153 may be constructed as appliances that are placed in the bays 4 of the TV rack 1.

In the present embodiment, two image processing units 153, 160 are described as sharing the processing load, though the processing load may be shared by three or more processing units (electronic appliances). The content of the processing may also differ from that described and so include other processes such as temporal resolution creation, color depth creation, etc.

Also, the above embodiment describes, with reference to FIGS. 19 to 46, a case where wireless signals are transmitted by electrical waves, though the data transfers between an appliance placed in a bay and the television receiver may be performed using infrared signals. In this case, stream data such as image signals and audio signals may be transferred by electric waves using the method described above, and control signals from the controller, etc., may be transferred by infrared signals.

Also, some of the signals may be directly transmitted using wired signal lines. As one example, transfers from the television receiver to an appliance that has been placed in a bay may be performed via wired transfer lines that are connected via terminals, and the transfer to the television receiver of the signals that have been processed by the appliance placed in the bay may be performed by wireless communication.

In the present embodiment, sets of different types of tap coefficients are stored in advance in the coefficient storing unit 305, with the functions of the signal processing circuit 202 being changed by changing the set of tap coefficients that is used, though tap coefficients for changing the functions of the signal processing circuit 202 do not need to be stored in advance in the coefficient storing unit 305, and instead may be downloaded from outside.

This is to say, as described with reference to FIG. 1, for example, a mobile phone may be placed in a bay 4G of a bay-construction television receiver. When a mobile phone has been placed in the bay 4G in this way, the communication function of the mobile phone may access a server on the Internet or another network and download the required tap coefficients. The tap coefficients may alternatively be downloaded from another appliance such as a computer.

In this case, by providing a short-range wireless communication processing unit, which performs the same wireless communication method as the wireless communication executed inside the television receiver, in an appliance such as a mobile phone or a computer, wireless communication can be performed directly between the mobile phone, etc., and the coefficient storing unit 305 (or a circuit in the periphery of the coefficient storing unit 305), so that tap coefficients of the like can be directly transmitted to the coefficient storing unit 305 and the tap coefficients can be updated without passing via other circuits in the television receiver.

It should be noted that information relating to the tap composition of the estimated taps and class taps may be downloaded from the outside in the same way.

Here, as described above, when the tap coefficients are downloaded from the outside, it is necessary to store the downloaded tap coefficients (hereinafter referred to as downloaded tap coefficients) in the coefficient storing unit 305, so that the coefficient storing unit 305 needs to have a storage region for storing the downloaded tap coefficients.

Accordingly, in addition to the minimum required storage region for the tap coefficients, the coefficient storing unit 305 can be constructed with a storage region for storing downloaded tap coefficients.

Also, in the example in FIG. 55, as a basic rule one set of tap coefficients is stored in one coefficient memory 305$n$ in the coefficient storing unit 305, though in cases where one set of tap coefficients cannot be stored in one coefficient memory 305$n$ due to a larger number of bits in the tap coefficients or a larger number of classes, a plurality of coefficient memories out of the coefficient memories 305$1$ to 305N can be used to store one set of tap coefficients.

The above embodiment describes the case where image signals (video signals) are processed, though the present invention can be adapted to the processing of other types of signals, such as audio signals.

As described above, with the signal processing apparatus, signal processing method, program, medium, and signal processing system according to the present invention, it is possible to judge whether another apparatus is connected and the processing functions for input signals are changed depending on whether when another apparatus is connected or not connected. In this case, data transfers to and from the other apparatus are performed via wireless communication, so that the other apparatus does not need to be connected using physical signal lines and the connecting structure, etc., can be simplified. Accordingly, it is easy to share out the processing of an input signal among a plurality of apparatuses, and a processing result can be obtained with higher quality than when only one apparatus is used, for example.

Also, with the signal processing apparatus, signal processing method, program, medium, and signal processing system according to the present invention, the data transfers inside the apparatus are executed by wireless communication, so there is no need to make connections inside the apparatus with physical signal lines, which results in a corresponding simplification in the internal wiring. Also, the blocks that perform wireless communication do not require wiring and so can be easily removed from the circuit boards and the like of the apparatus, so that part of the signal processing means, for example, can be easily replaced.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A signal processing apparatus for processing an input signal, comprising:
    first signal processing means for processing one or more input signals, the first signal processing means including a television receiver that wirelessly transfers image data and audio data among functional units of the television receiver;
    one or more additional signal processing means for processing the one or more input signals, each having an associated processing function, the one or more additional signal processing means including a mobile phone;
    communication means for performing data transfers between the first signal processing means and the additional signal processing means via wireless communication, wherein the first and the additional signal processing means are adapted to form an appliance composition of a wireless network; and
    control means for determining the associated processing function of each of the one or more additional signal processing means when a change in the appliance composition of the wireless network has been detected,
    wherein when the control means determines that the associated processing function of the one or more additional processing means is suitable, the control means decides processing loads associated with the one or more additional signal processing means and changes the associated processing function of the first processing means, and
    wherein when the control means determines that the associated processing function of the one or more additional signal processing means is unsuitable for use with the first signal processing means, the one or more input signals are processed by the first signal processing means without utilizing the one or more additional signal processing means, and standard signal processing that is set in advance is used, and
    wherein the television receiver uses the mobile phone to store processing coefficients when a quality of an input image to the television receiver is improved, and
    wherein the decided processing loads are utilized by the control means for setting wireless transfer paths for the data transfers between the first signal processing means and the additional signal processing means and for performing wireless data transfers on the set wireless transfer paths.

2. A signal processing apparatus according to claim 1, further comprising:
    third signal processing means having an associated processing function,
    wherein the communication means also performs data transfers between the additional signal processing means and the third signal processing means via wireless communication.

3. A signal processing apparatus according to claim 1, wherein the first signal processing means is composed of at least one detachable chip component.

4. A signal processing apparatus according to claim 3, wherein the first signal processing means composed of the at least one detachable chip component includes a storage means for storing coefficients that are required for performing a computational process.

5. A signal processing apparatus according to claim 1, further comprising:
    a control means for controlling signal processing by the first signal processing means,
    wherein the wireless communication by the communication means is performed by a wireless network with the control means as a master and the signal processing means as slaves.

6. A signal processing apparatus according to claim 1, wherein the wireless communication by the communication means is performed by a wireless network with a control means included in a different apparatus to the signal processing apparatus as a master and the first signal processing means as slaves.

7. A signal processing apparatus according to claim 6, wherein a signal that has been processed by the signal processing apparatus is inputted into the different apparatus.

8. A signal processing method for processing an input signal, comprising the steps of:
    processing the input signal with an associated function by using a television receiver that wirelessly transfers image data and audio data among functional units of the television receiver;
    detecting whether an additional block is connected, wherein the additional block has an additional function, the associated function and the additional block forming an appliance composition of a wireless network, the additional block including a mobile phone;
    determining the additional function of the additional block when a change in the appliance composition of the wireless network is detected;
    determining whether the additional function of the additional block is suitable for processing of the input signal;
    changing the processing of the input signal in accordance with the associated function and in accordance with the additional function in response to determining that the associated processing function of the additional block is suitable;
    performing standard signal processing that is set in advance in accordance with the associated function when the additional function of the additional block determined to be unsuitable;
    determining processing loads for the associated function and the additional function; and
    setting wireless transfer paths associated with the additional processing and the associated processing of the input signal based on the determined processing loads; and
    performing wireless data transfers on the set wireless transfer path,
    wherein the television receiver uses the mobile phone to store processing coefficients when a quality of an input image to the television receiver is improved, and wherein an associated function of the television receiver is changed when the additional function of the additional block is determined to be suitable.

9. A signal processing method according to claim 8, wherein when the signal processing function is changed by the changing step, transfers of control data to and from the connected block are also performed via wireless communication.

10. A signal processing method according to claim 9, wherein a wireless network is established in the changing step by performing data transfers to and from the connected block.

11. A signal processing method according to claim 10, wherein a block that is detected as present while the wireless network is being established is regarded as said additional block.

12. A signal processing system having a first signal processing apparatus for processing an input signal and a second signal processing apparatus that is added on to the first signal processing apparatus, the first signal processing apparatus comprising:
 first signal processing means having an associated function for processing the input signal, the first signal processing means including a television receiver that wirelessly transfers image data and audio data among functional units of the television receiver;
 detecting means for detecting a second signal processing apparatus, the second signal processing means including a mobile phone;
 first communication means for performing data transfers between the first signal processing means and a signal processing means in the second signal processing apparatus via wireless communication, wherein the first and the second signal processing apparatus are adapted to form an appliance composition of a wireless network; and
 first control means for determining the associated function of the signal processing means in the detected second signal processing apparatus when a change in the appliance composition of the wireless network has been detected,
 wherein when the control means determines that the associated processing function of the one or more additional processing means is suitable, the first control means changes the associated function of the first processing means and decides processing loads associated the signal processing means in the detected second signal processing apparatus, and
 wherein when the first control means determines that the associated function of the detected second signal processing means is unsuitable for use with the associated function of the first signal processing means, the input signal is processed by the first signal processing means without utilizing the second signal processing means, and standard signal processing that is set in advance is used, and
 wherein the television receiver uses the mobile phone to store processing coefficients when a quality of an input image to the television receiver is improved, and
 wherein the decided processing loads are utilized by the first control means for setting wireless transfer paths for the data transfers between the first signal processing means and the signal processing means in the second signal processing apparatus, and for performing wireless data transfers on the set wireless paths,
 wherein the second signal processing apparatus comprises:
  second signal processing means for processing the input signal;
  second communication means for performing data transfers between the second signal processing means and the first signal processing means via wireless communication; and
  second control means that controls data transfers via the second communication means and processing of signals obtained via the data transfers.

* * * * *